United States Patent
Hauser et al.

(10) Patent No.: US 9,534,615 B1
(45) Date of Patent: Jan. 3, 2017

(54) HYDRAULIC PUMP AND MOTOR MODULE FOR USE IN A VEHICLE

(71) Applicant: Hydro-Gear Limited Partnership, Sullivan, IL (US)

(72) Inventors: Raymond Hauser, Sullivan, IL (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 432 days.

(21) Appl. No.: 14/063,506

(22) Filed: Oct. 25, 2013

Related U.S. Application Data

(63) Continuation of application No. 13/493,456, filed on Jun. 11, 2012, now abandoned, which is a continuation of application No. 12/649,951, filed on Dec. 30, 2009, now Pat. No. 8,196,399, which is a continuation of application No. 11/426,251, filed on Jun. 23, 2006, now Pat. No. 7,640,738, which is a continuation-in-part of application No. 11/380,111, filed on Apr. 25, 2006, now abandoned, which is a continuation of application No. 10/767,315, filed on Jan. 28, 2004, now Pat. No. 7,056,101, which is a continuation-in-part of application No. 10/175,206, filed on Jun. 19, 2002, now Pat. No. 6,705,840.

(60) Provisional application No. 60/693,570, filed on Jun. 24, 2005, provisional application No. 60/698,699, filed on Jul. 13, 2005.

(51) Int. Cl.
*B60K 17/10* (2006.01)
*F15B 7/00* (2006.01)

(52) U.S. Cl.
CPC ............... *F15B 7/003* (2013.01); *B60K 17/10* (2013.01)

(58) Field of Classification Search
CPC ....................................................... B60K 17/10
See application file for complete search history.

(56) References Cited

U.S. PATENT DOCUMENTS

| | | | |
|---|---|---|---|
| 2,192,146 A | 2/1940 | Nightenhelser et al. | |
| 2,875,701 A | 3/1959 | Ebert | |
| 2,914,219 A | 11/1959 | Chiantelassa | |
| 3,830,326 A | 8/1974 | Hartung | |
| 3,975,990 A | 8/1976 | Kraus | |
| 4,063,608 A | 12/1977 | Sullivan | |
| 4,252,508 A | 2/1981 | Forster | |
| 4,270,408 A | 6/1981 | Wagner | |
| 4,580,646 A | 4/1986 | Tokunaga | |
| 4,631,980 A | 12/1986 | Ishimori | |
| 4,819,508 A | 4/1989 | Yamaoka et al. | |

(Continued)

FOREIGN PATENT DOCUMENTS

| | | |
|---|---|---|
| JP | 2001-146951 | 5/2001 |
| JP | 2001-263259 | 9/2001 |
| WO | WO2009/067532 | 5/2009 |

OTHER PUBLICATIONS

Dixie Chopper, Operation Manual 1998, cover page and pp. 50-51, 60-61, 66, Revisions #5 Feb. 1998.

*Primary Examiner* — F. Daniel Lopez
(74) *Attorney, Agent, or Firm* — Neal, Gerber & Eisenberg LLP

(57) ABSTRACT

A module for use in connection with a dual pump apparatus, where each pump is hydraulically connected to a separate hydraulic motor. The module may include motors and/or an engine for ease of installation in a vehicle, providing flexibility for different applications. Various brackets, stabilizers and other elements are provided to assist in securing the module to the vehicle.

14 Claims, 57 Drawing Sheets

(56) References Cited

U.S. PATENT DOCUMENTS

| | | |
|---|---|---|
| 4,876,846 A | 10/1989 | Torras |
| 4,882,940 A | 11/1989 | Yamaoka et al. |
| 4,971,535 A | 11/1990 | Okada et al. |
| 5,040,429 A | 8/1991 | Del Castillo |
| 5,078,222 A | 1/1992 | Hauser et al. |
| 5,207,060 A | 5/1993 | Sheets |
| 5,257,429 A | 11/1993 | Genis |
| 5,304,043 A | 4/1994 | Shilling |
| 5,501,578 A | 3/1996 | Skirde |
| 5,522,213 A | 6/1996 | Bustamante |
| 5,800,134 A | 9/1998 | Hasegawa et al. |
| 6,332,393 B1 | 12/2001 | Trimble |
| 6,361,282 B1 | 3/2002 | Wanschura |
| 6,425,244 B1 | 7/2002 | Ohashi et al. |
| 6,457,560 B1 | 10/2002 | Evans et al. |
| 6,487,856 B1 | 12/2002 | Ohashi et al. |
| 6,494,686 B1 | 12/2002 | Award |
| 6,578,656 B2 | 6/2003 | Samejima et al. |
| 6,662,538 B2 | 12/2003 | Eavenson, Sr. et al. |
| 6,672,843 B1 | 1/2004 | Holder et al. |
| 6,705,840 B1 | 3/2004 | Hauser et al. |
| 6,811,510 B1 | 11/2004 | Langenfeld et al. |
| 6,953,327 B1 | 10/2005 | Hauser et al. |
| 6,971,233 B1 | 12/2005 | Holder |
| 6,988,580 B2 | 1/2006 | Ohashi |
| 6,997,280 B2 | 2/2006 | Minoura et al. |
| 7,056,101 B1 | 6/2006 | Hauser et al. |
| 7,059,109 B2 | 6/2006 | Samejima et al. |
| 7,299,888 B2 | 11/2007 | Ohashi et al. |
| 7,316,287 B2 | 1/2008 | Ohashi et al. |
| 7,370,476 B2 | 5/2008 | Kawamura et al. |
| 7,370,714 B2 | 5/2008 | Sakikawa et al. |
| 7,377,106 B2 | 5/2008 | Sakikawa et al. |
| 7,407,030 B2 | 8/2008 | Yasuda et al. |
| 7,455,132 B2 | 11/2008 | Acharya et al. |
| 7,520,346 B2 | 4/2009 | Tate et al. |
| 7,621,353 B2 | 11/2009 | Ishii et al. |
| 7,640,738 B1 | 1/2010 | Hauser et al. |
| 7,695,252 B2 | 4/2010 | Sakikawa |
| 7,717,219 B2 | 5/2010 | David |
| 7,753,160 B2 | 7/2010 | Velke et al. |
| 8,028,776 B2 | 10/2011 | Dong et al. |
| 8,100,204 B2 | 1/2012 | Dong et al. |
| 8,196,399 B1 | 6/2012 | Hauser et al. |
| 8,240,414 B2 | 8/2012 | Sasahara et al. |
| 2002/0189885 A1 | 12/2002 | Ruebusch |

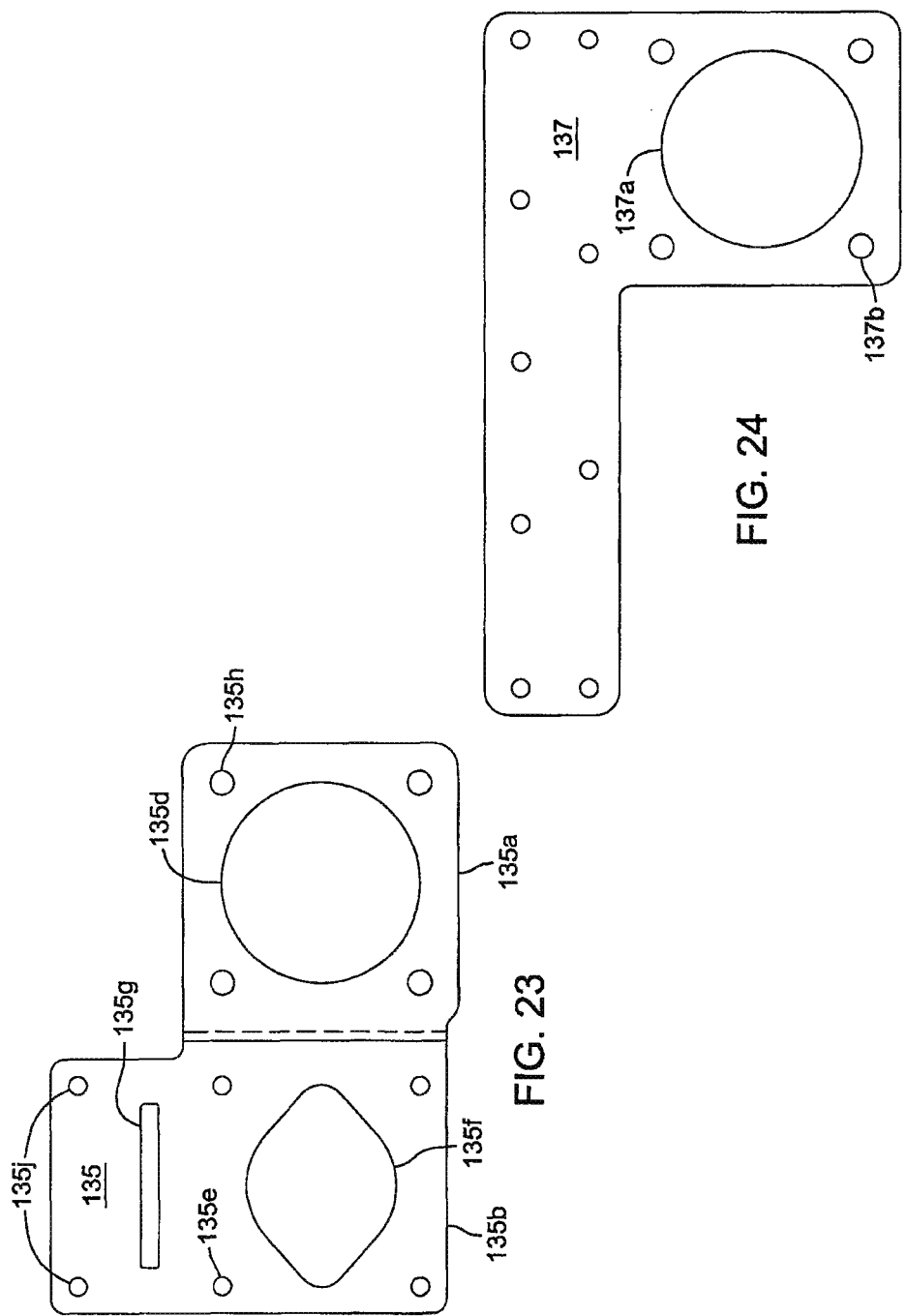

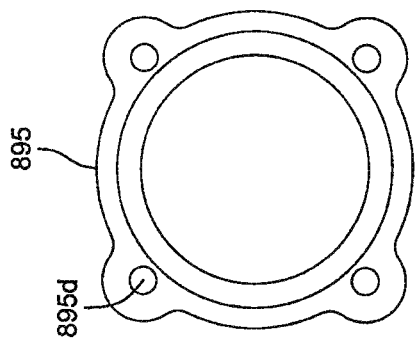
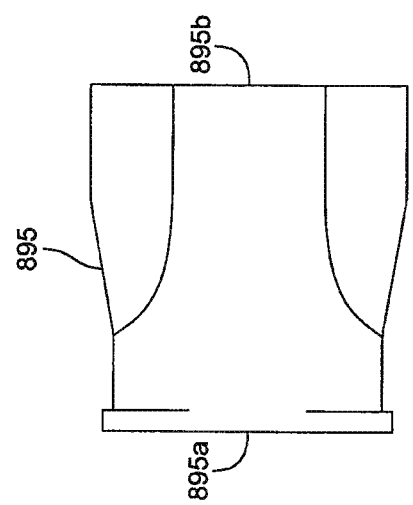
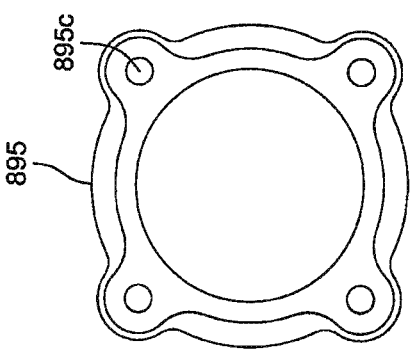

HYDRAULIC PUMP AND MOTOR MODULE FOR USE IN A VEHICLE

CROSS REFERENCE TO RELATED APPLICATIONS

This application is a continuation of U.S. patent application Ser. No. 13/493,456 filed Jun. 11, 2012; which is a continuation of U.S. patent application Ser. No. 12/649,951 filed Dec. 30, 2009, now U.S. Pat. No. 8,196,399; which is a continuation of U.S. patent application Ser. No. 11/426,251 filed Jun. 23, 2006, now U.S. Pat. No. 7,640,738; which is a continuation-in-part of U.S. patent application Ser. No. 11/380,111 filed Apr. 25, 2006; which is a continuation of U.S. patent application Ser. No. 10/767,315, filed on Jan. 28, 2004, now U.S. Pat. No. 7,056,101; which is a continuation-in-part of U.S. patent application Ser. No. 10/175,206, filed Jun. 19, 2002, now U.S. Pat. No. 6,705,840. U.S. patent application Ser. No. 11/426,251 also claims priority from U.S. Provisional Patent Application No. 60/693,570 filed on Jun. 24, 2005 and U.S. Provisional Patent Application No. 60/698,699, filed on Jul. 13, 2005. All of these prior applications and patents are incorporated by reference in their entirety.

BACKGROUND OF THE INVENTION

This invention relates to hydraulic pumps. This invention also relates to hydraulic pumps and wheel motors used in connection with vehicles, and to modules incorporating such pumps, motors and other components for assembly in a vehicle.

SUMMARY OF THE INVENTION

A dual tandem pump having an input shaft that is separate from the pump input shafts is disclosed herein. Also disclosed herein are dual pump and wheel motor modules for use in connection with a vehicle. Various embodiments are depicted to provide easy mounting of the pump and motor module to the frame or other components of the vehicle. In certain embodiments, the vehicle engine is provided as part of the module for simplicity in assembly.

The details of this invention are set forth below in connection with the detailed description of the embodiments.

BRIEF DESCRIPTION OF THE DRAWINGS

FIG. 23 is a side elevational view of one of the bracket components shown in FIG. 19.

FIG. 24 is a side elevational view of one of the bracket components shown in FIG. 19.

FIG. 50 is an elevational view of the inner end of the casting used in FIG. 49 to connect the pump assembly to each wheel motor.

FIG. 51 is either a front or rear elevational view of the casting shown in FIG. 50.

FIG. 52 is an elevational view of the outer end of the casting shown in FIG. 50.

DETAILED DESCRIPTION OF THE DRAWINGS

Figure 1:
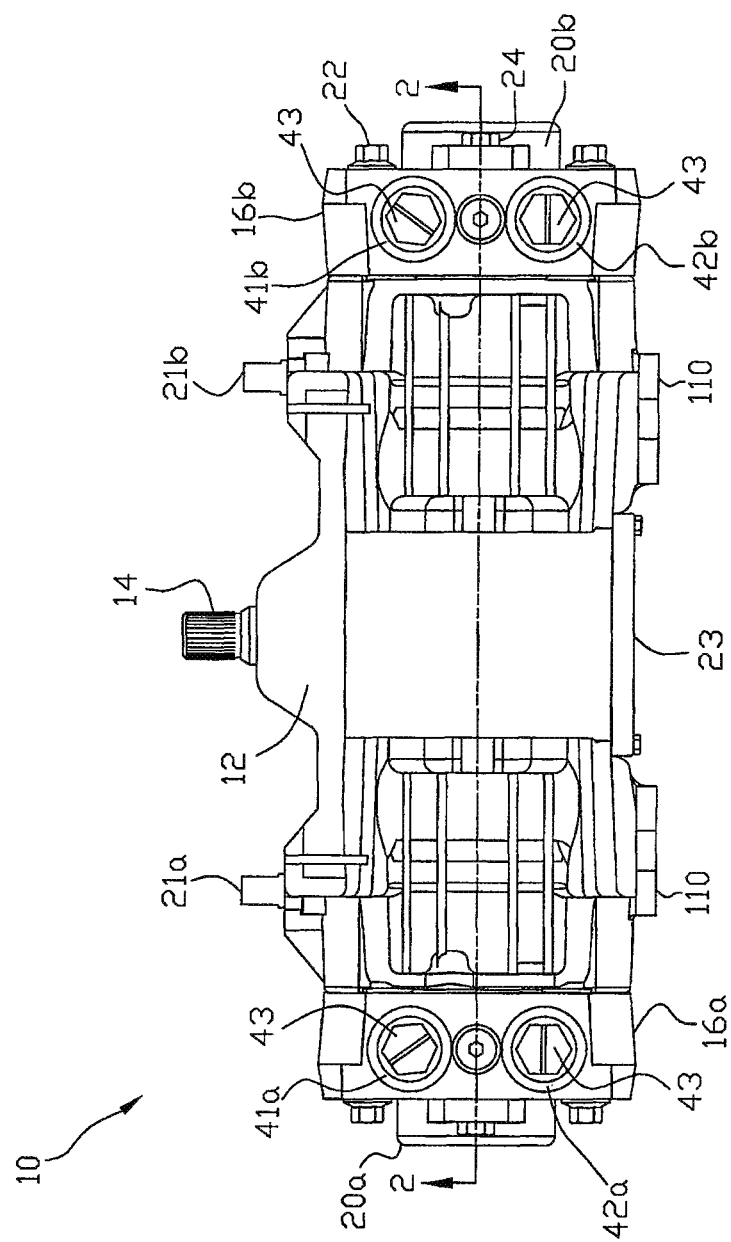
FIG. 1 is an external side view of a tandem pump in accordance with one embodiment of this invention.

FIGS. 1-16 are directed to a dual pump apparatus and depict different embodiments thereof. FIGS. 17 to 60 are directed to various modules incorporating, among other things, a dual pump apparatus.

One embodiment of this invention is shown in FIGS. 1, 2, 3 and 4, which depict a pump apparatus 10 having a unitary housing 12. In the embodiment described below, two generally identical pumps 11a and 11b are disclosed within unitary housing 12, and identical numerals with the letters a and b are used to reference identical parts. It will be understood by one of skill in the art that pumps 11a and 11b need not be identical and that substantial variations are possible to one or the other within the scope of this invention. Pumps 11a and 11b are shown as the rotating axial piston type, although other designs could be used with minor modifications within the scope of this invention. For convenience, only certain elements of pump 11a and its related structure are described in detail herein. It will be understood that the corresponding structure of pump 11b is identical in the embodiments depicted and need not be similarly described.

Housing 12 forms two generally identical pump chambers or cavities 29a and 29b and a gear chamber or cavity 30 formed therebetween, thus providing an integral housing for pumps 11a and 11b. A pair of end caps 16a and 16b are mounted on opposite ends of housing 12 and act to seal pump chambers 29a and 29b, and may be secured thereto by screws 22 or another means. A cover 23 is secured to the bottom of housing 12 to close gear chamber 30.

Figure 2:
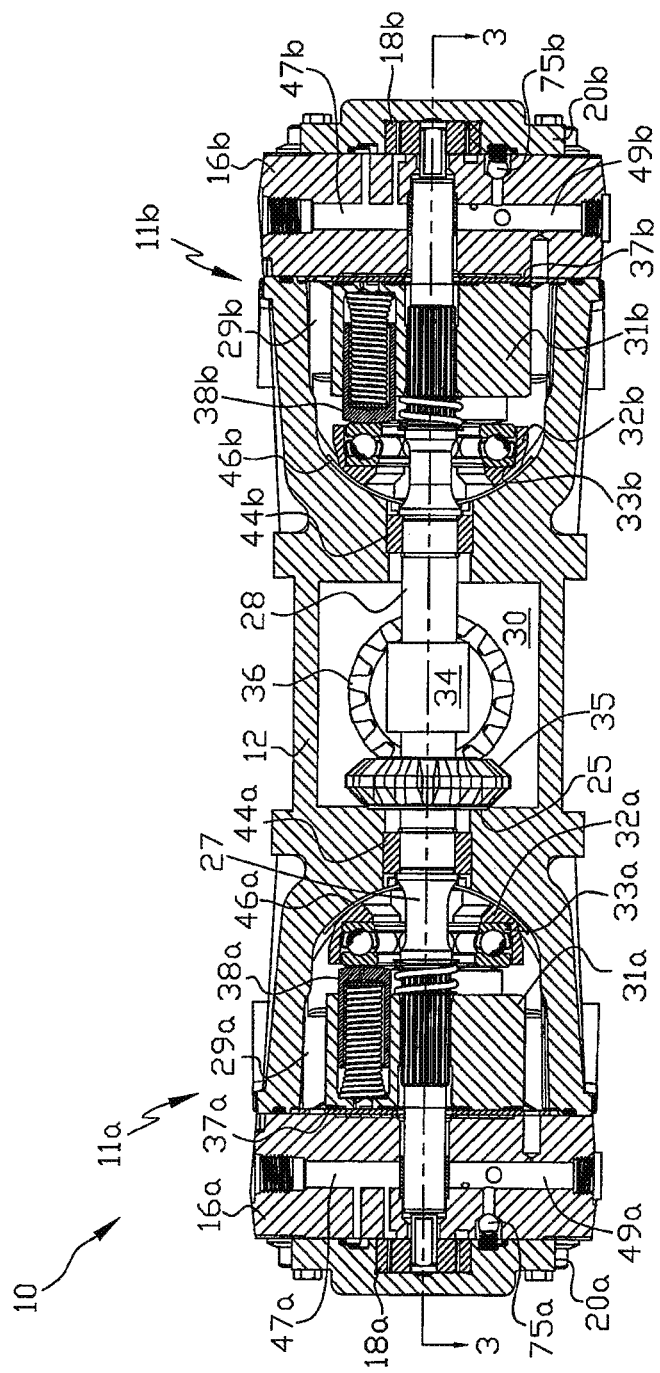
FIG. 2 is a cross-sectional view along the lines 2-2 in FIG. 1.
Figure 3:
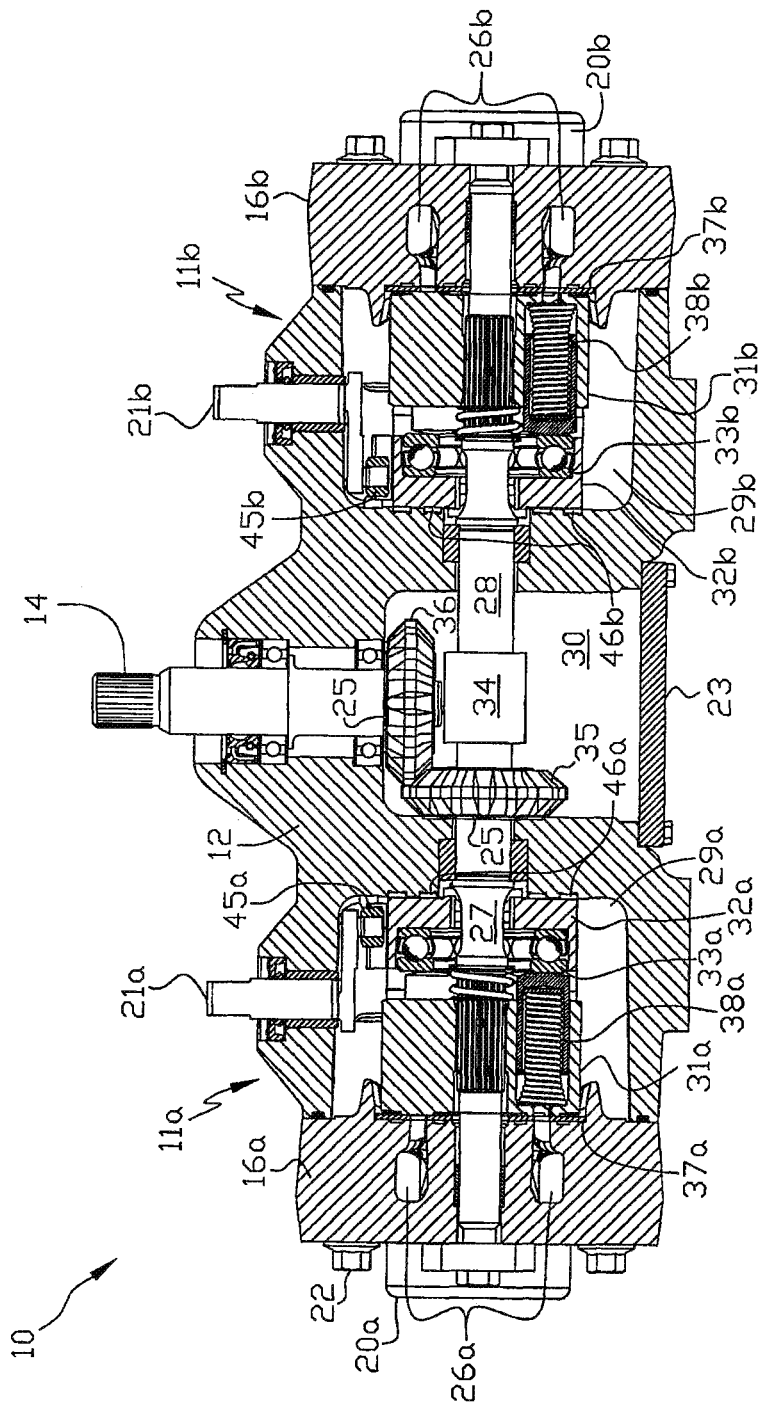
FIG. 3 is a cross-sectional side view along the lines 3-3 in FIG. 2.

With regard to pump 11a on the left hand side of FIGS. 1, 2 and 3, it can be seen that a pump cylinder block 31a comprising a plurality of axial pistons 38a is mounted on running plate 37a, which may be used for additional strength and durability. Cylinder block 31a could also run directly on a surface formed on end cap 16a. The porting in end caps 16a and 16b can be of the design shown in e.g., U.S. Pat. No. 6,332,393, the terms of which are incorporated by reference.

End cap 16a includes hydraulic porting 26a for the hydraulic fluid. System ports 41a and 42a are formed on the external surface thereof. In the view shown in FIG. 1, plugs 43 are used to seal system ports 41a, 41b, 42a and 42b for shipping; in use the system ports would be connected to hoses or the like. As shown in the schematic depicted in FIG. 4, ports 41a and 42a are connected to motor 40a while ports 41b and 42b are connected to motor 40b. Motors 40a and 40b could be wheel motors in a typical zero turn vehicle design; they could also be replaced with other hydraulic devices in other applications. A bypass 66a and 66b is provided for each pump 11a and 11b to permit, e.g., movement of the vehicle when it is not under power.

Pump 11a is of the cradle mounted swash plate design; as shown in FIG. 3, swash plate 32a is mounted in pump chamber 29a on cradle bearings 46a mounted on the inner wall of housing 12. Pistons 38a run against swash bearing 33a mounted in swash plate 32a. Trunnion arm 21a is engaged to a control block 45a that is engaged to swash plate 32a, so that rotation of trunnion arm 21a causes movement of swash plate 32a to the various stroked forward or reverse positions, or to the neutral position.

Figure 4:
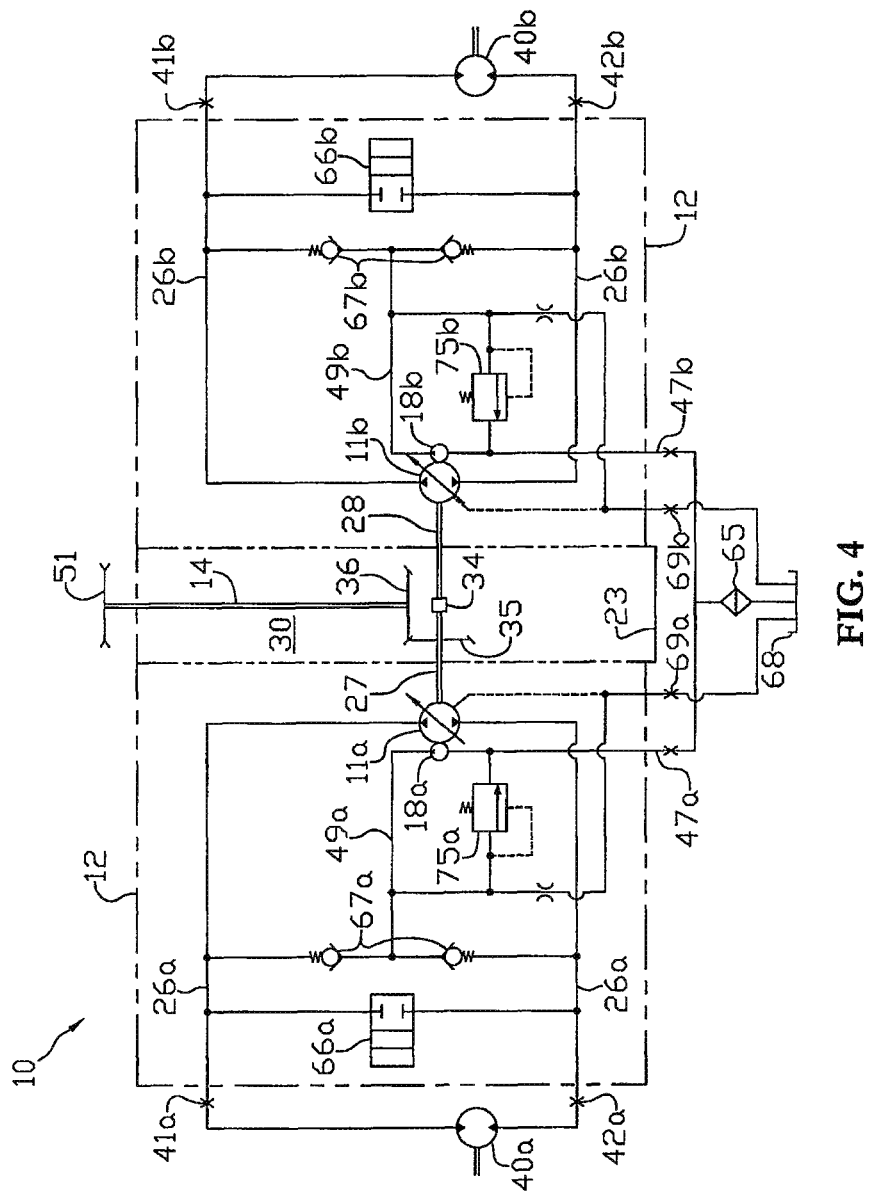
FIG. 4 is a schematic of the hydraulic circuit of the embodiment of this invention shown in FIG. 1.

As shown in FIG. 4, an external reservoir 68 is used for storing hydraulic fluid. The hydraulic fluid is pulled from reservoir 68 through filter 65 into charge inlets 47a and 47b, and hence to charge pumps 18a and 18b, respectively. Charged fluid is driven into charge gallery 49a and then to the porting in end cap 16a, and a charge relief 75a is provided to keep pressures within the normal operating range. Since in this embodiment pump chambers 29a and 29b are sealed from one another, a plurality of case drains 69a and 69b are provided to remove oil from pump chambers 29a and 29b, respectively. The separate case drains 69a and 69b may be located in a variety of locations, such as end caps 16a and 16b. Check valves 67a and 67b are used to maintain the proper hydraulic flow within end caps 16a and 16b. A pair of charge pressure relief valves 75a and 75b is connected to the porting for charge pumps 18a and 18b, respectively.

Figure 17:
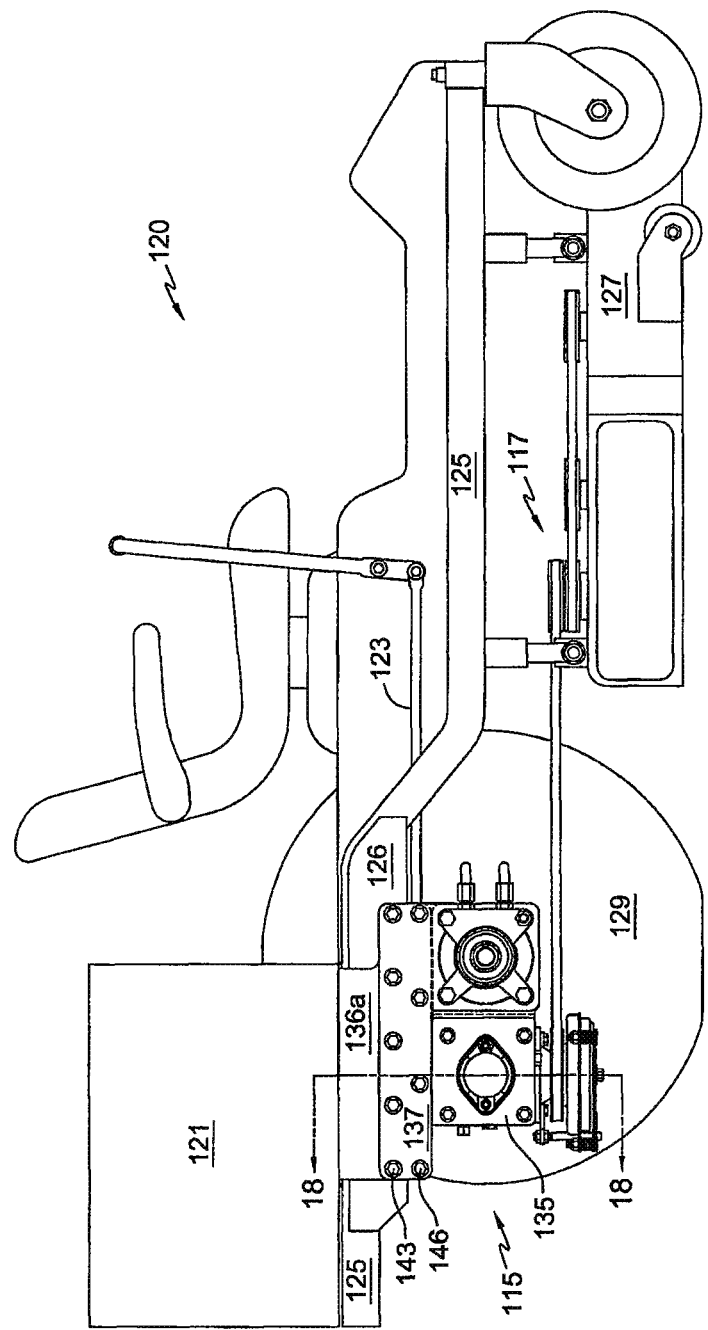
FIG. 17 is a side elevational view of a vehicle in accordance with a further embodiment of this invention, having a bracket-mounted dual pump module with an engine attached.

Input shaft 14 extends into housing 12; it can be driven by a prime mover such as engine 121 shown in FIG. 17 through a pulley, such as pulley 51 shown in FIG. 4, or some other means. Bevel gear 36 is mounted on input shaft 14 inside gear chamber 30 and is drivingly engaged to a second bevel gear 35 mounted on first pump shaft 27. Pump shaft 27 extends from gear chamber 30 into first pump chamber 29a and is engaged to and drivingly rotates pump cylinder block 31a. Bearing 44a provides support within housing 12. Pump shaft 27 is joined to and drives shaft 28 through coupler 34, which may be of a known design using a powdered metal part with splines to interlock shafts 27 and 28, or a cut steel part with a broached inner diameter to form the interlock, or a similar design. Pump shaft 28 also extends from gear chamber 30 into pump chamber 29b where it engages and drivingly rotates pump cylinder block 31b in a similar manner. As shown in, e.g., FIG. 3, input shaft 14 is generally perpendicular to pump shafts 27 and 28 and extends out the side of housing 12 as opposed to the ends thereof, which provides the user with flexibility in the application.

As shown in, e.g., FIG. 3, input shaft 27 extends through end cap 16a into charge housing 20a to drive charge pump 18a, which can be a gerotor style such as is shown or some other style of charge pump, such as a vane pump, geroller, gear pump or any other known design. End cap 16a may be secured to housing 12 by means of screws 24 or the like. The location of input shaft 14 on the side of housing 12 permits the location of charge pumps 18a and 18b on opposite ends of housing 12. Specifically, charge pump 18a is located within charge pump housing 20a mounted on end cap 16a. A similar charge pump 18b may be mounted in a similar manner in charge pump housing 20b on the other end of apparatus 10. It is possible that only one of the charge pumps would be required, depending on the application for which the pump apparatus 10 is to be used. Similarly, the output of one charge pump mounted on one end cap could be attached by means of internal or external hoses or integral passages to provide charge pressure to the other pump associated with the other end cap.

It will also be understood that these embodiments could include additional gear reduction. For example, in FIG. 3, a gear reduction could be used between bevel gear 36 on input shaft 14 and bevel gear 35 on pump shaft 27. Furthermore, it will be understood that bevel gears 35 and 36 could be replaced with another means for creating a right angle turn of the rotational force, such as helical gears, a worm gear driving a spur gear and the like.

Figure 5:
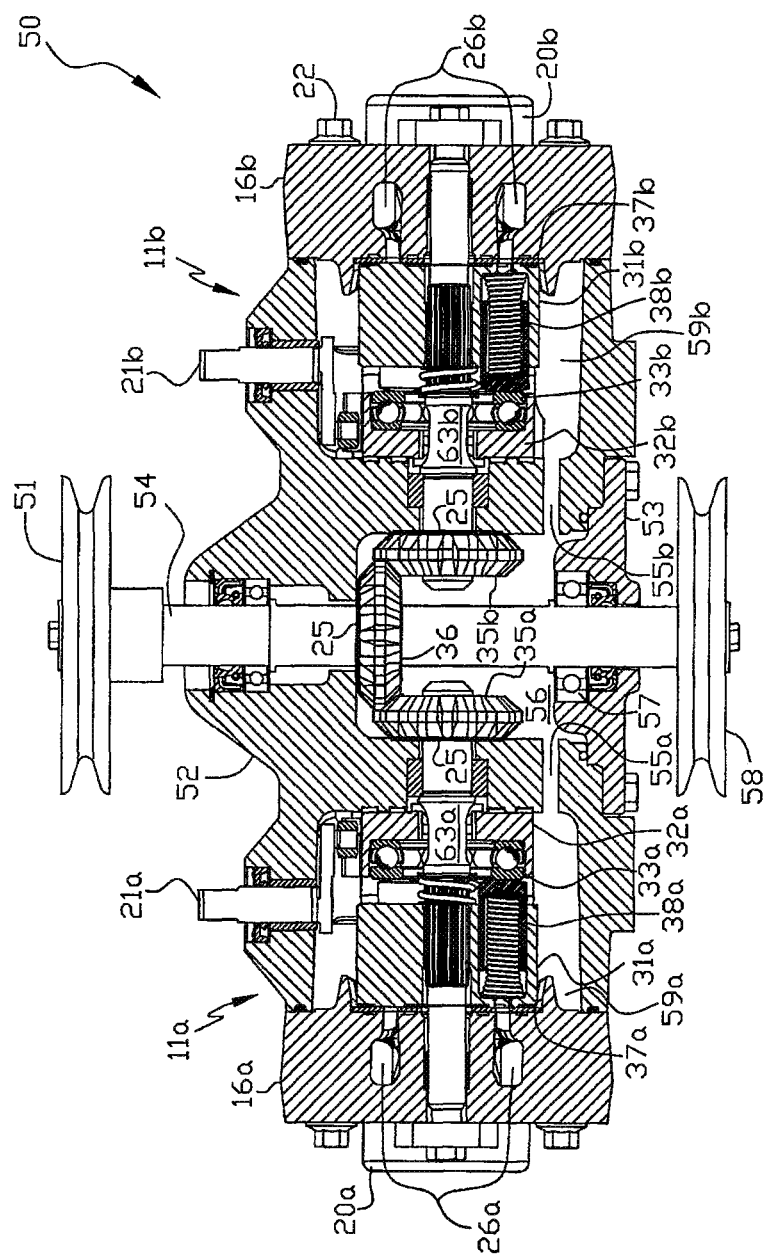
FIG. 5 is a cross-sectional side view of a second embodiment of this invention.
Figure 6:
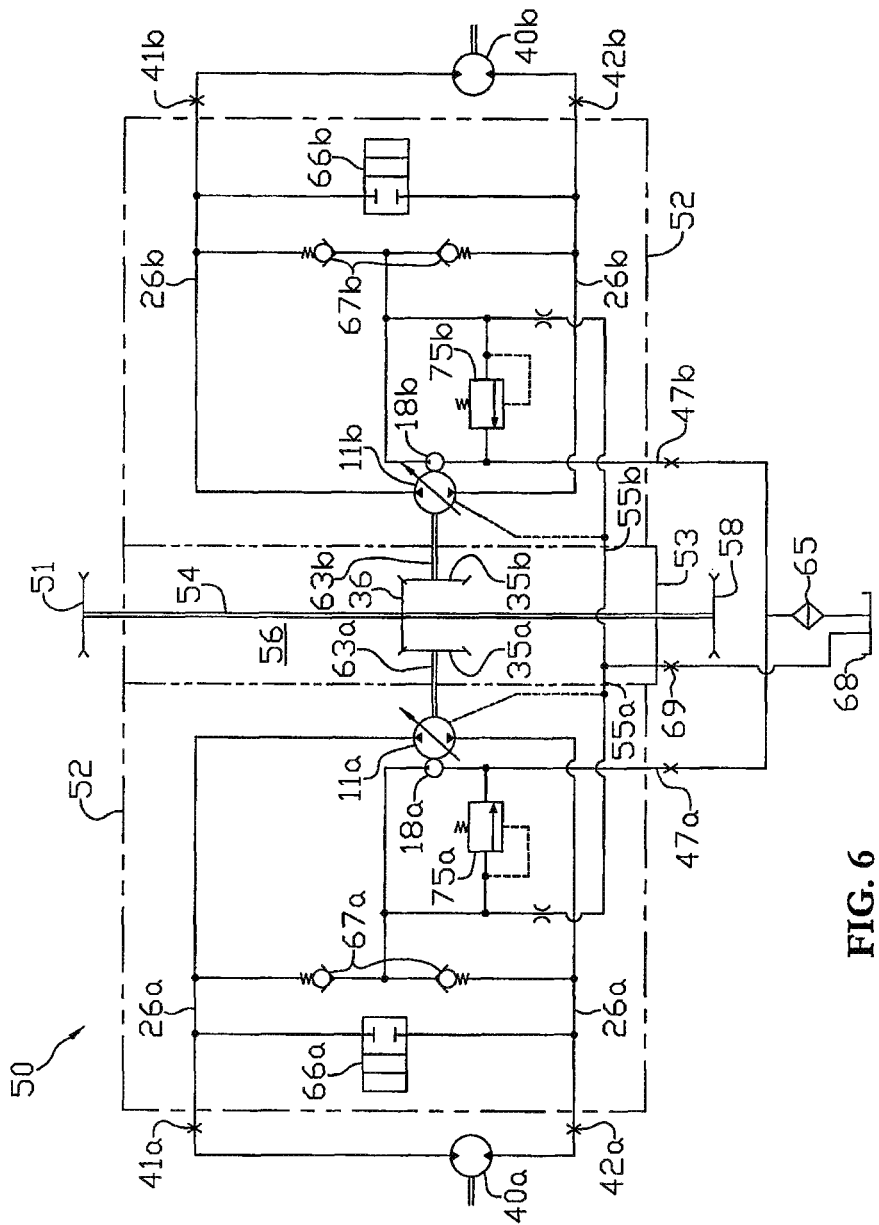
FIG. 6 is a schematic of the hydraulic circuit of the embodiment of this invention shown in FIG. 5.

FIG. 5 shows a second embodiment of this invention, where like numerals indicate identical structure with previous figures. A pump apparatus 50 has a housing 52 which creates a gear chamber 56 and a first pump chamber 59a and a second pump chamber 59b. A case fluid passage 55a is formed in housing 52 to connect pump chamber 59a and gear chamber 56, and case fluid passage 55b similarly connects pump chamber 59b with gear chamber 56, both to permit hydraulic oil to flow between the pump chambers 59a and 59b and the gear chamber 56. Since both pump chambers 59a and 59b and gear chamber 56 are hydraulically connected in this embodiment, a single case drain 69 to permit oil to flow to reservoir 68 can be formed anywhere in housing 52; if it is in the gear chamber 56, as shown in FIG. 6, it will assist in preventing contamination of pumps 11a and 11b with debris from bevel gears 36, 35a and 35b and assist in reduction of heat, as the warmer fluid from pumps 11a and 11b will be carried to the center of housing 52. It could, however, be formed elsewhere in the circuit depending on the application requirements. The use of a single case drain also reduces machining requirements and the number of fittings required.

In this second embodiment, input shaft 54 is driven by input pulley 51 and extends through housing 52, and through cover 53, which includes bearing 57 therein to support shaft 54. Output pulley 58 may be attached to the end of shaft 54 to drive an auxiliary device such as a mower deck or other device. Cover 53 is strengthened to support bearing 57 used to rotatably support shaft 54 and the torque loads from output pulley 58.

It will be noted that using through shaft 54 as the input shaft precludes the use of a coupler to drive pump input shafts 63a and 63b. An alternative means of driving these shafts is shown in FIG. 5 where input shaft 54 has a first bevel gear 36 mounted thereon and drivingly engaged to a first driven bevel gear 35a mounted on and driving first pump shaft 63a and a second driven bevel gear 35b which is similarly mounted on and driving second pump shaft 63b. Such an alternative arrangement could also be used with the first embodiment in place of coupler 34. A further benefit of this design is that pump shafts 63a and 63b can be sized appropriately for pumps 11a and 11b; only input shaft 54 needs to be sized appropriately to handle the torque of both pumps 11a and 11b as well as the torque requirements of an auxiliary device attached to output pulley 58.

Figure 7:
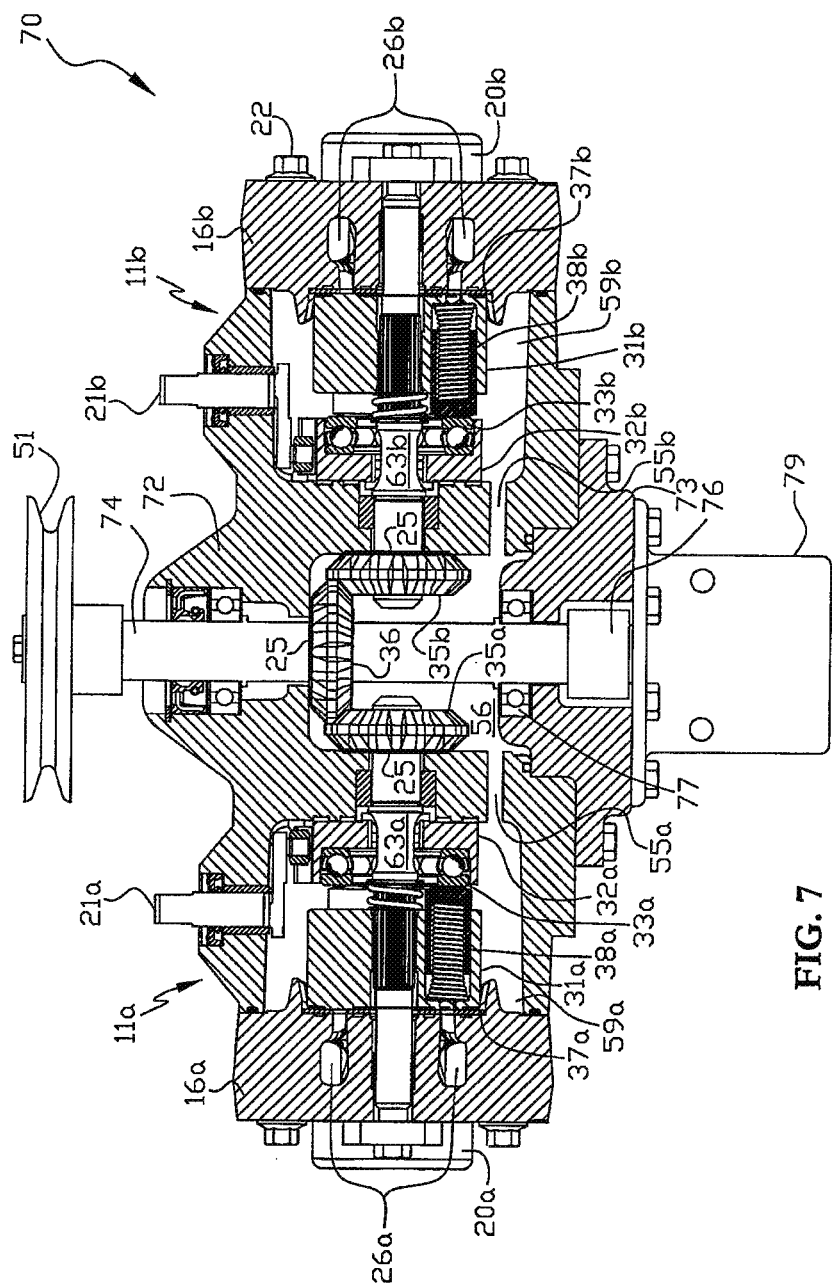
FIG. 7 is a cross-sectional side view of a third embodiment of this invention.
Figure 8:
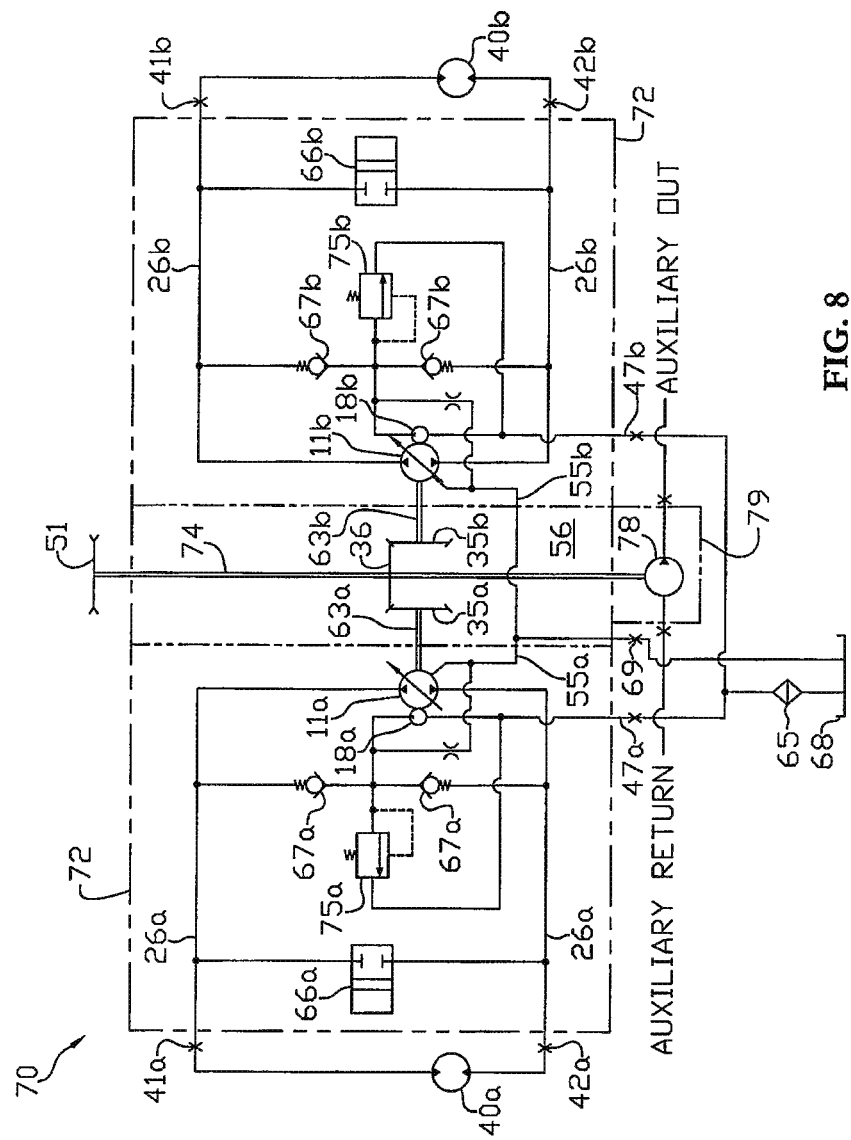
FIG. 8 is a schematic of the hydraulic circuit of the embodiment of this invention shown in FIG. 7.

A third embodiment of this invention is shown in FIG. 7, which is similar in many ways to the embodiment as shown in FIG. 5. Pump apparatus 70 includes a housing 72 with cover 73 secured thereto. Input shaft 74 extends through housing 72 and cover 73, where it is supported by bearing 77, to extend out of gear chamber 56 to drive auxiliary pump 78 through coupler 76, which also may be of the internal spline structure or other known structure. Auxiliary pump 78 could alternatively be driven directly by input shaft 74, thus eliminating the need for coupler 76. Optional hardened washers 25 may be mounted adjacent to gears 35a, 35b and 36 to provide support for such gears running against housing 72.

Auxiliary pump 78 is mounted in auxiliary pump housing 79 mounted on cover 73, and it can be used for driving external devices such as a deck lift or the like. The auxiliary out and auxiliary return are depicted schematically in FIG. 8. As with the embodiment depicted in FIG. 6, this embodiment requires only a single case drain 69 to reservoir 68.

Figure 9:
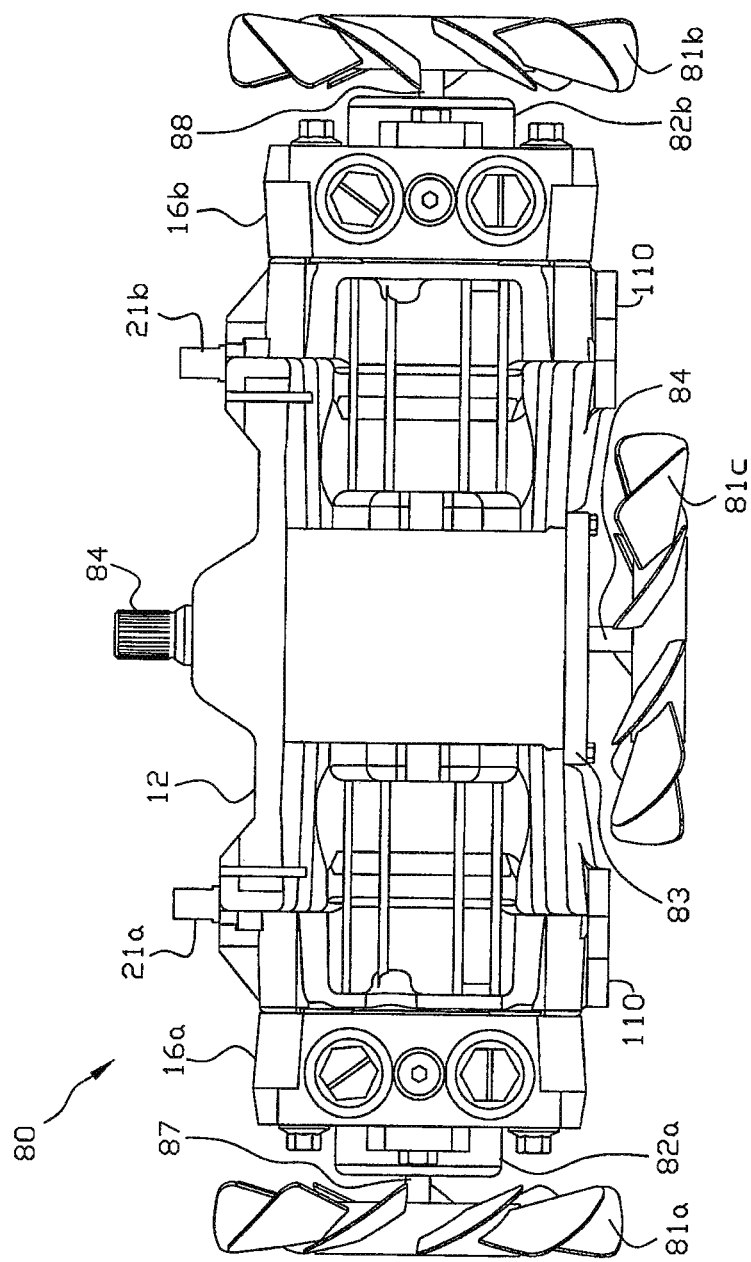
FIG. 9 is a side view of a fourth embodiment of this invention.

Yet another embodiment is depicted in FIG. 9, which is structurally substantially identical to the embodiment shown in FIG. 1. FIG. 9 shows a pump apparatus 80, where the key differences with FIG. 1 are that pump shafts 87 and 88 extend out of charge pump housings 82a and 82b, respectively, and input shaft 84 extends out of cover 83. A plurality of cooling fans 81a and 81b are mounted on pump shafts 87 and 88 respectively, while fan 81c may be mounted on input shaft 84. It is unlikely, though possible, that all three fans 81*a-c* would be needed for a single application.

One or more of fans 81*a-c* may be used depending on the application needs and if 81*a* and 81*b* are placed in the orientation shown in FIG. 9, so as to move air in the same direction, they may cooperate to generate a draft across housing 12 and reduce airflow turbulence. The use of such fans can in certain applications eliminate the need for an oil cooler. The most advantageous arrangement of the fans will depend on how apparatus 80 is located with respect to, e.g., a vehicle engine or the like.

A fifth embodiment of this invention is shown in FIGS. 10-13, where pump apparatus 90 has a housing 92. This embodiment is similar in many ways to the previous embodiments and in particular the embodiment shown in FIGS. 5 and 7 in terms of the arrangements of those items using identical numerals. The key difference in this embodiment is the use of a single charge pump 98 driven by input shaft 94 rather than a pair of charge pumps driven by pump shafts 93*a* and 93*b*. Charge pump 98 is mounted in a housing 99 secured to cover 95.

As will be understood, a described arrangement requires porting to be formed in both cover 95 and housing 92 to permit charge oil flow to pump cylinder blocks 31*a* and 31*b*. It would also be understood that such porting could be formed externally, e.g., through hoses and the requisite fittings connecting charge pump 98 to end caps 96*a* and 96*b*. Input shaft 94 extends through cover 95 to drive charge pump 98. The input shaft may be further supported by bearing 77. An additional bearing 97 may also be provided.

Figure 10:
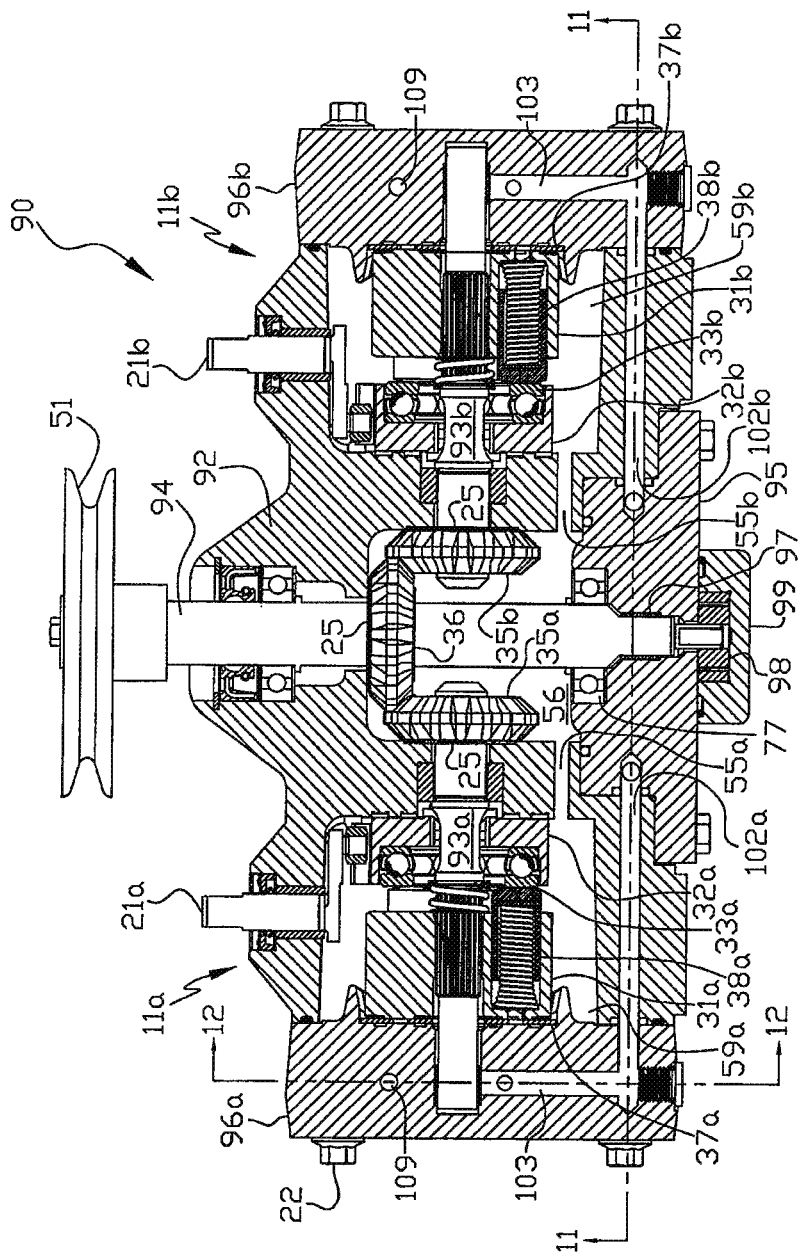
FIG. 10 is a cross-sectional side view of a fifth embodiment of this invention.
Figure 11:
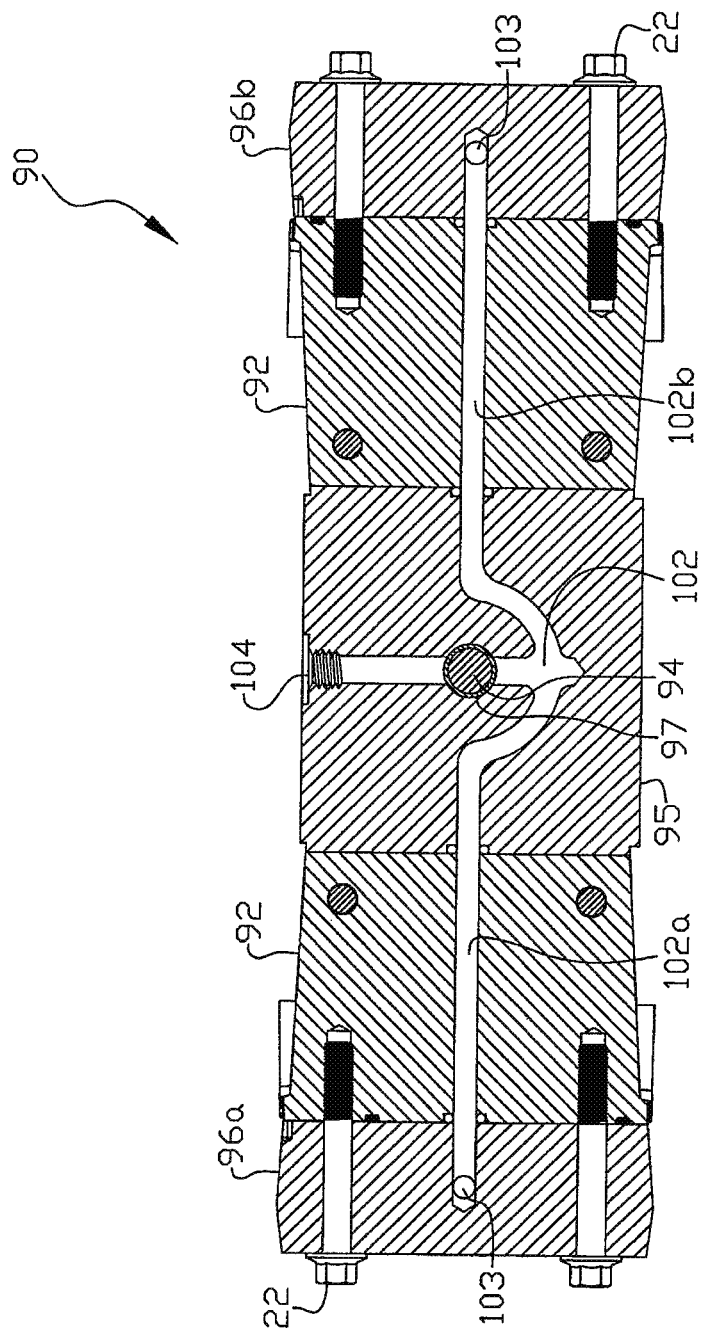
FIG. 11 is a cross-sectional view of the fifth embodiment of the pump apparatus shown along the lines 11-11 in FIG. 10.

As shown most clearly in FIGS. 10 and 11, housing 92 and cover 95 include a port 102 having a first leg 102*a* extending into the left side of housing 92 and into end cap 96*a*, and a second leg 102*b* extending opposite thereto and through the right side of housing 92 and into second end cap 96*b*. Charge inlet 104 is formed in cover 95 and connects charge pump 98 to reservoir 68, as shown in the schematic shown in FIG. 13. In the exemplary embodiment illustrated in FIGS. 10 and 11, bearing 97 also serves to divide charge inlet 104 from port 102. End caps 96*a* and 96*b*, which are secured to housing 92 by screws 22 or other fastening means, may be generally identical and thus only one will be described.

End cap 96*a* has a pair of system ports 105, each of which has a corresponding poppet valve 106 connecting the kidneys 107 to the system ports 105. A screw type bypass 108 can be used with a bypass port 109 connecting the two sides of the hydraulic circuit to enable the user to place the unit into bypass. The key distinction from the prior embodiments is the use of single charge port 103, which may be drilled into end cap 96*a*, and which connects to port 102*a* to provide charge fluid from charge pump 98 to the hydraulic circuit of pump 11*a*.

Figure 12:
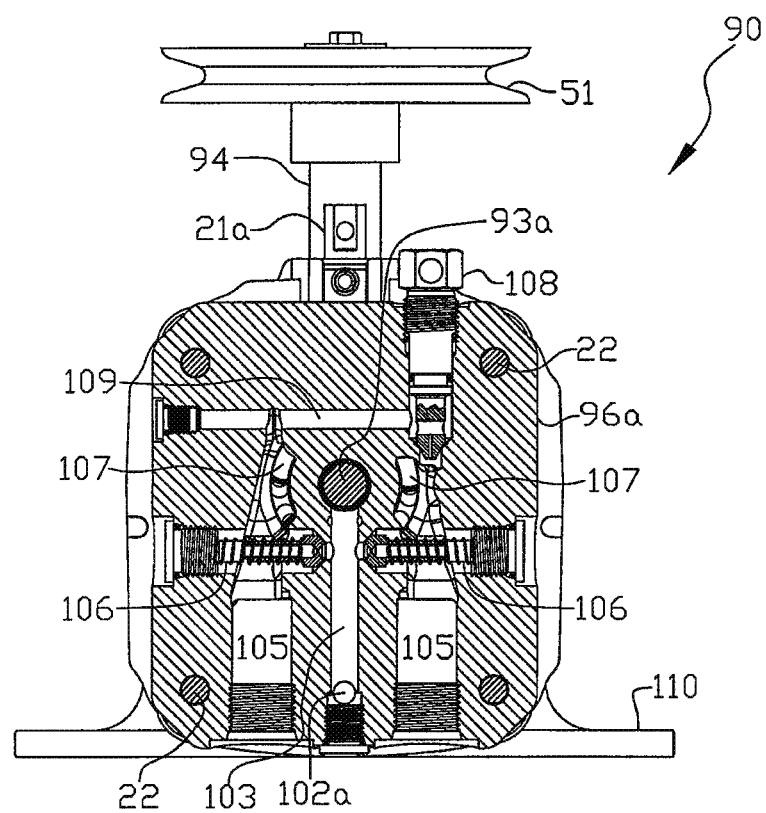
FIG. 12 is a cross-sectional view of an end cap of the fifth embodiment of this invention shown along the lines 12-12 in FIG. 10.
Figure 13:
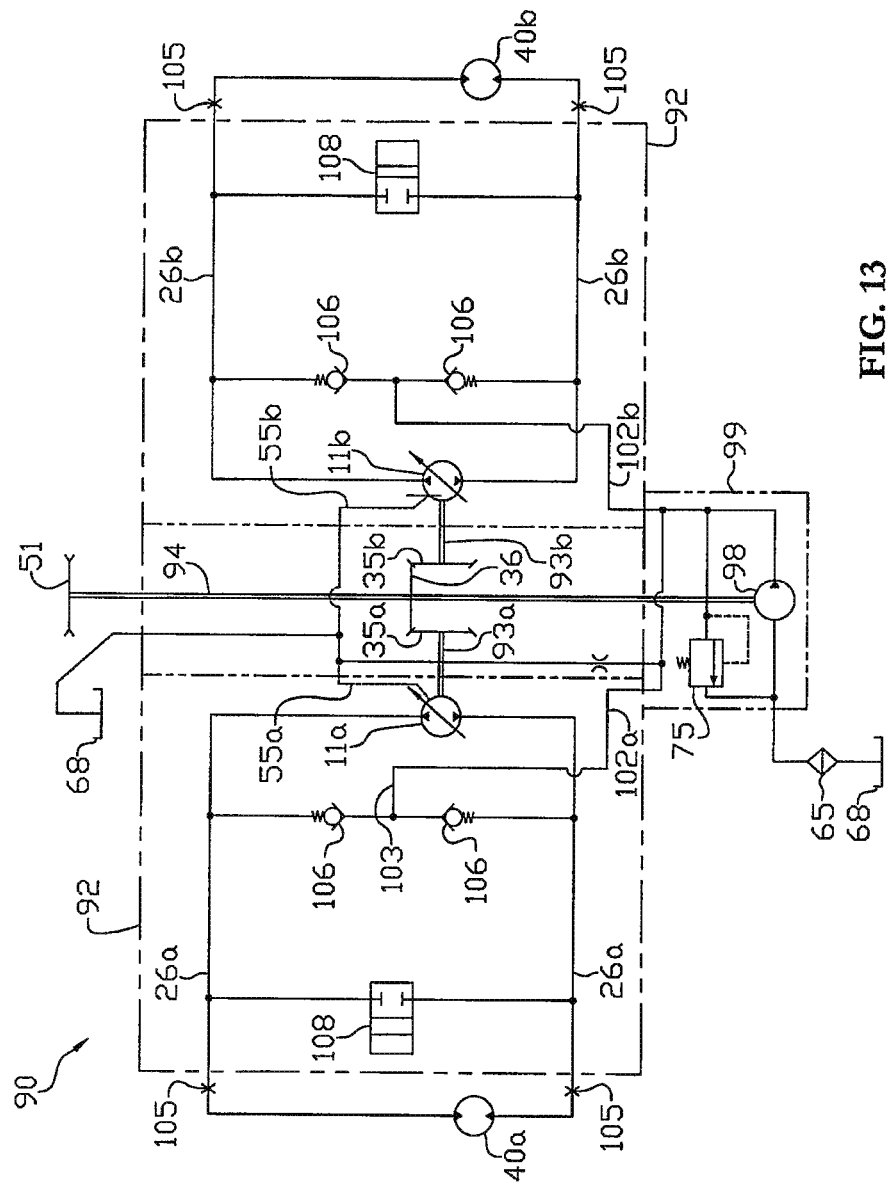
FIG. 13 is a schematic showing the embodiment of FIGS. 10-12.

As can be seen most clearly in FIG. 12, a mounting flange 110 can be formed on housing 92 to provide a means for securing the pump apparatus to a vehicle or the like.

One of the benefits of this invention is that the design affords flexibility to the user for different possible applications. For example, in FIGS. 1-3, trunnion arms 21*a* and 21*b* are shown extending out of housing 12 on the same side as and thus parallel to input shaft 14. It will be understood that trunnion arms 21*a* and 21*b* could be mounted on any side of housing 12, possibly requiring a corresponding change in the orientation of swash plates 32*a* and 32*b*, respectively, and also possibly requiring a change in the orientation of end caps 16*a* and 16*b*, respectively. Trunnion arms 21*a* and 21*b* need not be on the same side of housing 12. By way of example, if trunnion arm 21*a* is rotated 180° from the orientation shown, housing 12 would need to be modified, but the orientation of end cap 16*a* would not need to be changed. If, however, trunnion arm 21*a* was rotated 90° from the orientation shown, end cap 16*a* would also need to be similarly rotated, along with the proper housing modifications. These changes are depicted in FIGS. 15 and 16.

Figure 15:
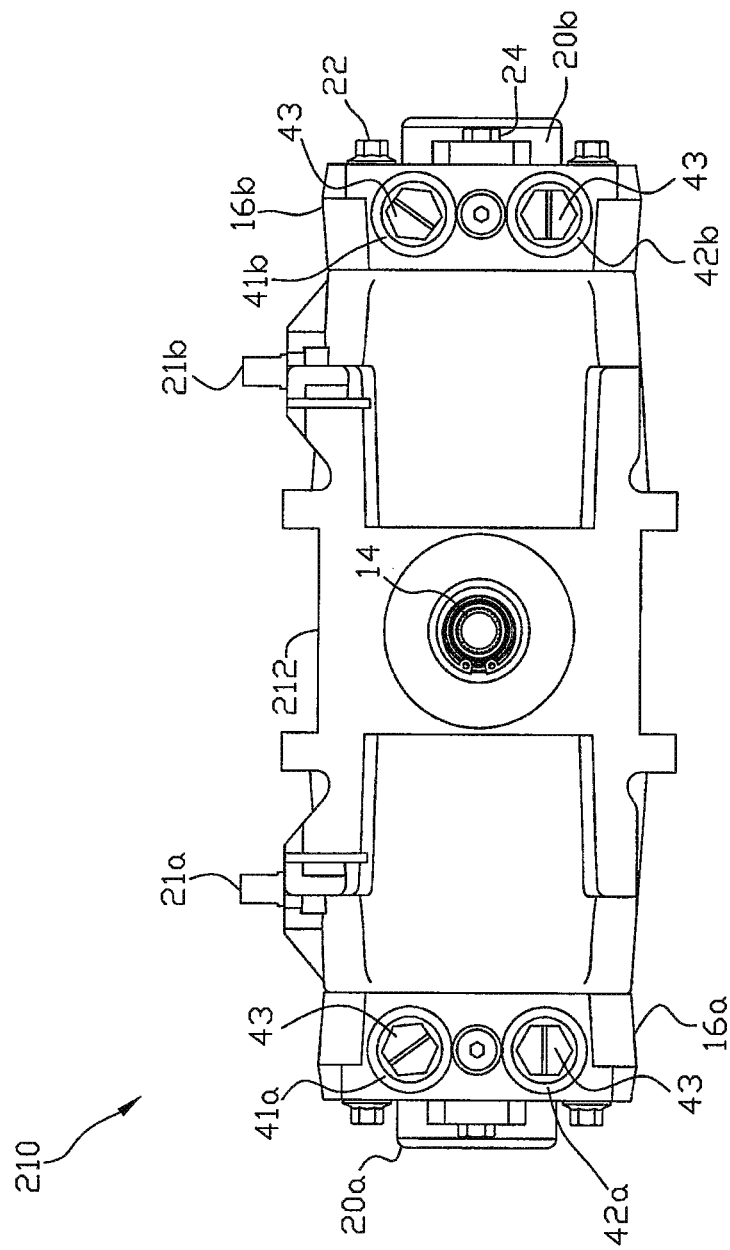
FIG. 15 is a top plan view of a further embodiment of this invention.
Figure 16:
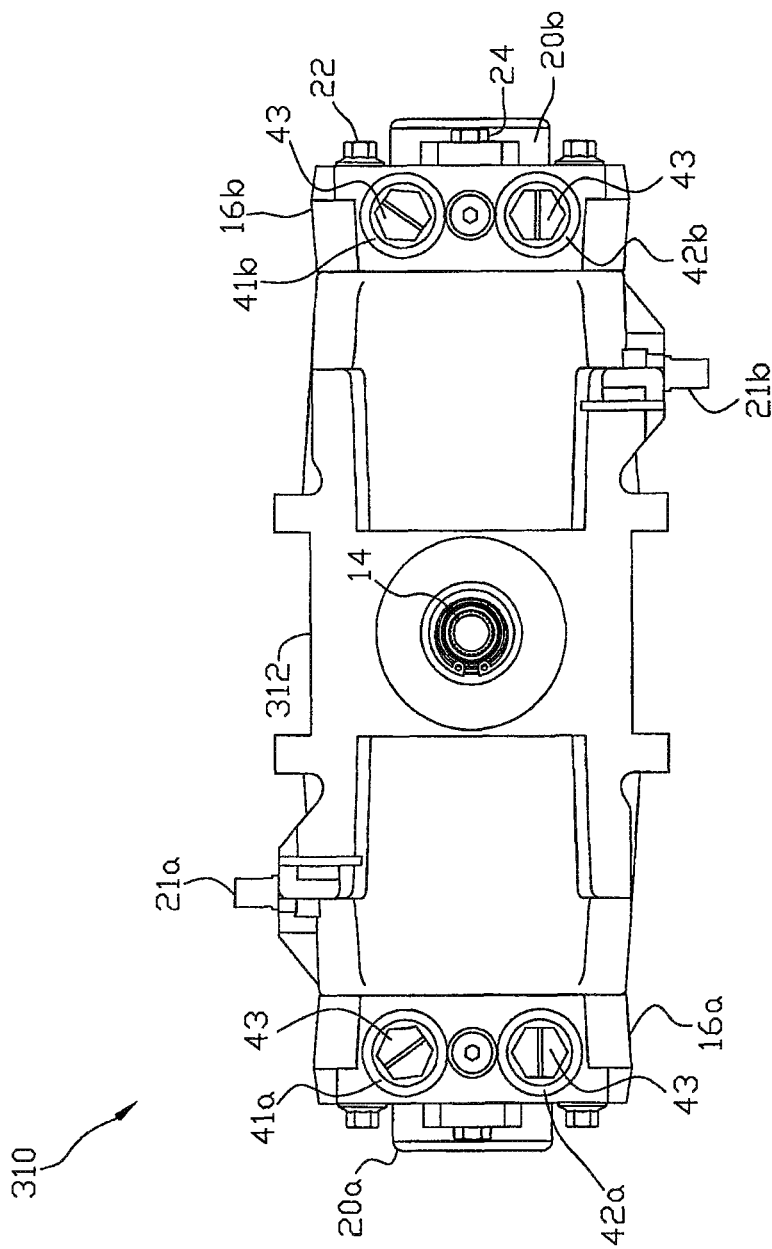
FIG. 16 is a top plan view of yet a further embodiment of this invention.

Specifically, a view of such an embodiment is shown in FIG. 15, where pump apparatus 210 includes a slightly modified housing 212, where trunnion arms 21*a* and 21*b* are mounted on the same side of housing 212, but at a 90 degree angle from input shaft 14, so that trunnion arms 21*a* and 21*b* are perpendicular to both the two pump shafts 27 and 28 and input shaft 14. FIG. 16 shows a slightly modified embodiment pump apparatus 310, where trunnion arms 21*a* and 21*b* are mounted on opposite sides of housing 312. These changes are helpful to ensure that the unit can be installed in a wide variety of applications. For example, different vehicle applications use different linkages, and the ability to modify the pump housing in such manners affords the user maximum flexibility. It will also be understood that other types of swash plates 32*a* and 32*b*, such as a trunnion mounted swash plate, could also be used.

Another area where this invention provides increased flexibility is in the possible locations of the system ports. For example, in the embodiment depicted in FIG. 12, system ports 105 are located on the side of end cap 96*a* adjacent to mounting flange 110. In these embodiments, system ports 105 are parallel to the longitudinal axis of input shaft 94. This is in contrast to, e.g., the embodiments shown in FIGS. 1 and 9, where system ports 41*a*, 41*b*, 42*a* and 42*b* are formed in end caps 16*a* and 16*b*, respectively, so as to be perpendicular to input shaft 14. These different embodiments again increase the flexibility afforded to the user of this design, so that it may be used in a wide variety of vehicles or other applications.

Figure 14:
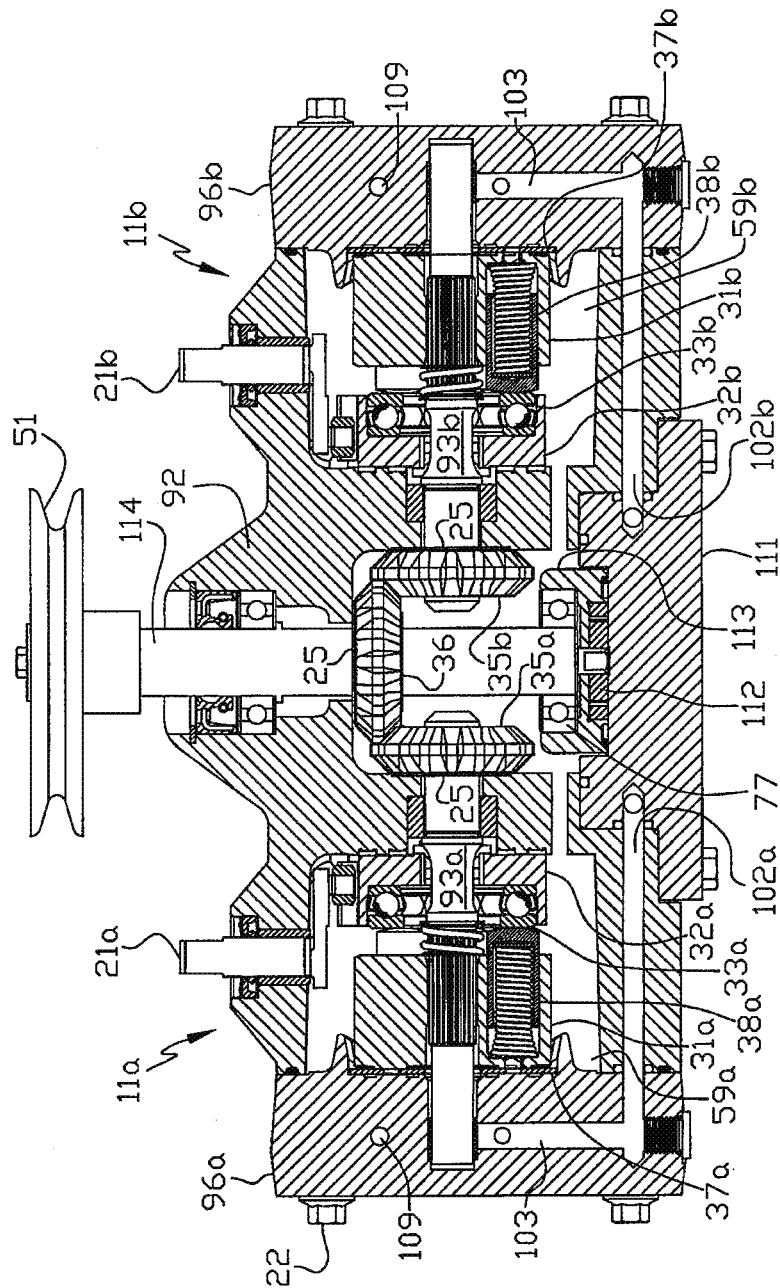
FIG. 14 is a cross-sectional side view of a sixth embodiment of the present invention.

FIG. 14 shows an alternative embodiment similar to that shown in FIG. 10, except that charge pump 112 is mounted on the inside of cover 111, and thus inside the fluid sump formed inside housing 92. Cover 113 is formed to mount not only charge pump 112 but also bearing 77 for input shaft 114. Porting similar to that shown in FIG. 11 will be formed in cover 111 to connect to ports 102*a* and 102*b*.

The tandem pump arrangements discussed above could be used in a module for installation in a vehicle such as a tractor, riding lawn mower or the like. Such uses are exemplary, as other uses of the pump and motor modules disclosed herein will be obvious to one of skill in the art. The module may be a pump apparatus and a pair of wheel motors, or a pump apparatus and an engine, or a pump apparatus with both the wheel motors and the engine, depending on the application. Various embodiments of the modules in accordance with the present invention are depicted in the drawings attached hereto as FIGS. 17 to 60. These embodiments are discussed in detail below; the details of the pump apparatus used in the various modules are not discussed with respect to the figures. Many elements of the vehicle and modules depicted in the different embodiments discussed below are identical or substantially identical to previously described elements and in such cases are given identical reference numerals.

It will be understood by those of skill in the art that various embodiments of hydraulic pumps, such as are described herein with respect to FIGS. 1-16, can be used in connection with these modules.

FIGS. 17 through 24 show a first embodiment of such a module 115 in accordance with the present invention.

Figure 25:
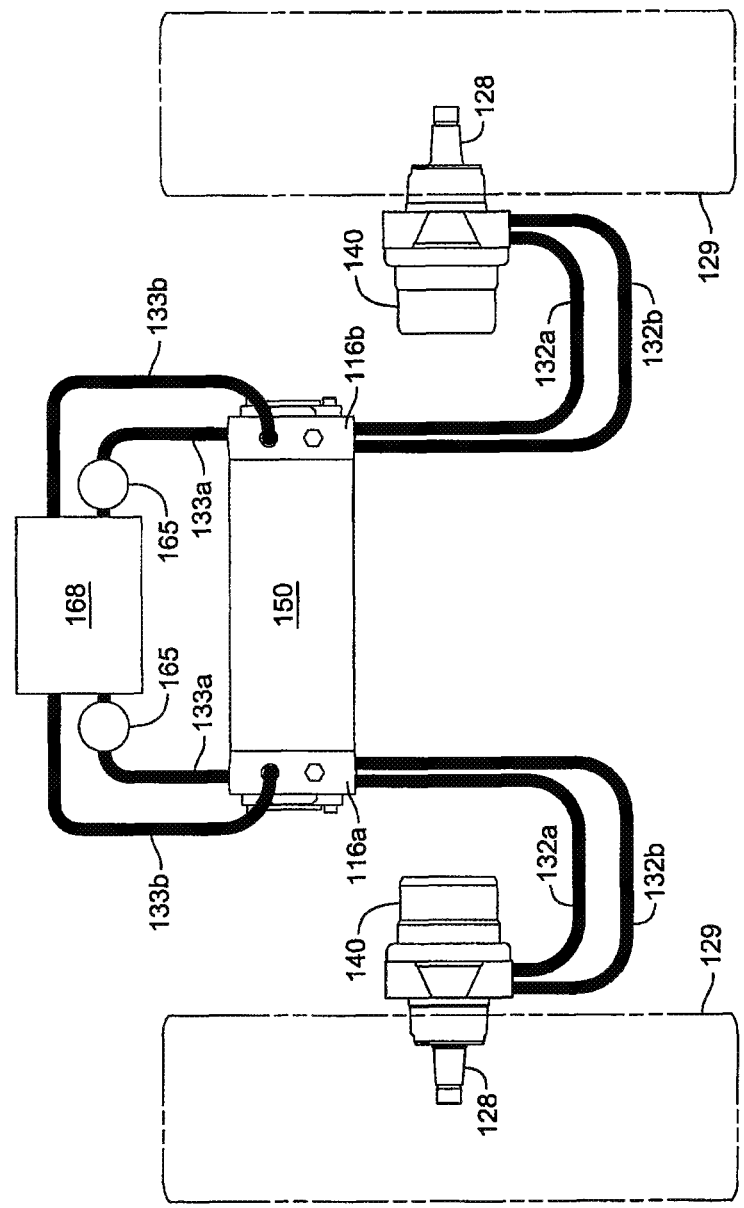
FIG. 25 is a partial schematic view of an arrangement of a dual pump module in accordance with an embodiment of this invention for use in a vehicle.
Figure 26:
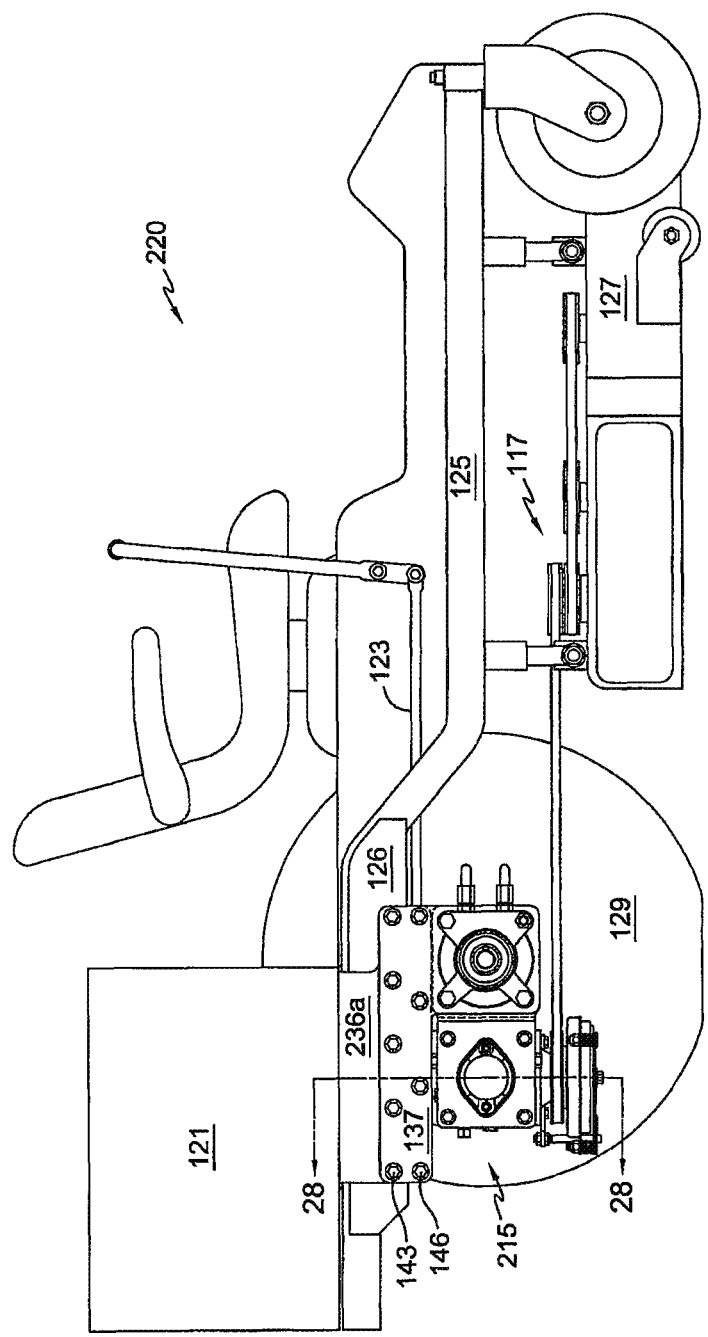
FIG. 26 is a side elevational view of a vehicle in accordance with another embodiment of this invention.
Figure 27:
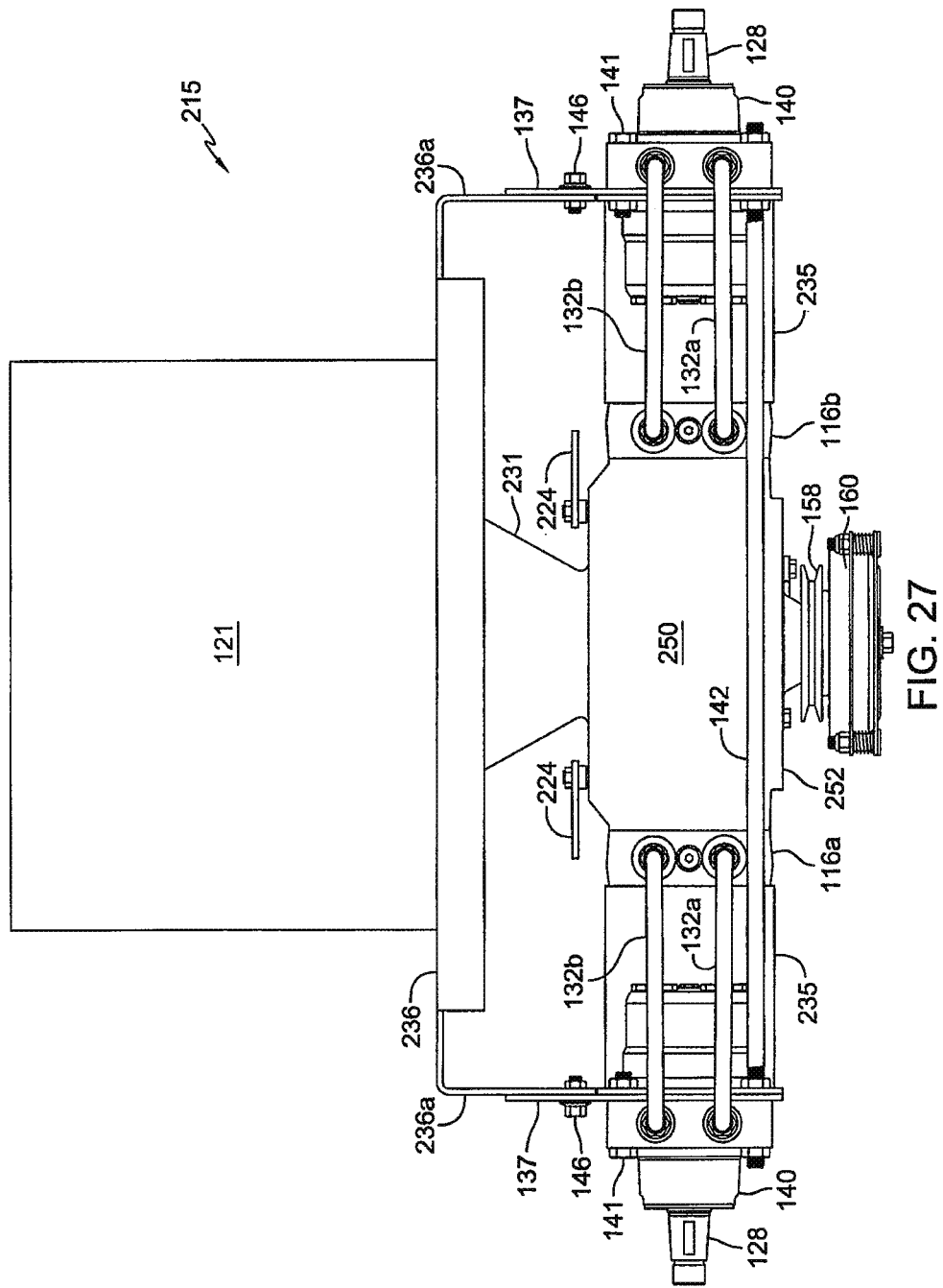
FIG. 27 is a front elevational view of the dual pump module shown in FIG. 26.
Figure 28:
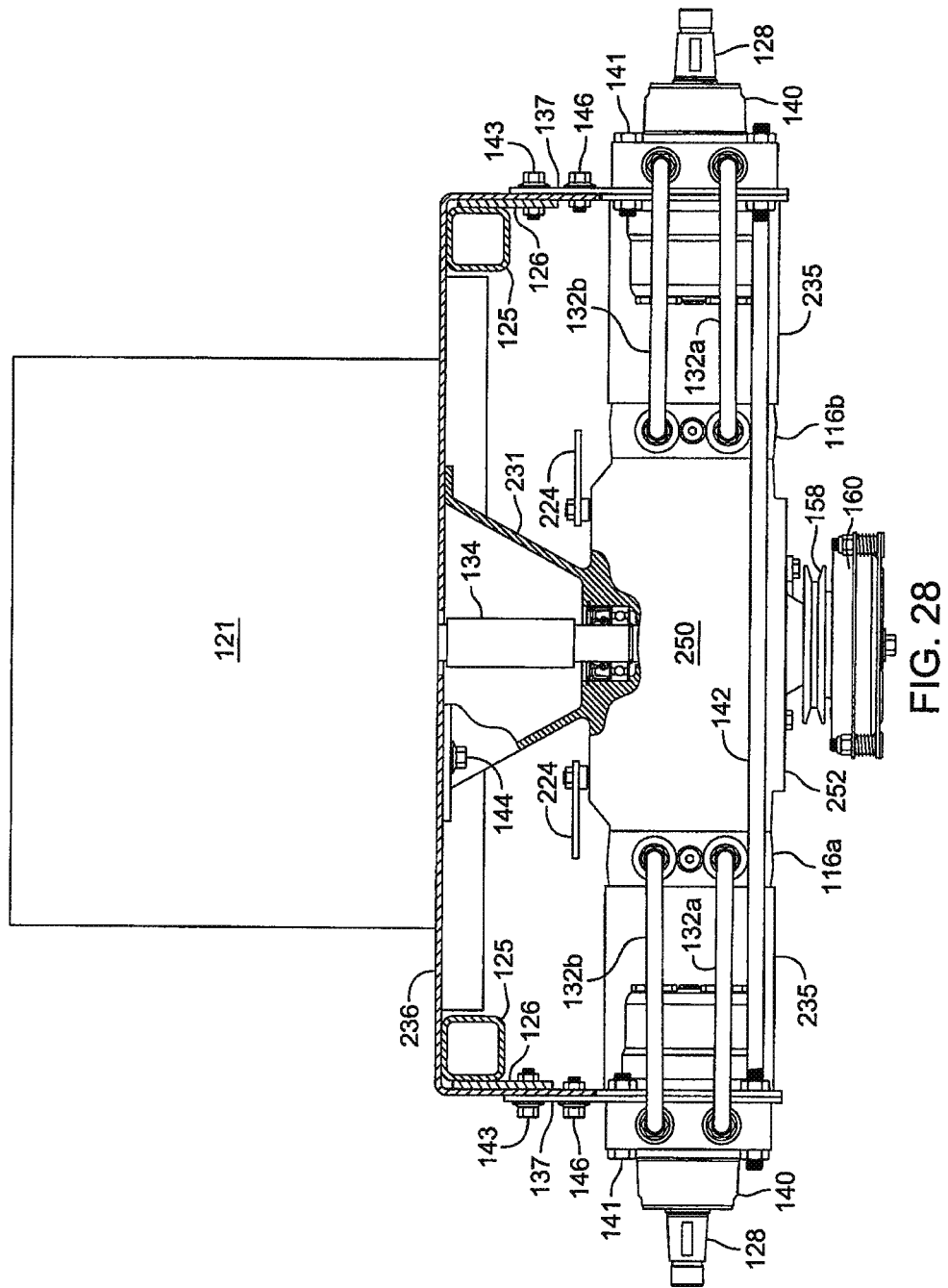
FIG. 28 is a front, partially sectioned elevational view of the installed dual pump module shown in FIG. 26, along the lines 28-28.
Figure 29:
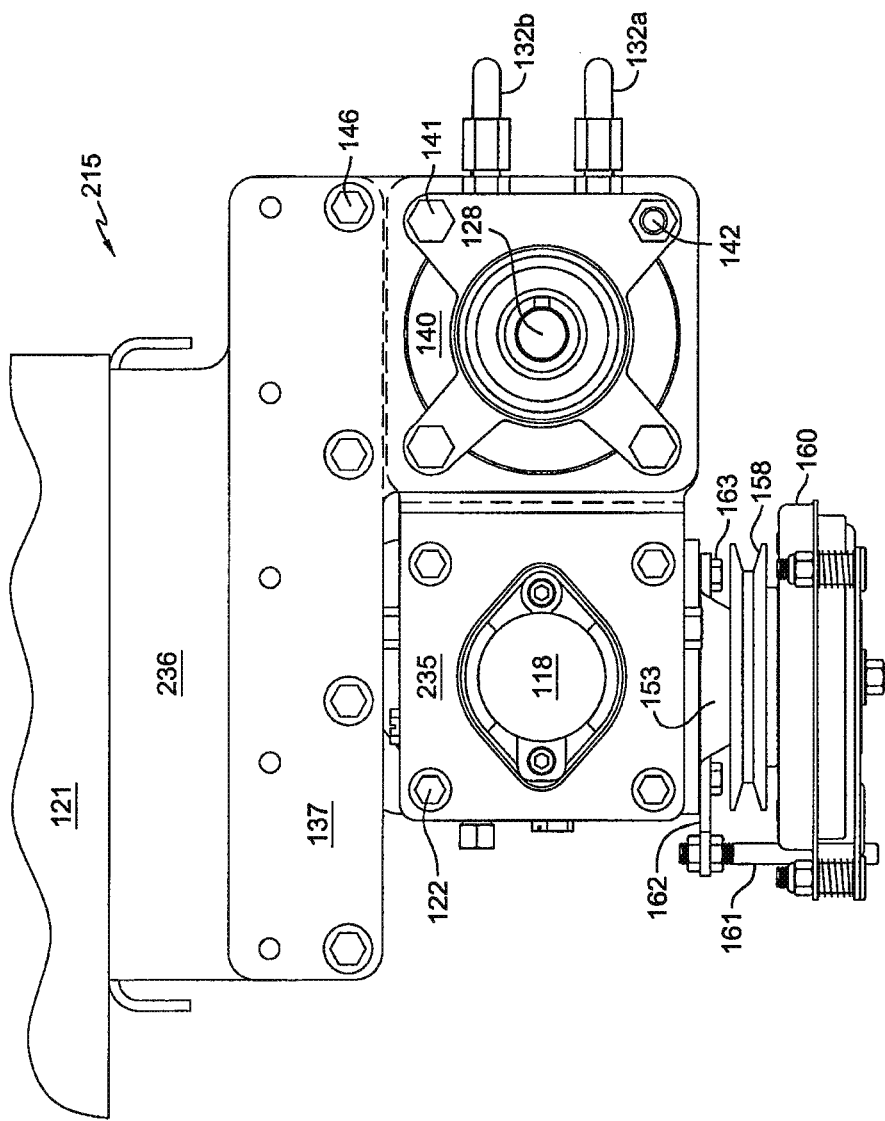
FIG. 29 is a side elevational view of the dual pump module shown in FIG. 26.
Figure 30:
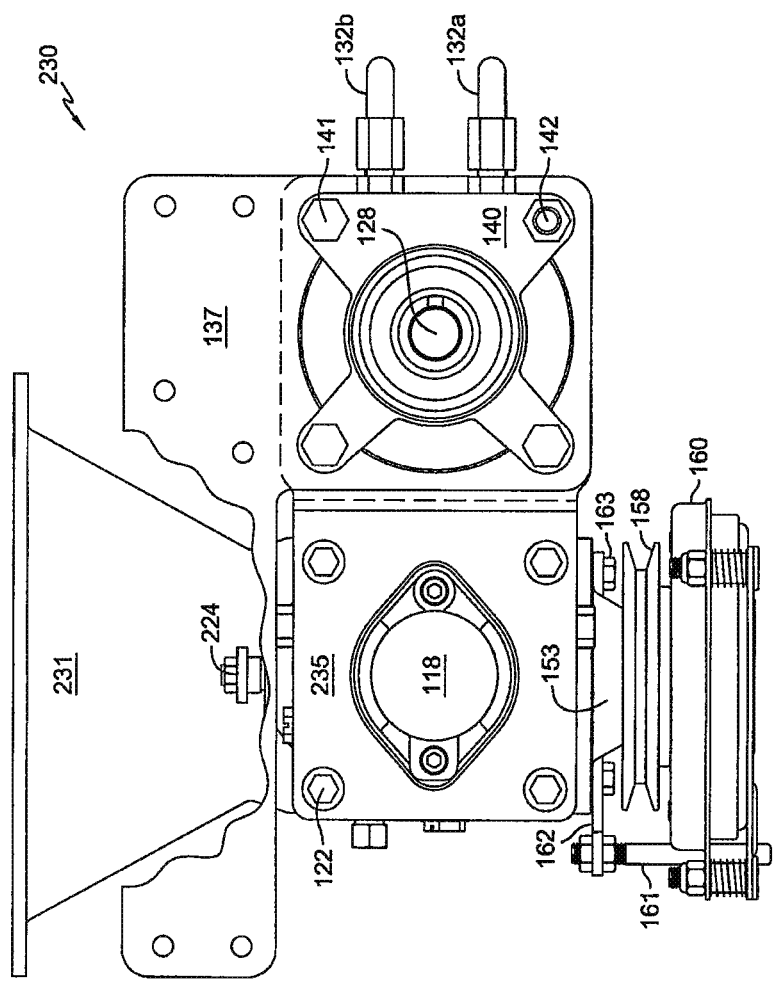
FIG. 30 is a side elevational view of the basic dual pump module shown in FIG. 29 without an engine attached and with a portion of one of the brackets removed for clarity.
Figure 31:
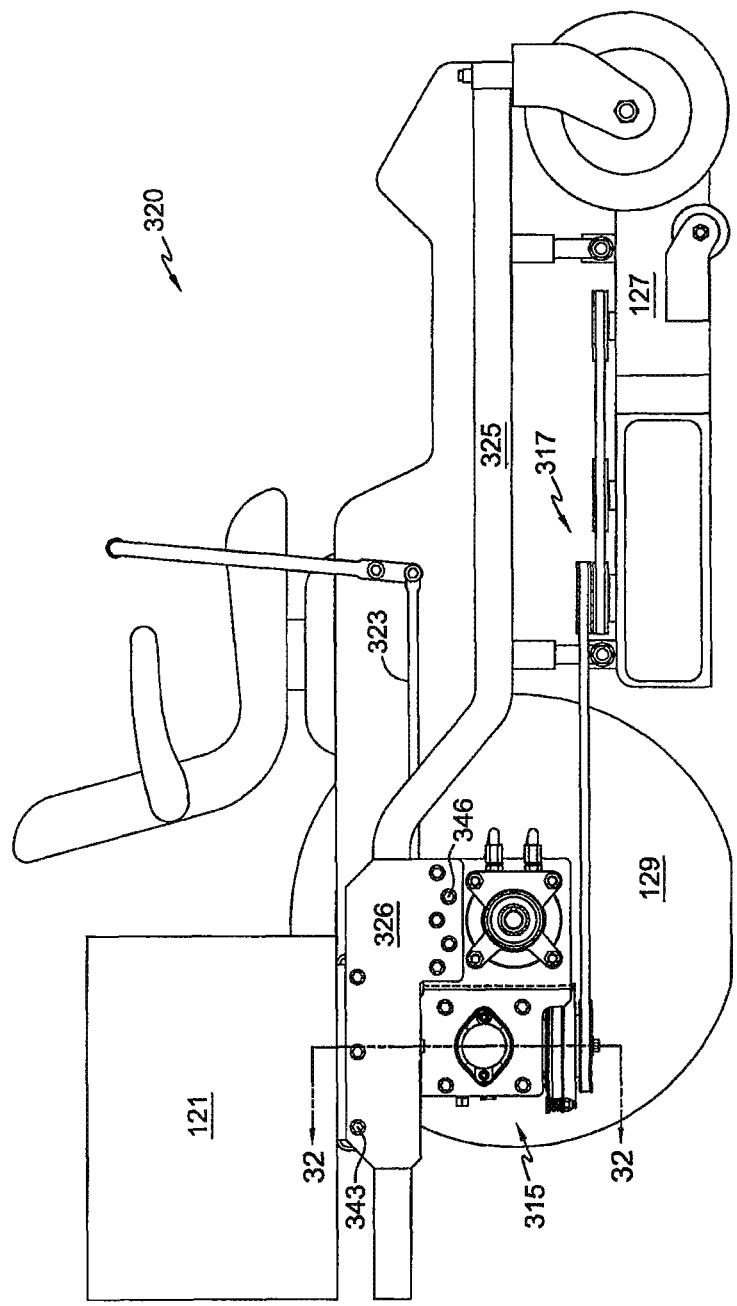
FIG. 31 is a side elevational view of a vehicle having a bracket-mounted dual pump module with an engine in accordance with a further embodiment of this invention.
Figure 32:
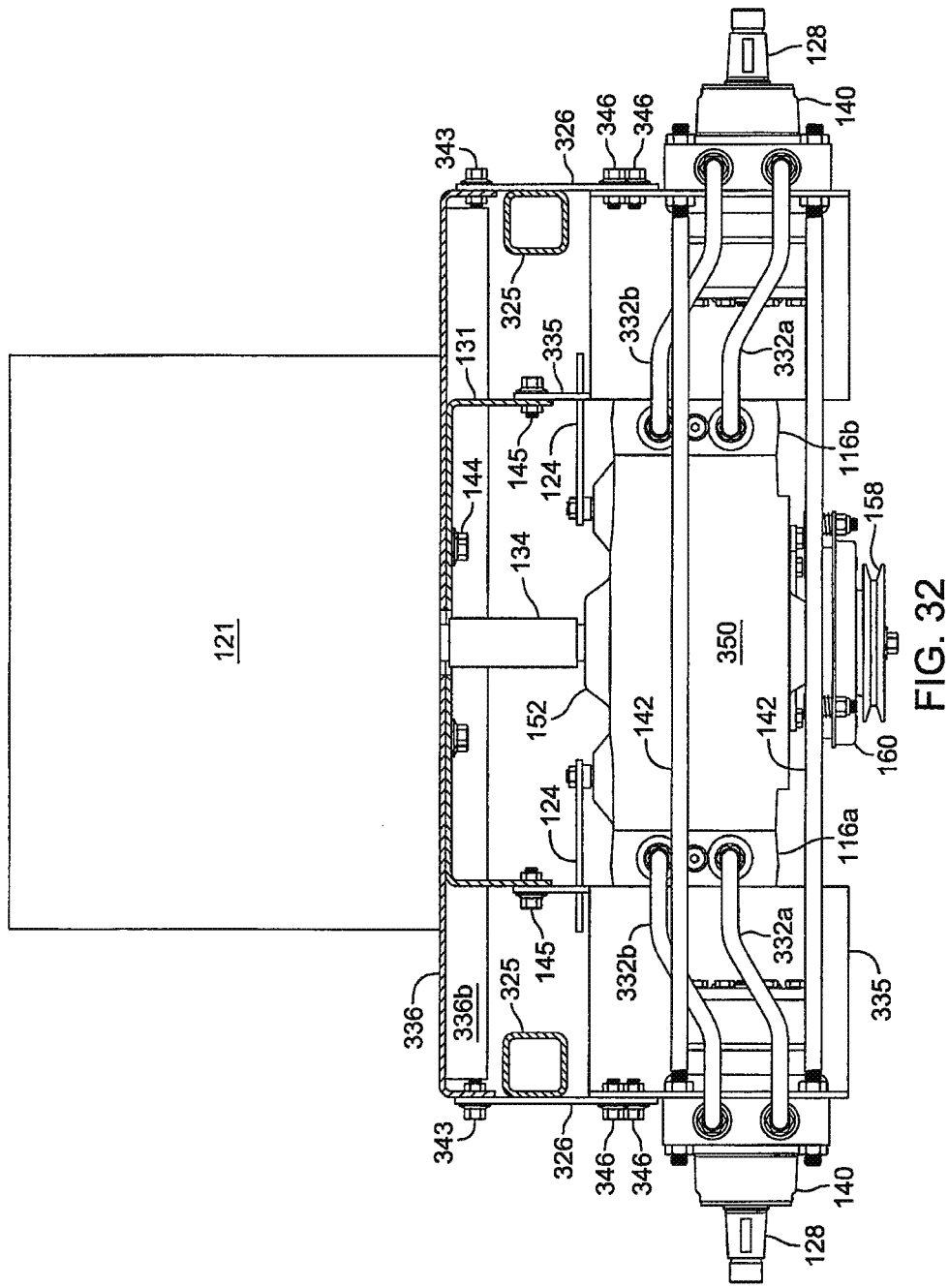
FIG. 32 is a front, partially sectioned elevational view of the installed bracket-mounted dual pump module shown in FIG. 31, along the lines 32-32.

Vehicle 120 comprises a frame 125, control mechanism 123, mower deck 127, deck drive system 117 and prime mover 121. Other known elements of such exemplary vehicles are not critical to this invention and will not be described herein. One rear wheel 129 and other elements are removed from FIG. 17 for clarity. FIG. 25 is a partial schematic view of an arrangement of a dual pump module in accordance with an embodiment of this invention for use in a vehicle.

Figure 18:
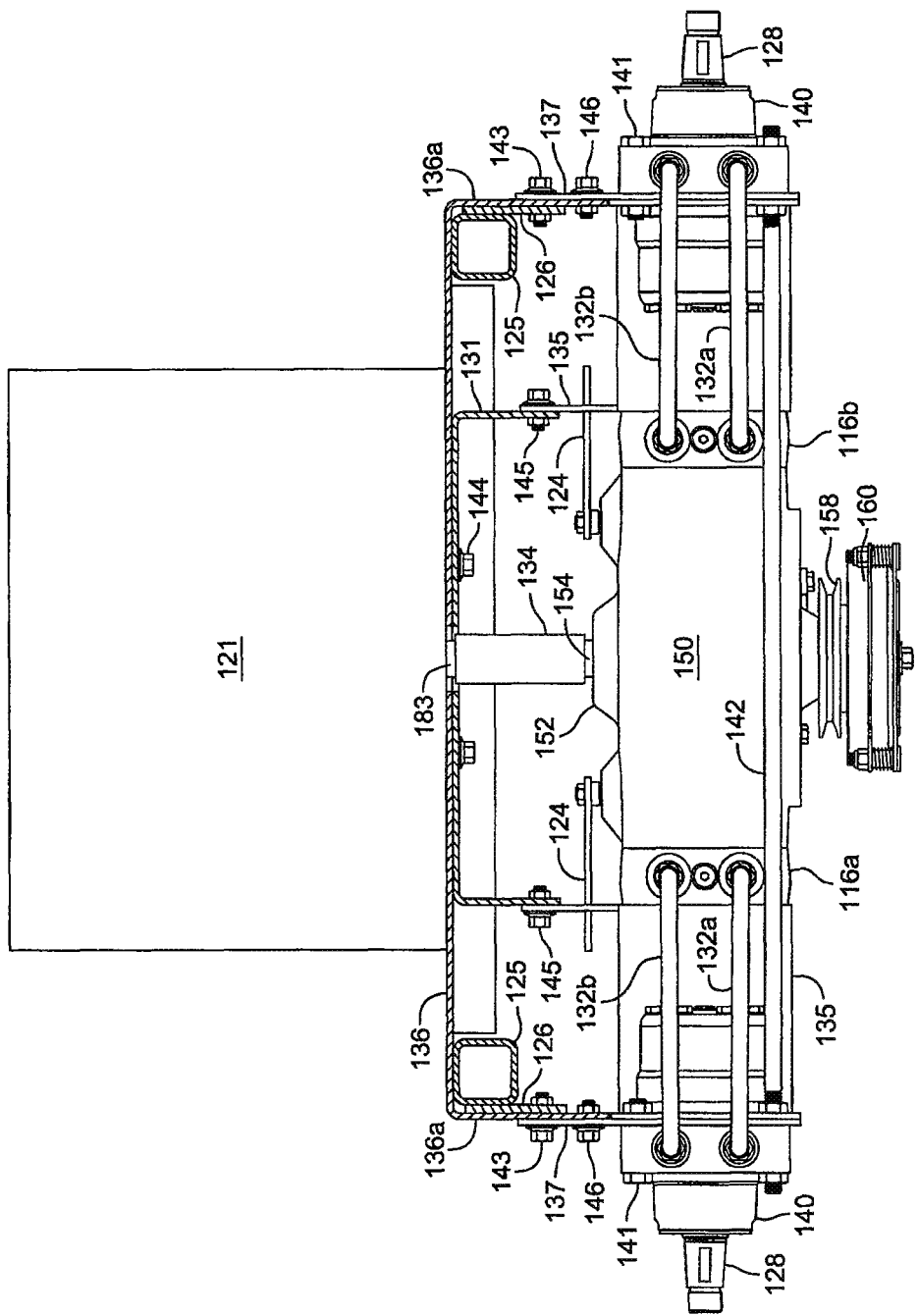
FIG. 18 is a front, partially sectioned elevational view of the installed bracket-mounted dual pump module shown in FIG. 17, along the lines 18-18.

As shown in FIG. 18, drive module 115 is secured to vehicle frame 125 in a manner to be described below. As shown in FIGS. 19 to 24, drive module 115 comprises a prime mover or engine 121, a mounting platform 136, a pump mounting bracket 131, a pump apparatus 150, a pair of wheel motors 140, a pair of stabilizing brackets 135, a motor mounting bracket 137 and additional elements, some of which will be described in more detail. Each wheel motor 140 has a drive axle 128 extending therefrom to drive its corresponding wheel 129. The details of wheel motors 140 are not critical to this invention and will not be described herein. A known motor design is shown in commonly owned U.S. Pat. No. 6,811,510, the terms of which are incorporated herein by reference. Other motor designs could be used with the modules of the present invention depending on the application. The disclosure herein assumes that both wheel motors are identical, as this is preferred due to issues such as cost and ease of assembly. It will be understood, however, that such identity is not required within the scope of this invention.

In the following discussions, reference may be made to drive modules and hydraulic modules; for example, drive module 115 and hydraulic module 130. A drive module is generally an assembly that may include a hydraulic module, wheel motors, prime mover or engine, and all brackets, fasteners, lines and other elements required to accomplish the drive function for a vehicle. A hydraulic module generally has a pump apparatus, motors or wheel motors, and all other elements required to form a hydraulic subassembly suitable for mounting into a vehicle.

Figure 20:
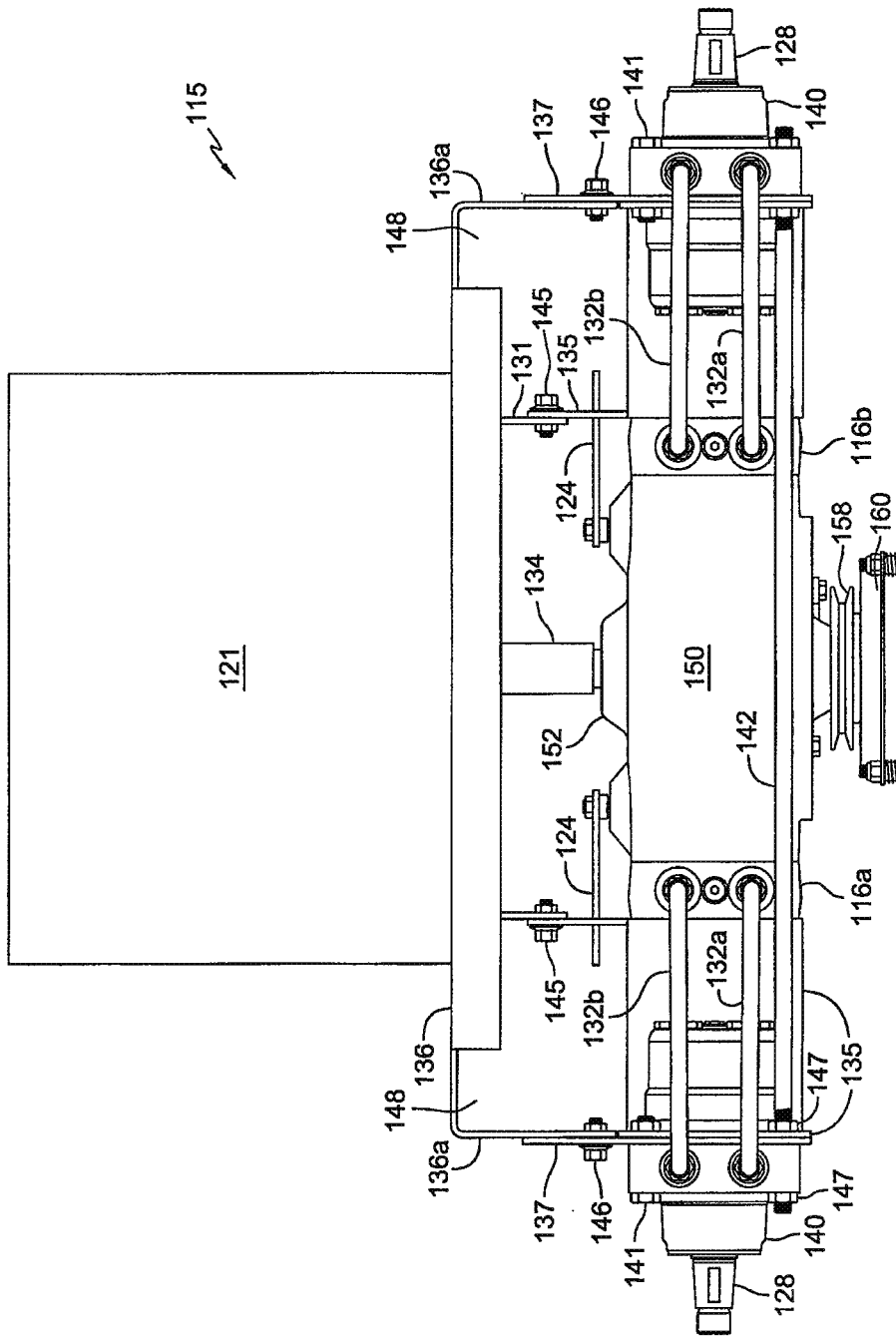
FIG. 20 is a front elevational view of the dual pump module shown in FIG. 17.

As seen most clearly in FIGS. 18 and 20, each motor 140 is connected to a corresponding end cap 116a or 116b of pump apparatus 150 by means of a pair of fluid passages 132a, 132b to provide high and low pressure flow between the pump apparatus 150 and motors 140. As shown most clearly in the schematic view of FIG. 25, additional porting or tubes 133a are used to provide an inlet flow between reservoir 168 and pump apparatus 150, through filters 165. Tubes 133b provide a return flow from pump apparatus 150 to reservoir 168.

The embodiment depicted in these figures is of the direct drive type, where coupler 134 connects engine output 183 to pump input shaft 154. Output pulley 158 is mounted on the opposite side of pump shaft 154 and is used to engage and drive deck drive system 117 and mower deck 127. An electric clutch 160 may optionally be used to control this engagement.

A series of brackets are used to connect the various elements of module 115. In the embodiment depicted in FIGS. 17 to 24, these brackets include mounting platform 136, pump mounting bracket 131, stabilizing brackets 135, mounting plates 126, motor mounting bracket 137, and crossbar stabilizer 142. Stabilizing bracket 135 is shown in more detail in FIG. 23, while motor mounting bracket 137 is shown in more detail in FIG. 24. The names given these various brackets are for convenience and should not be read as limiting. As will be understood, these brackets are secured together by fasteners such as bolts 143, 144, 145 and 146; other fastening means could also be used. The number, size and location of the fastening means will be known to those of skill in the art and will depend on the application parameters.

Figure 19:
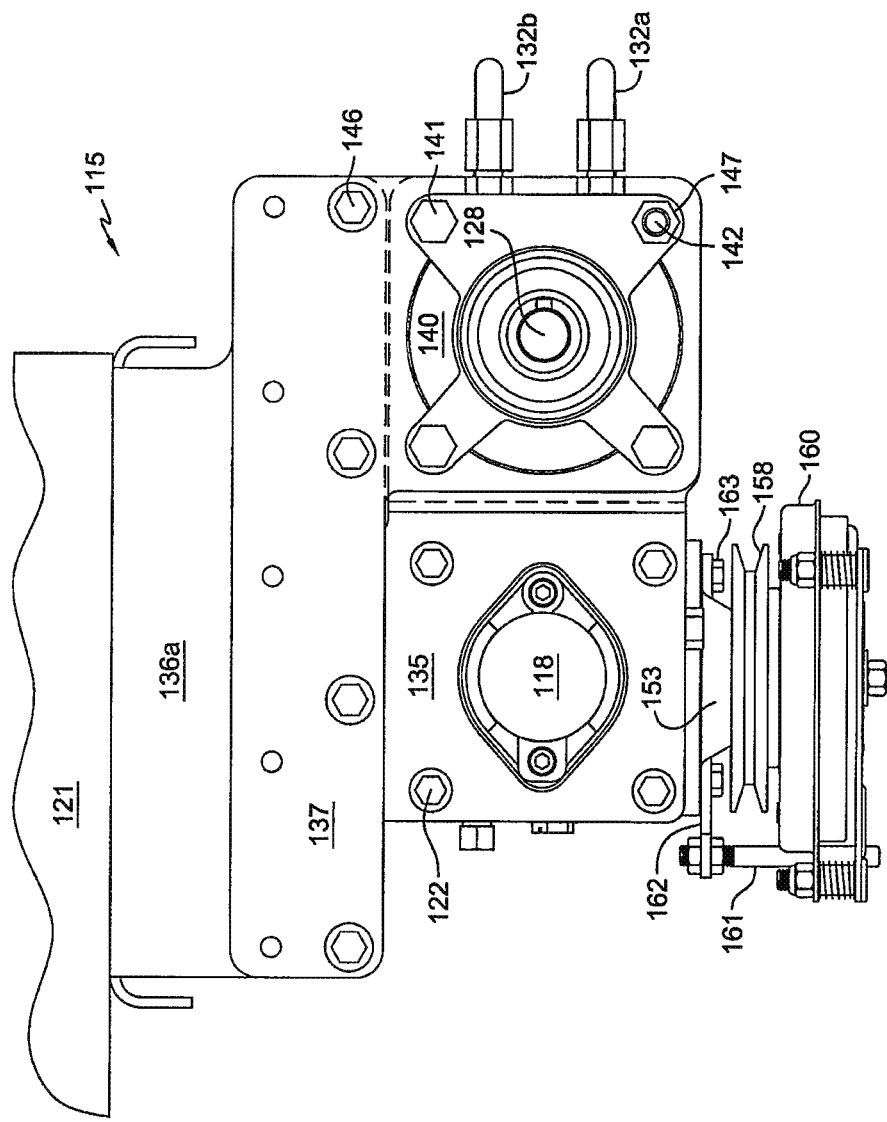
FIG. 19 is a side elevational view of the dual pump module shown in FIG. 17.

In certain situations, the module may require additional stabilizing beyond that provided by the various bracket members. A crossbar stabilizer 142 may be used in such instances, and its opposite ends extend through openings in various brackets and motors 140 that would otherwise be used for fasteners. In FIGS. 18 to 20, for example, stabilizer bar 142 is positioned by nuts 147 between stabilizing brackets 135, and then extends through each bracket 153, through motor mounting bracket 137 and then through motor 140, with another nut 147 to complete the attachment of stabilizer bar 142 to drive module 115.

Engine 121 is positioned on a mounting platform 136 that comprises a generally flat area to which engine 121 is secured by means of mounting fasteners 144. A pair of flanges 136a extending downwardly from either side, which are secured to mounting plates 126 on vehicle 120 frame rails 125 by means of mounting bolts 143. Mounting plate 126 may be formed as a part of vehicle frame 125 or may be attached to vehicle frame 125 by fasteners or other methods, such as welding.

Figure 21:
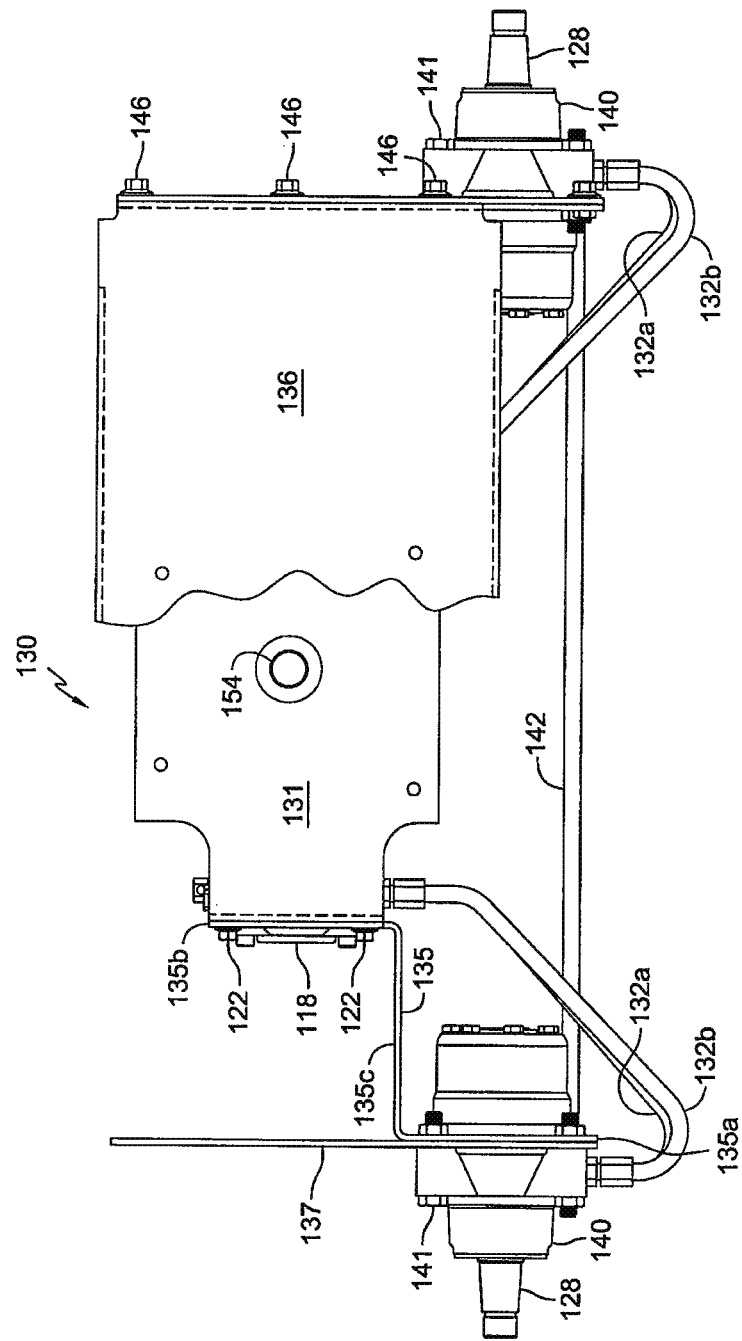
FIG. 21 is a plan view with a partial cutaway of the bracket-mounted dual pump module shown in FIG. 19 with the prime mover removed.
Figure 22:
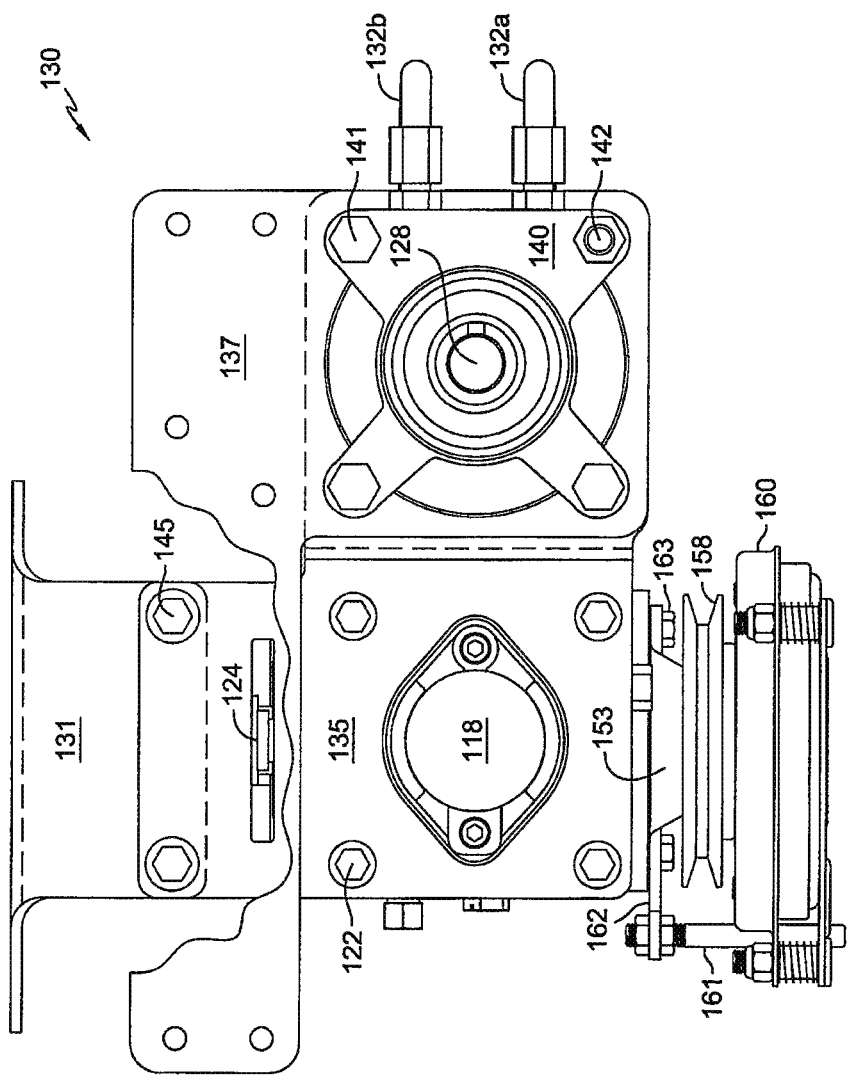
FIG. 22 is a side elevational view of a portion of the dual pump module shown in FIG. 19.

Stabilizing bracket 135 is shown separately in FIG. 23 and from a top view as a part of hydraulic module 130 in FIG. 21. It comprises a first portion 135a for support of one of the hydraulic motors 140 and includes an opening 135d to receive motor 140, a second portion 135b for attachment to one of the end caps 116 of pump assembly 150 and includes opening 135f to receive charge pump cover 118, and a connecting portion 135c joined to both sections 135a and 135b at a generally perpendicular angle. Second portion 135b includes an extended tab having slot 135g formed therein, to permit control arms 124 of pump apparatus 150 to extend therethrough. Portion 135b of stabilizing bracket 135 may be attached to pump apparatus 150 in a variety of locations. In the embodiment shown in FIG. 21, stabilizing bracket 135 is attached to pump module 150 by fasteners 122, which also serve to attach end cap 116 to pump apparatus 150. Openings 135e are formed in stabilizing bracket 135 to allow fasteners 122 to pass therethrough.

Motor mounting bracket 137 is shown separately in FIG. 24 and comprises an opening 137a corresponding to opening 135d to receive motor 140. Motor mounting bracket 137 is secured to motor 140 and stabilizing bracket portion 135a by the insertion of fasteners 141 through motor mounting bracket openings 137b and corresponding stabilizing bracket openings 135h.

Pump mounting bracket 131 is secured to the underside of mounting platform 136. The extended tab portion of stabilizing bracket 135 is attached to pump mounting bracket 131 by fasteners 145 that extend through openings 135j formed in stabilizing bracket 135 and similar openings formed in pump mounting bracket 131.

Also shown in this embodiment is a clutch controlled power takeoff. Pump apparatus is similar to pump apparatus 50 shown in FIG. 5 in that input shaft 154 extends through pump apparatus 150. Adjacent to gear cavity cover 153 is a pulley 158. Shaft 154 extends through pulley 158 into clutch 160, which is shown as an electric clutch. Clutch 160 uses an anti-rotation pin 161 to keep clutch 160 from spinning. Pin 161 may be attached to a bracket 162. Bracket 162 may be attached to pump apparatus 150 by fasteners 163, which also attaches gear cavity cover to housing 152 of pump apparatus 150. Clutch 160 may then be selectively engaged by a vehicle operator to connect shaft 154 to pulley 158, which may then drive a feature such as mower deck 127.

Hydraulic module 130 permits a manufacturer to assemble various elements of pumps and motors, including those shown in FIG. 25, and either attach a prime mover such as prime mover 121 to form drive assembly or module 115, or transport hydraulic module 130 to another location for further assembly. Drive module 115 and hydraulic module 130 provide clearance 148 to permit sliding either drive module 115 or hydraulic module 130 from the rear of vehicle 120 toward the front of a vehicle 120 over frame rails 125 and any associated elements, such as mounting plate 126. Thus, drive module 115 and hydraulic module 130 provide an assembly that can easily be manufactured and transported to a vehicle manufacturer for assembly into a vehicle, reducing vehicle assembly time and costs.

FIGS. 26 to 30 depict another embodiment of this invention, and in particular a vehicle 220 including a drive module 215. As seen most clearly in FIG. 28, a bell housing 231 is integrally formed as part of housing 252 of pump apparatus 250. Bell housing 231 is then secured to the underside of mounting platform 236 by means of fasteners 144 or other fastening means. Stabilizing brackets 235 are used to connect wheel motors 140 with end caps 116a and 116b of pump assembly 250. Crossbar stabilizer 142 is again used to provide additional support and stability. Control arms 224 extend from the top side of dual pump apparatus 250. This embodiment permits a simplified support of pump apparatus 250 as compared to the embodiment shown in FIGS. 17 to 24. Use of bell housing 231 reduces the complexity of drive module 215 as compared to drive module 115, providing additional clearance for vehicle elements that may need to be connected to drive module 215 or may need to pass from one side of module 215 to the other side of module 215. Note that bell housing 231 may be attached directly to prime mover 121 through an opening formed in mounting platform 236 (not shown), or it may be positioned adjacent to the lower surface of mounting platform 236 and attached to mounting platform 236 or to prime mover 121 by fasteners (not shown) that penetrate mounting platform 236 through clearance holes (not shown).

Figure 33:
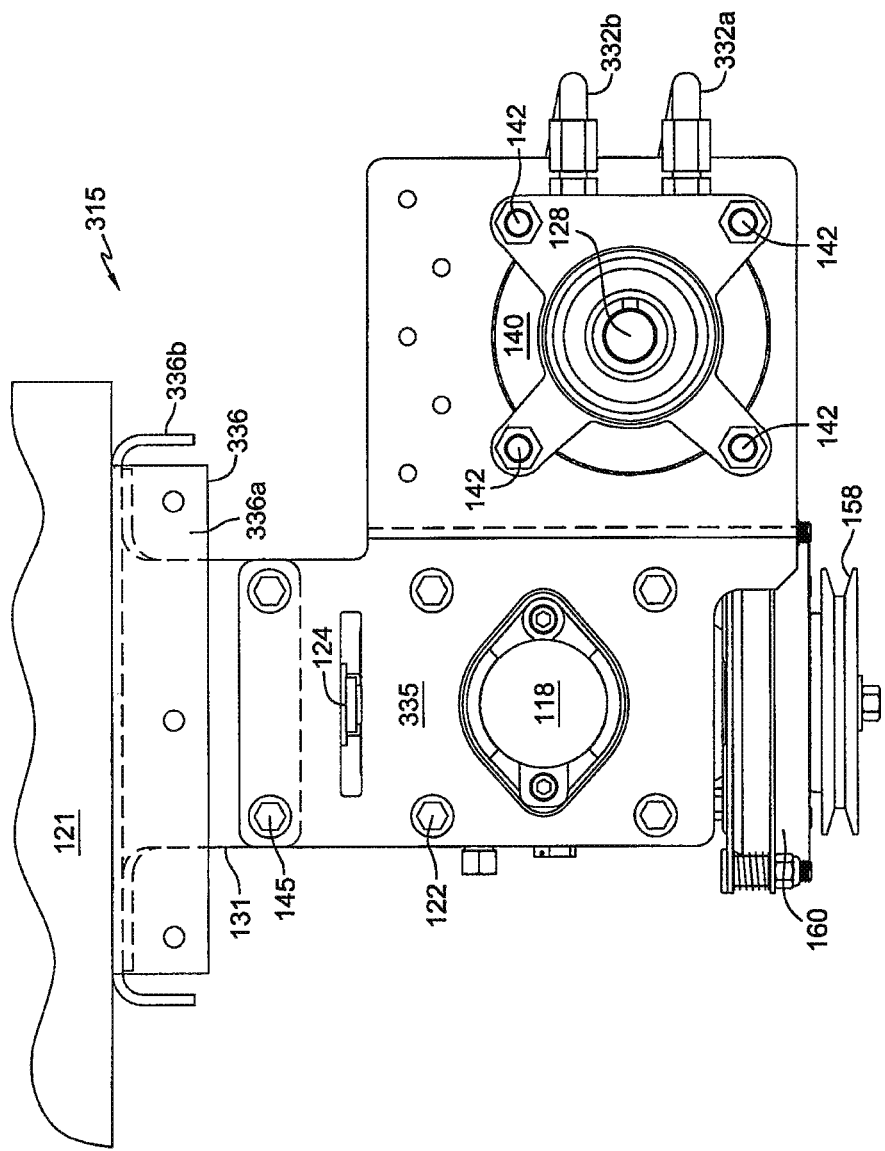
FIG. 33 is a side elevational view of the dual pump module shown in FIG. 31.
Figure 34:
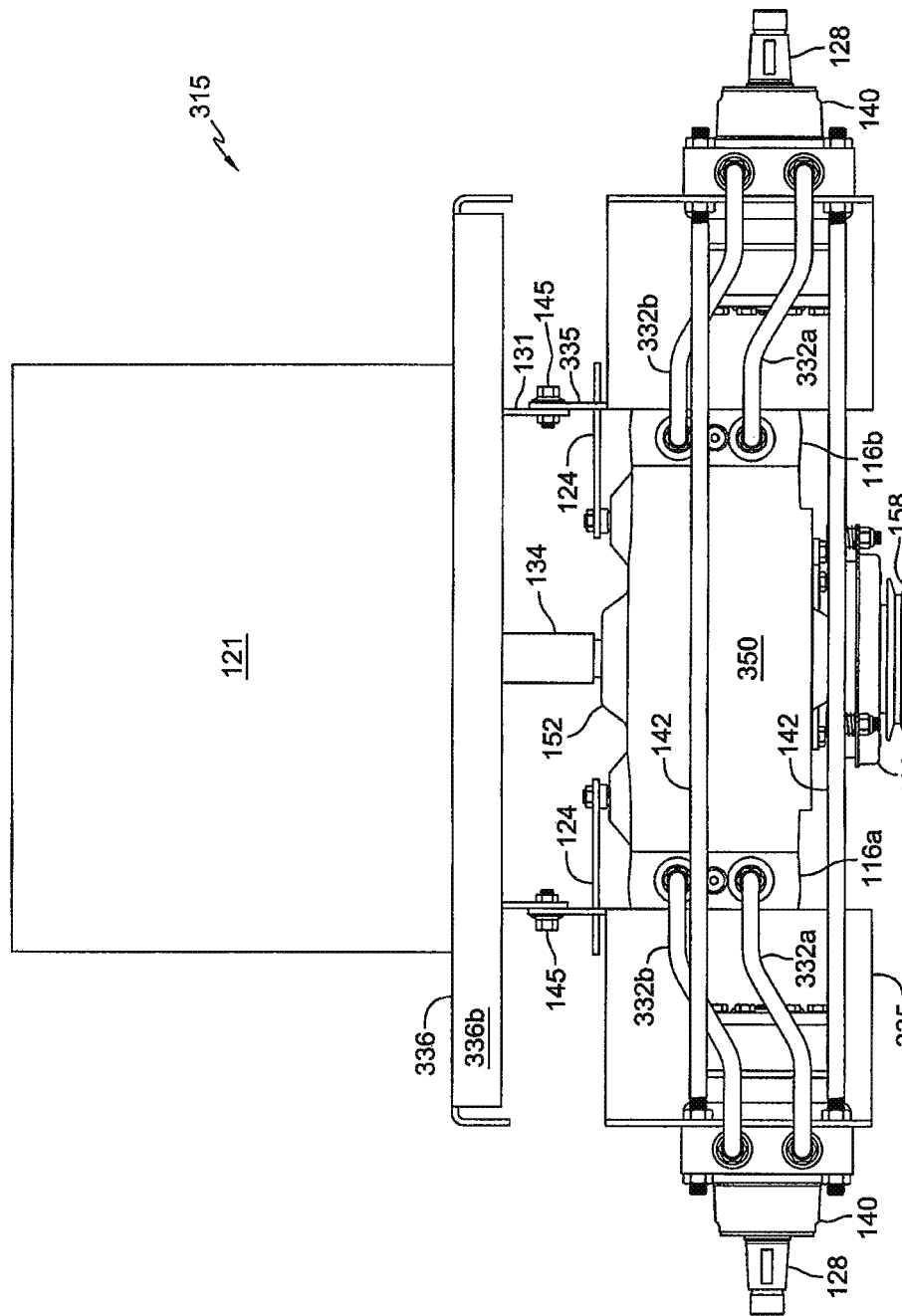
FIG. 34 is a front elevational view of the dual pump module shown in FIG. 31.

A further embodiment of a vehicle 320 having a pump and engine module 315 is depicted in FIGS. 31 to 34. Stabilizing brackets 335 are secured to vehicle 320 frame 325 by attachment to mounting plates 326 with fasteners 346. Mounting platform 336 is also attached to mounting plate 326 by fasteners 343. Stabilizing brackets 335 may also be secured to pump mounting bracket 131 by fasteners 145. As previously described, pump mounting bracket 131 may be attached to prime mover 121 by fasteners 144. As in a previously described embodiment, mounting plate 326 is secured to frame 325 by fasteners or a technique such as welding. Stabilizing bracket 335 may be similar in construction to stabilizing bracket 135 described above. This embodiment demonstrates that wheel motors 140 may be offset lower than pump apparatus 350 with respect to the ground; minor modifications such as to the shape of passages 332a and 332b can be made to accommodate such an offset. Further differences include the location of pulley 158 below electric clutch 160. In addition, four stabilizer bars 142 are used; two are shown in the front view of FIGS. 32 and 34; two more can be located in the corresponding rear positions as shown in FIG. 33. Flanges 336b are formed on the fore and aft sides of platform 336 to provide stiffness to support the weight of engine 121 and resist excessive torquing of vehicle frame.

Figure 35:
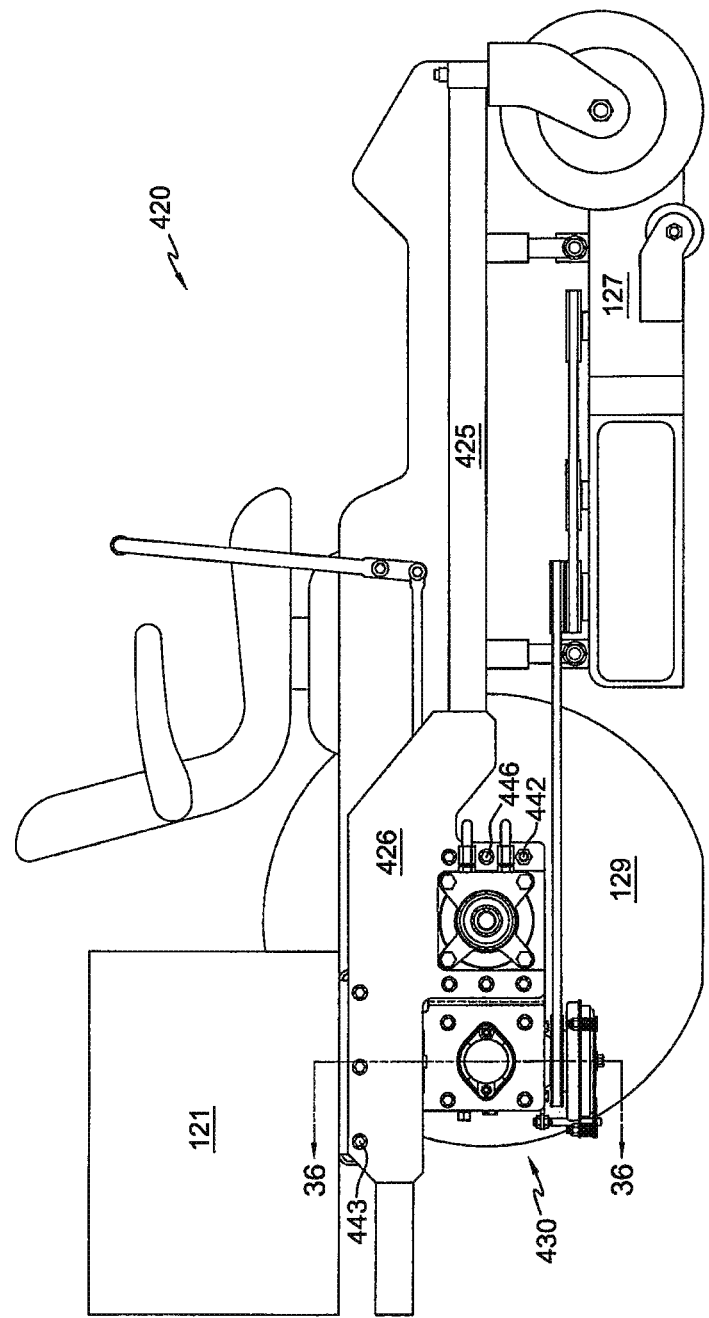
FIG. 35 is a side elevational view of a vehicle in accordance with another embodiment of this invention, including a dual pump module without an engine attached.
Figure 36:
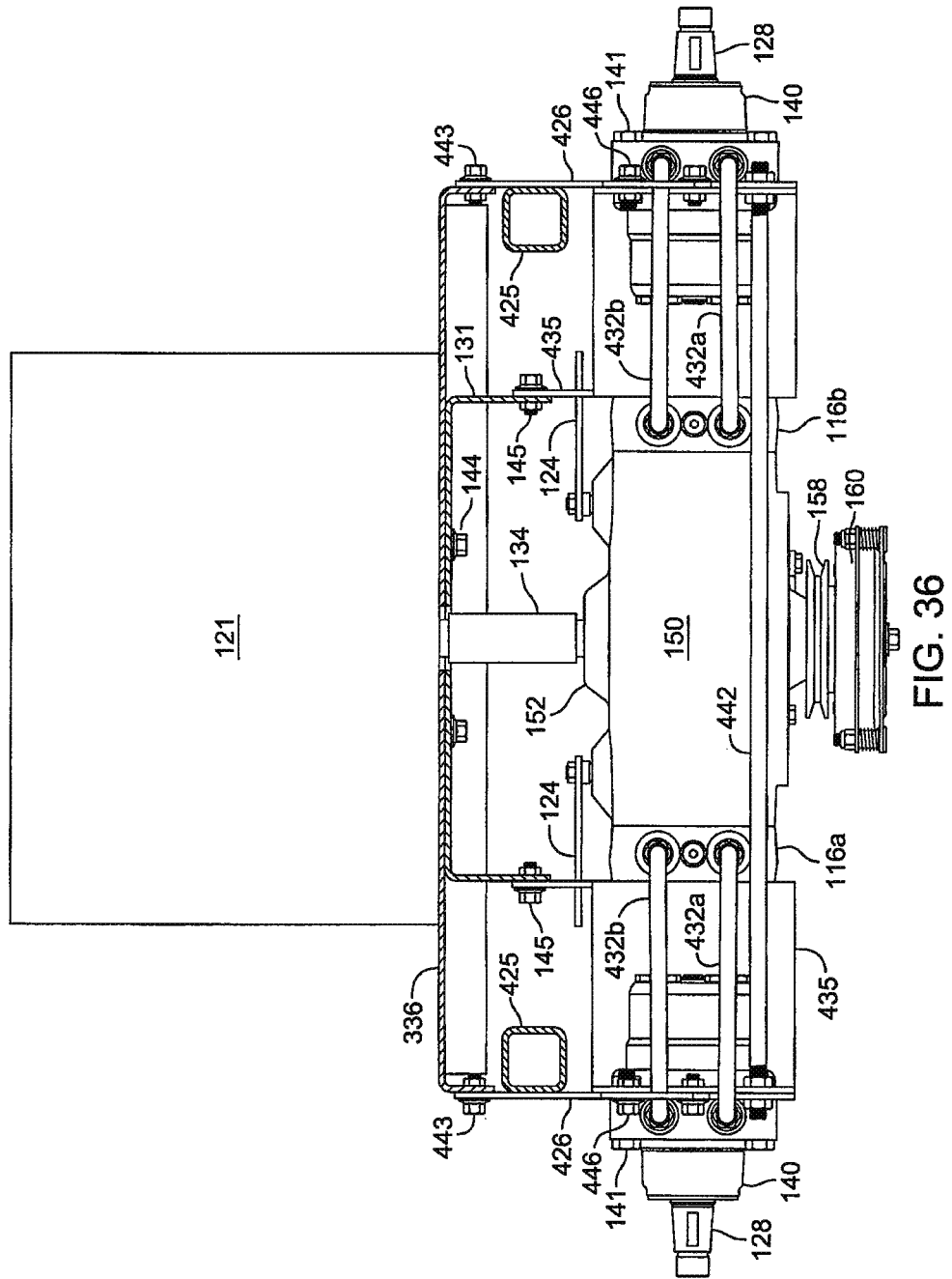
FIG. 36 is a front, partially sectioned elevational view of the installed dual pump module shown in FIG. 35, along the lines 36-36.
Figure 37:
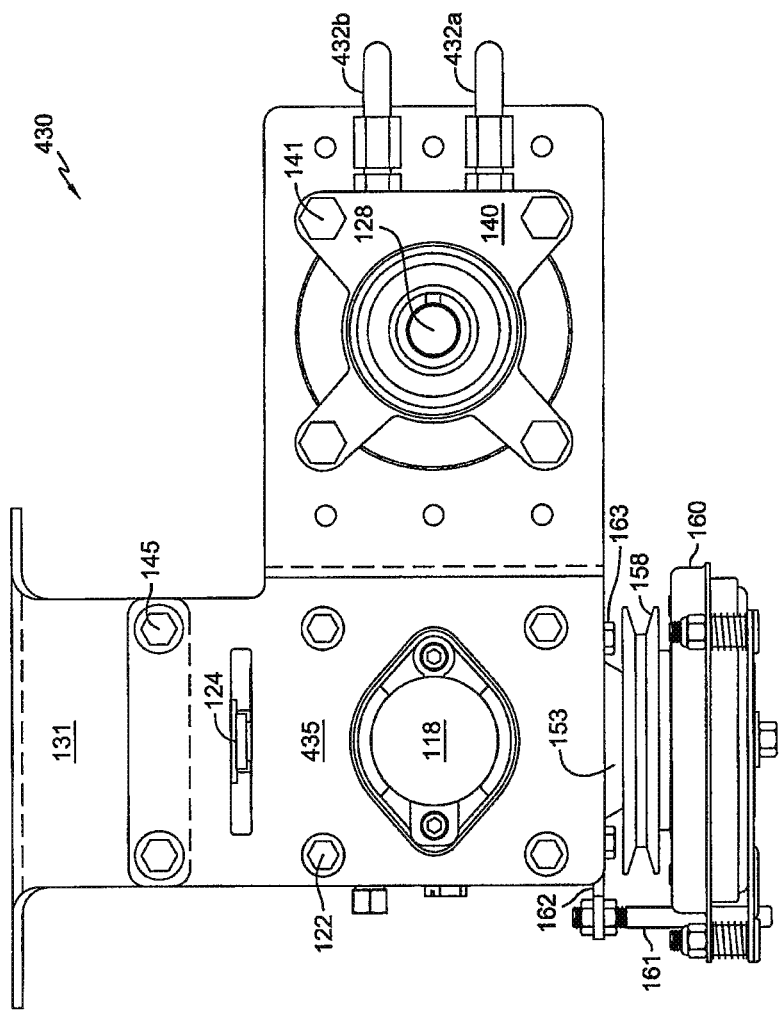
FIG. 37 is a side elevational view of the dual pump module shown in FIG. 35.

Another embodiment is shown in FIGS. 35 to 37, where hydraulic module 430 cannot accommodate a pre-mounted engine and hydraulic module 430 is installed from under chassis 425 and mounting plate 426. This configuration moves engine 121 further to the rear of axles 128 than the previously described embodiments. A more substantial mounting plate 426 is used in this configuration and the wheel motor portion of stabilizing bracket 435 is secured to plate 426 with fasteners 446 and fasteners 141 only mount motor 140 to stabilizing bracket 435. Mounting platform 336 is secured to plate 426 by fasteners 443. One crossbar stabilizer 442 is shown. Fluid passages 432a and 432b are used similar to the prior embodiments.

Figure 38:
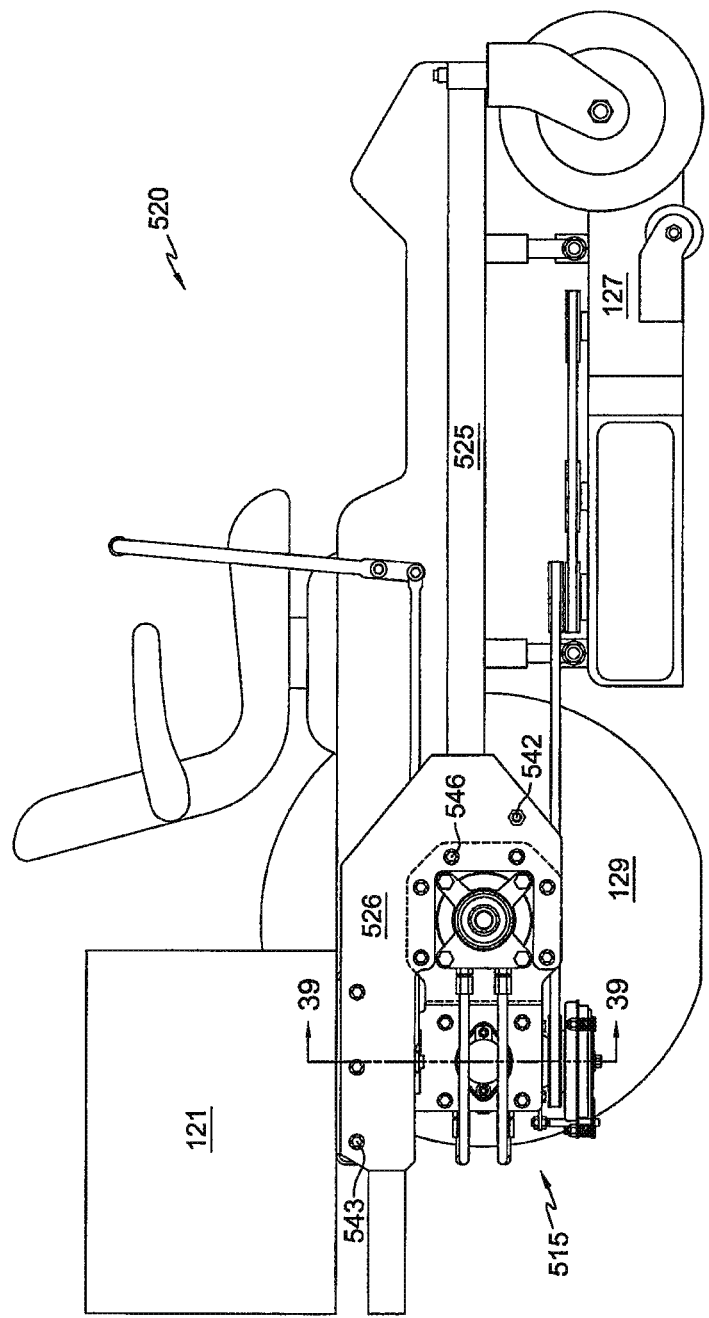
FIG. 38 is a side elevational view of a vehicle in accordance with another embodiment, including a dual pump module with an engine attached.
Figure 39:
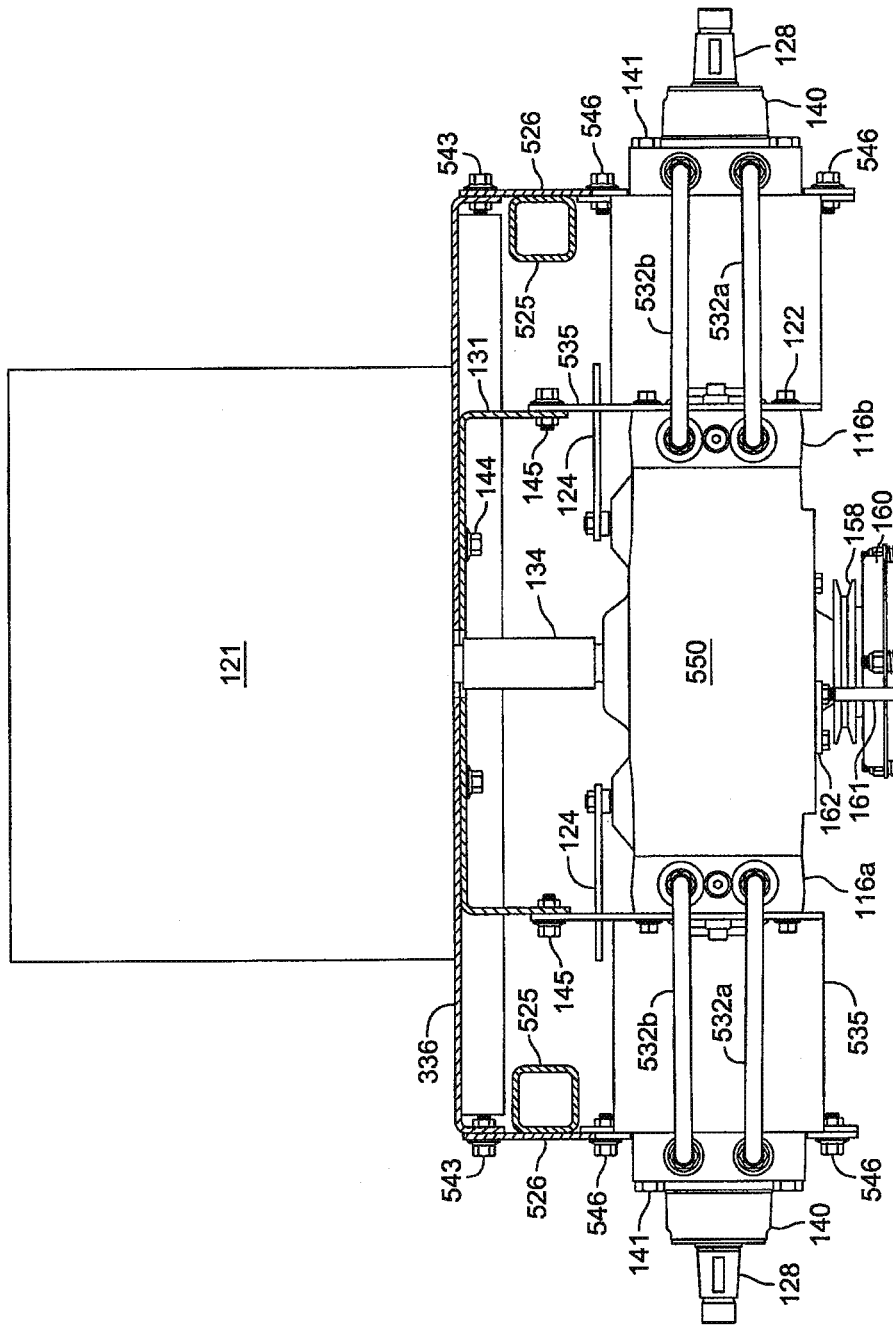
FIG. 39 is a rear, partially sectioned elevational view of the installed bracket-mounted dual pump module shown in FIG. 38, along the lines 39-39.
Figure 40:
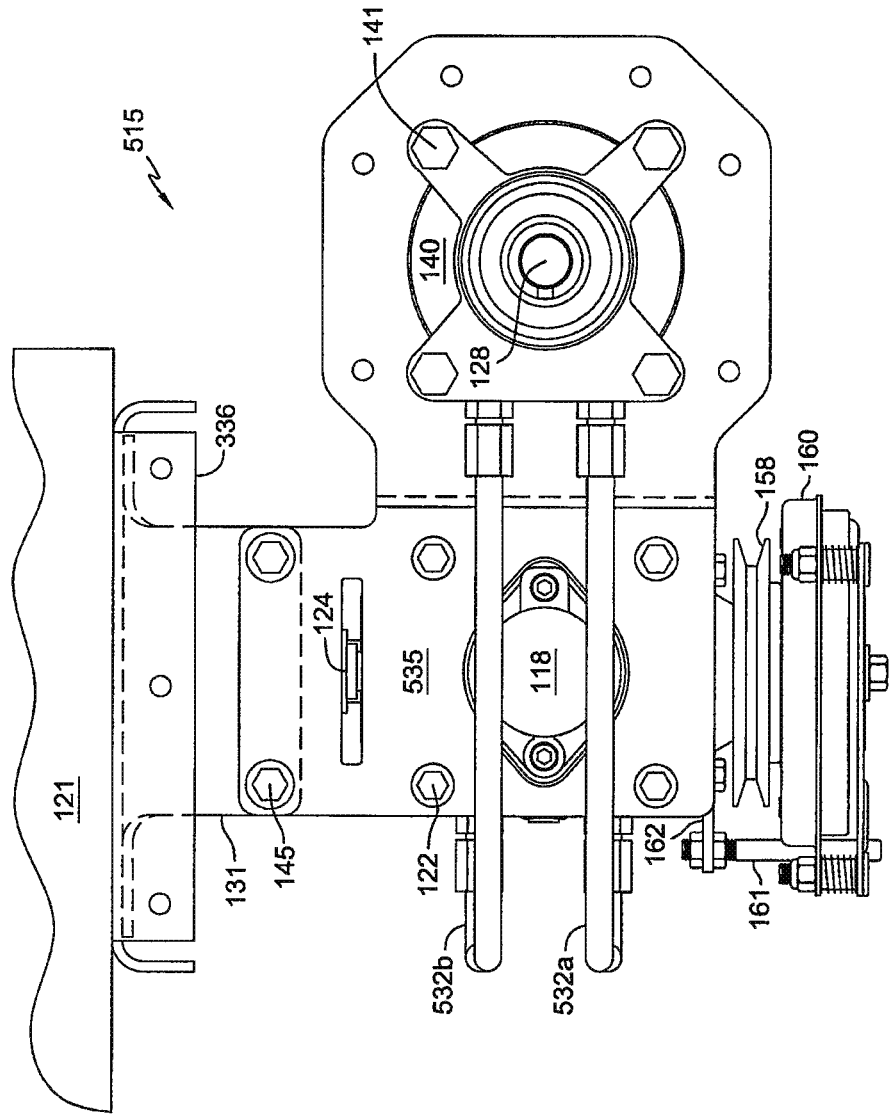
FIG. 40 is a side elevational view of the bracket-mounted dual pump module shown in FIG. 38.

A further embodiment of a vehicle 520 having a drive module 515 mounted thereon is shown in FIGS. 38 to 40. The primary difference between this embodiment and those previously discussed is in the shape of the various brackets and the orientation of the hydraulic lines toward the rear of vehicle 520, to provide better protection and accessibility.

Pump apparatus 550 is attached to stabilizing brackets 535 as are motors 140. This assembly is mounted to vehicle 520 by inserting module 515 into cutouts shown in mounting plates 526 from the rear of vehicle 520. Stabilizing brackets 535 may then be attached to mounting plates 526 by means of fasteners 546 and mounting platform 336 is attached to mounting plates 526 by means of fasteners 543.

A single crossbar stabilizer 542 is provided near the front of module 515 connecting the two mounting plates 526. Additional stabilizer(s) could be used if required for additional stability and frame stiffness. Note that stabilizer 542 is not part of drive module 515.

Figure 41:
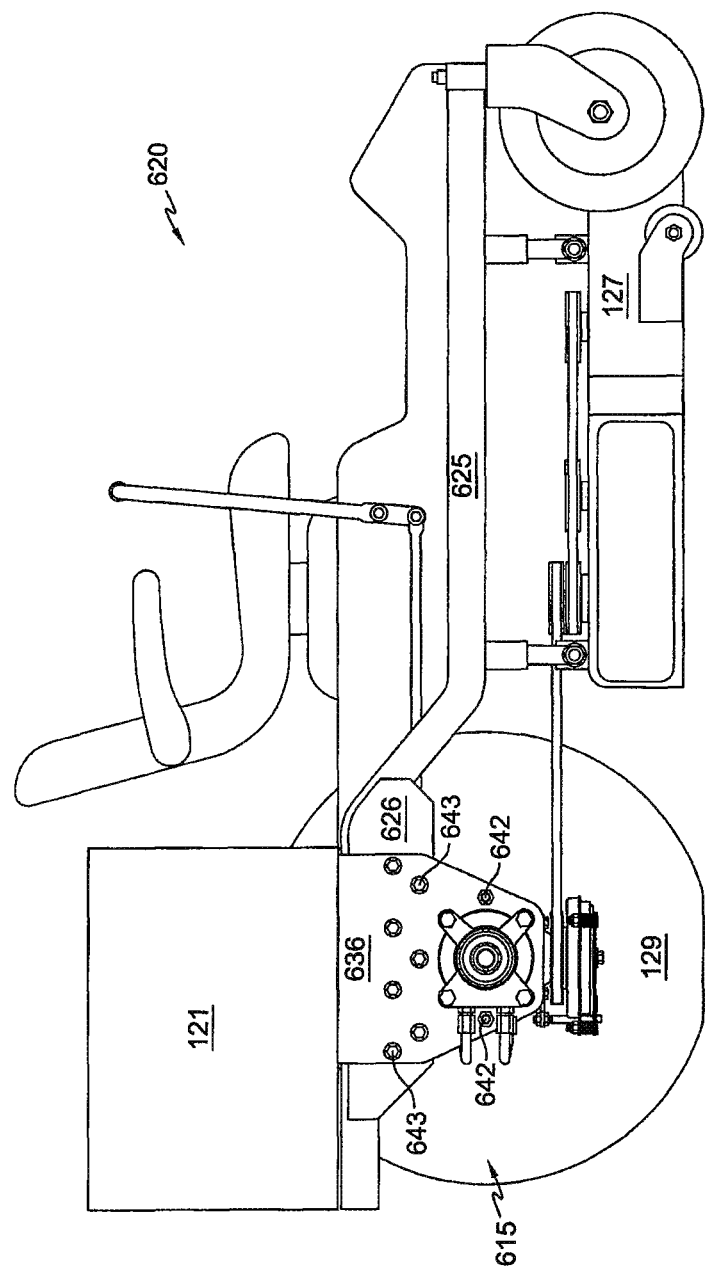
FIG. 41 is a side elevational view of a vehicle in accordance with another embodiment, including a dual pump module which may be installed with or without an engine attached.
Figure 42:
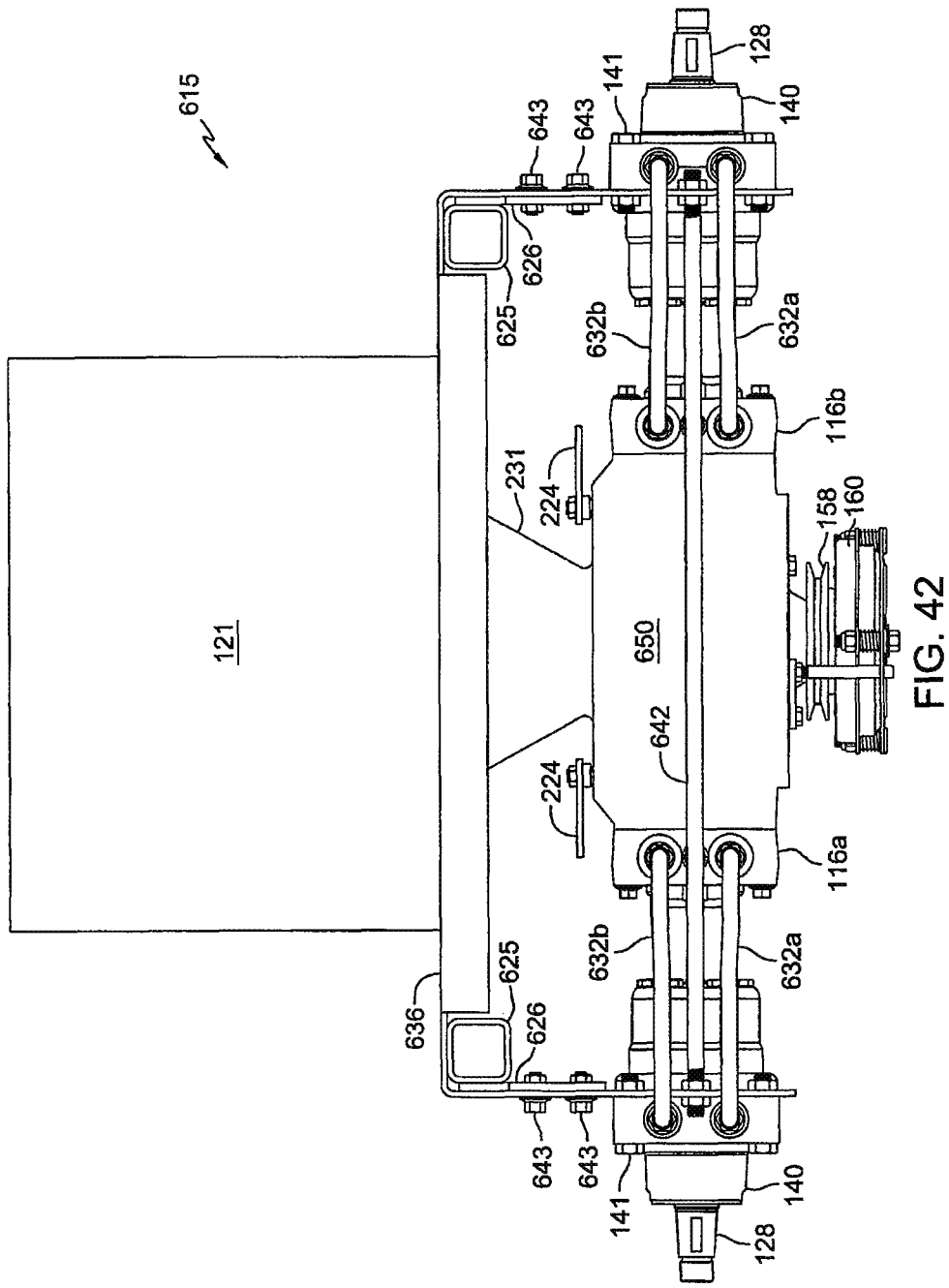
FIG. 42 is a rear elevational view of the installed bell housing dual pump module shown in FIG. 41.

A further embodiment of another vehicle 620 incorporating a drive module 615 is shown in FIGS. 41 and 42, where output axles 128 are in the same vertical plane as the dual pump shafts (not shown) of pump apparatus 650.

Two stabilizer rods 642 are shown as being in the same horizontal plane as output axles 128. Similar to the previous embodiments, mounting platform 636 is mounted on vehicle frame members 625; mounting plates 626 are secured to frame members 625 by weldments. Mounting platform 636 is attached to mounting plates 626 by fasteners 643. Motors 140 are located in mounting platform 636. This embodiment includes an integral bell housing 231 formed as a part of the housing of pump apparatus 650.

Figure 43:
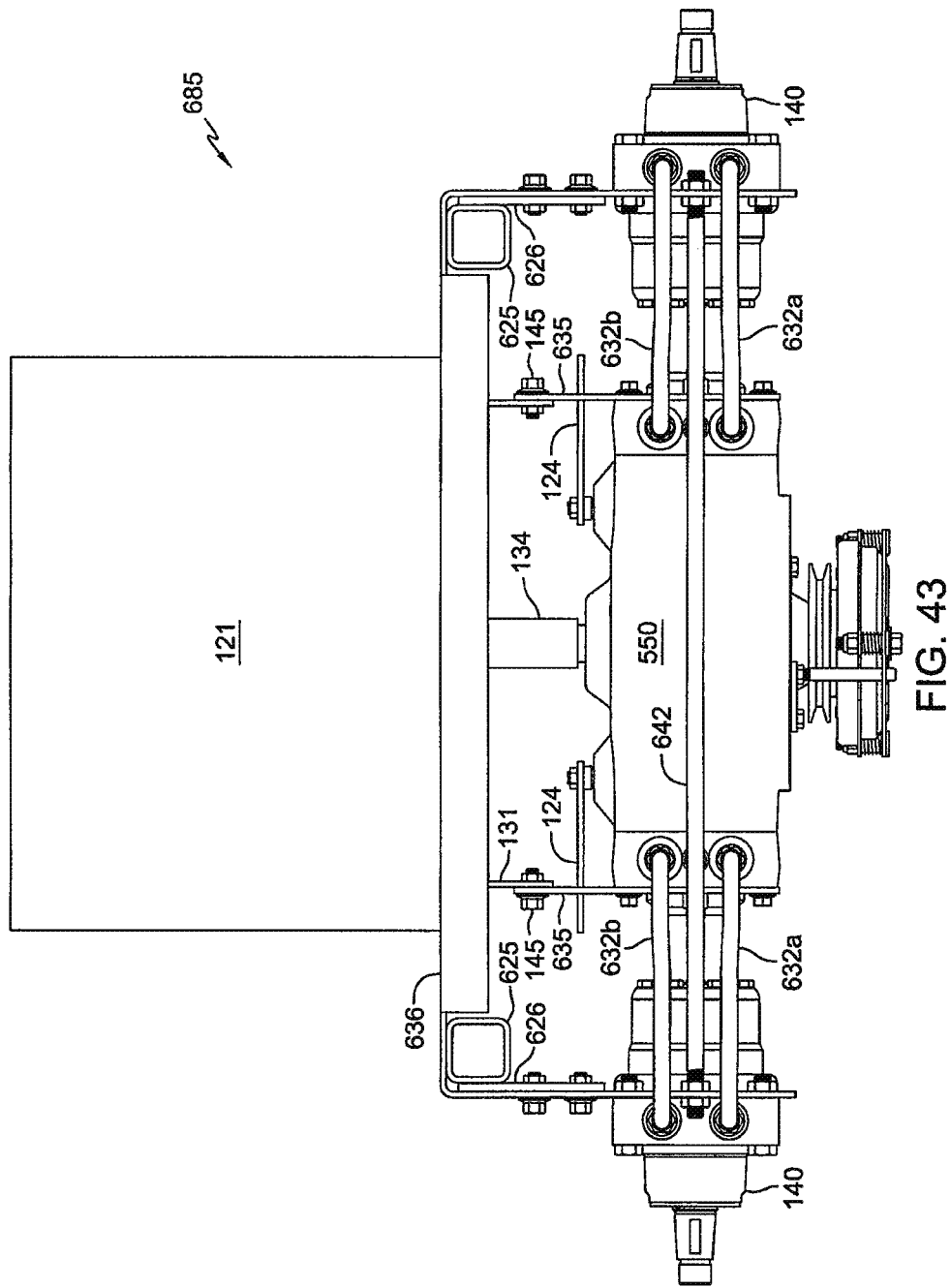
FIG. 43 is a rear elevational view of a bracket-mounted dual pump module installed in a vehicle frame such as that shown in FIG. 41.

FIG. 43 shows a drive module 685 embodiment similar to that shown in FIGS. 41 and 42, using a pump apparatus 550 mounting similar to that shown in various figures; for example, see FIGS. 18, 20, 32, and 39. Note that attachment plate 635 is a simpler part than that shown in previous embodiments.

Figure 44:
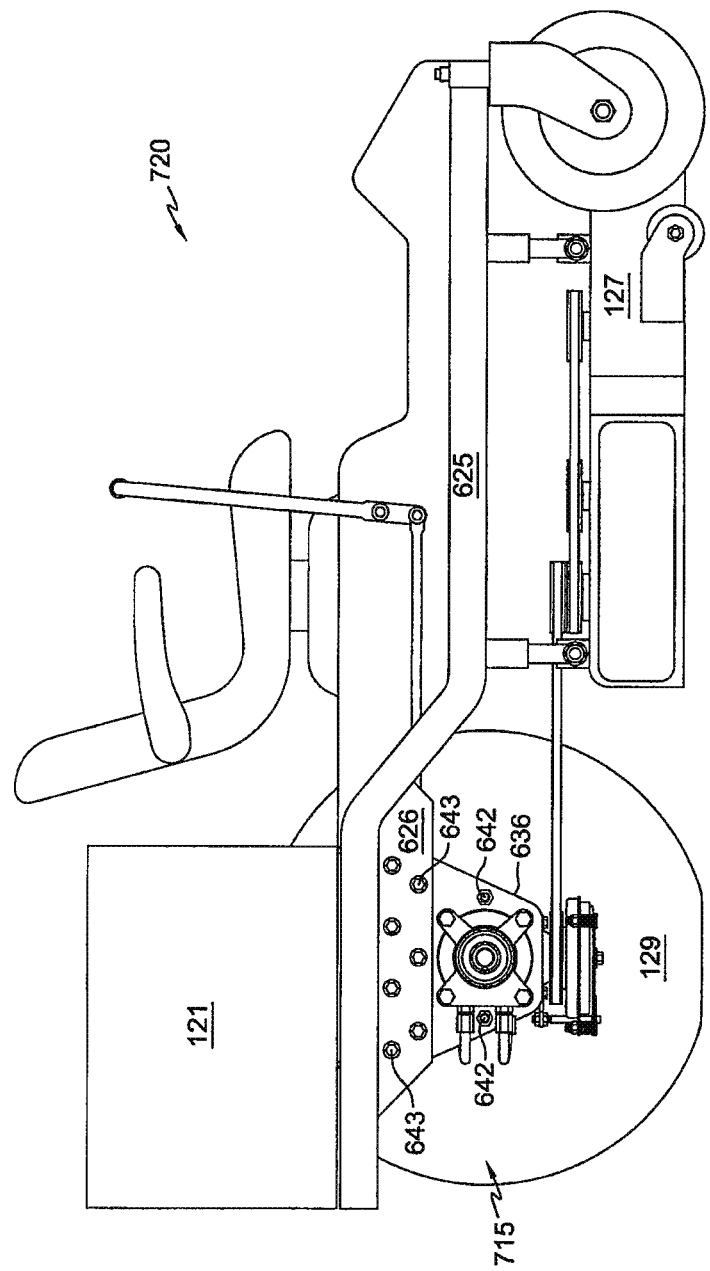
FIG. 44 is a side elevational view of a vehicle in accordance with another embodiment, including a dual pump module with an engine, where the module is mounted to the inside of the frame rails.
Figure 45:
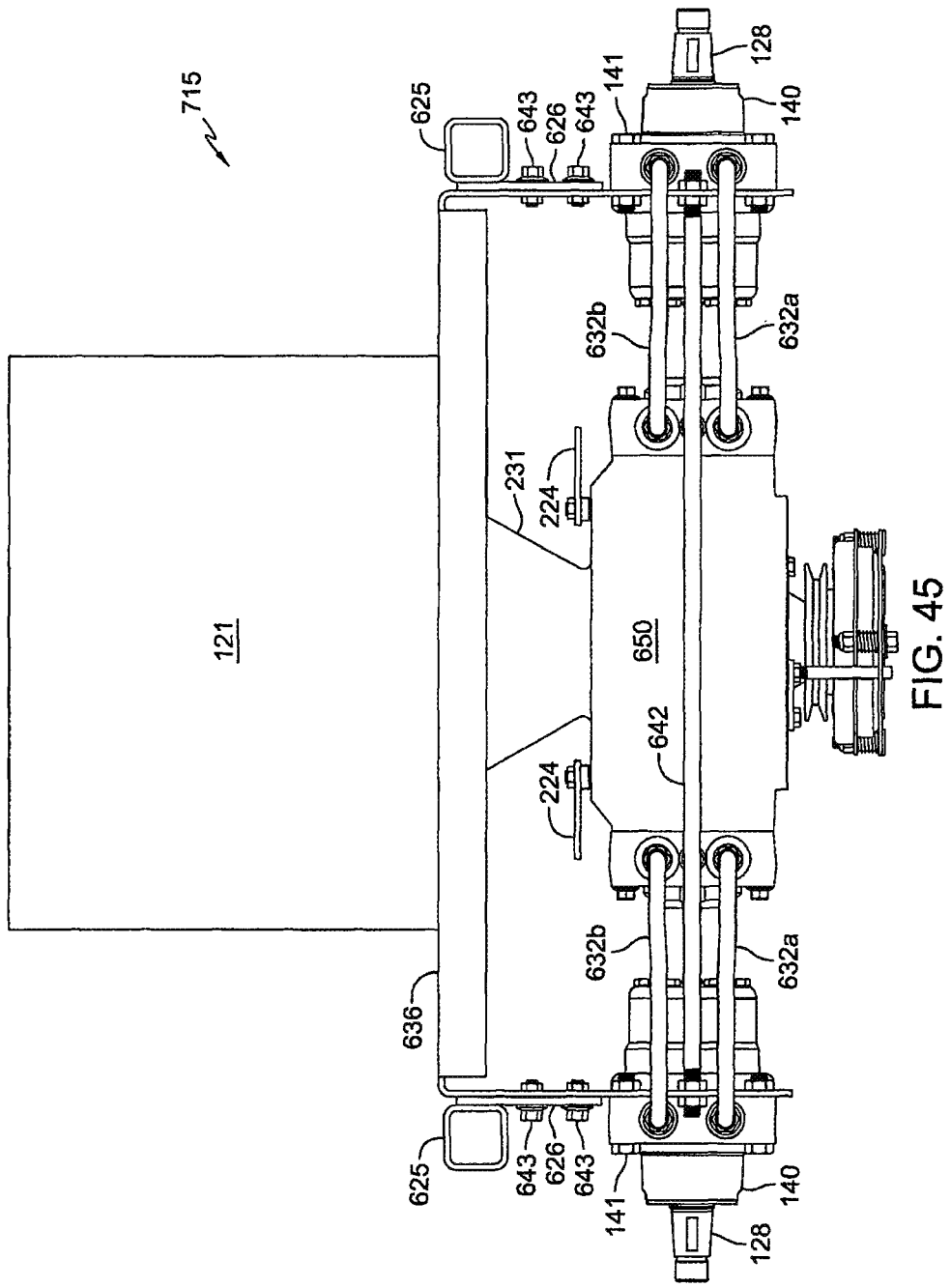
FIG. 45 is a rear elevational view of the installed bell housing dual pump module shown in FIG. 44.

A further embodiment of this invention is depicted in FIGS. 44 and 45, where vehicle 720 comprises drive module 715 mounted on the inside of frame rails 625 as shown most clearly in FIG. 45. Mounting platform 636 is mounted to flange 626 extending from frame rails 625 with bolts 643. This embodiment increases the ease of assembly, as module 715 may be raised, or frame 625 lowered, into position during installation.

In this embodiment, the input and output shafts and axles 128 are all on the same vertical plane, resulting in a lesser material requirement for a vertical shaft engine application. Two stabilizer/alignment rods 642 are shown in the same horizontal plane as the axles 128.

Figure 46:
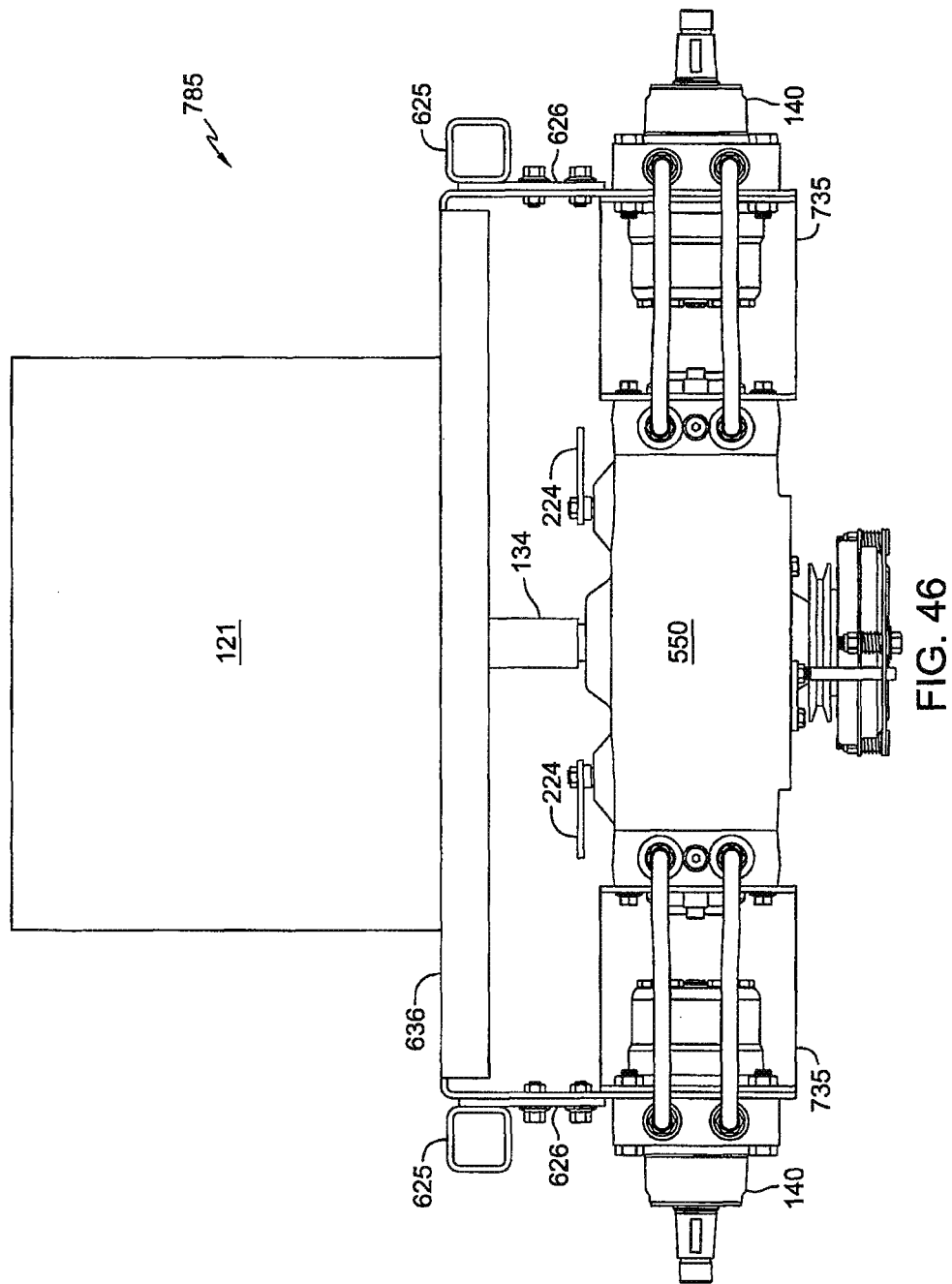
FIG. 46 is a rear elevational view of a further embodiment similar to FIG. 45, but incorporating a crossbeam approach and depicting an installed bracket-mounted dual pump module in a structural configuration.

FIG. 46 is a rear elevational view of a further embodiment similar to that shown in FIGS. 44 and 45, incorporating a crossbeam approach having drive module 785 in a structural configuration. Drive module 785 is mounted to the inside of vehicle frame 625. U-brackets 735 between pump apparatus 550 and motors 140 can be mounted in various orientations. This embodiment depicts a direct drive between engine 121 and dual pump 550.

Figure 47:
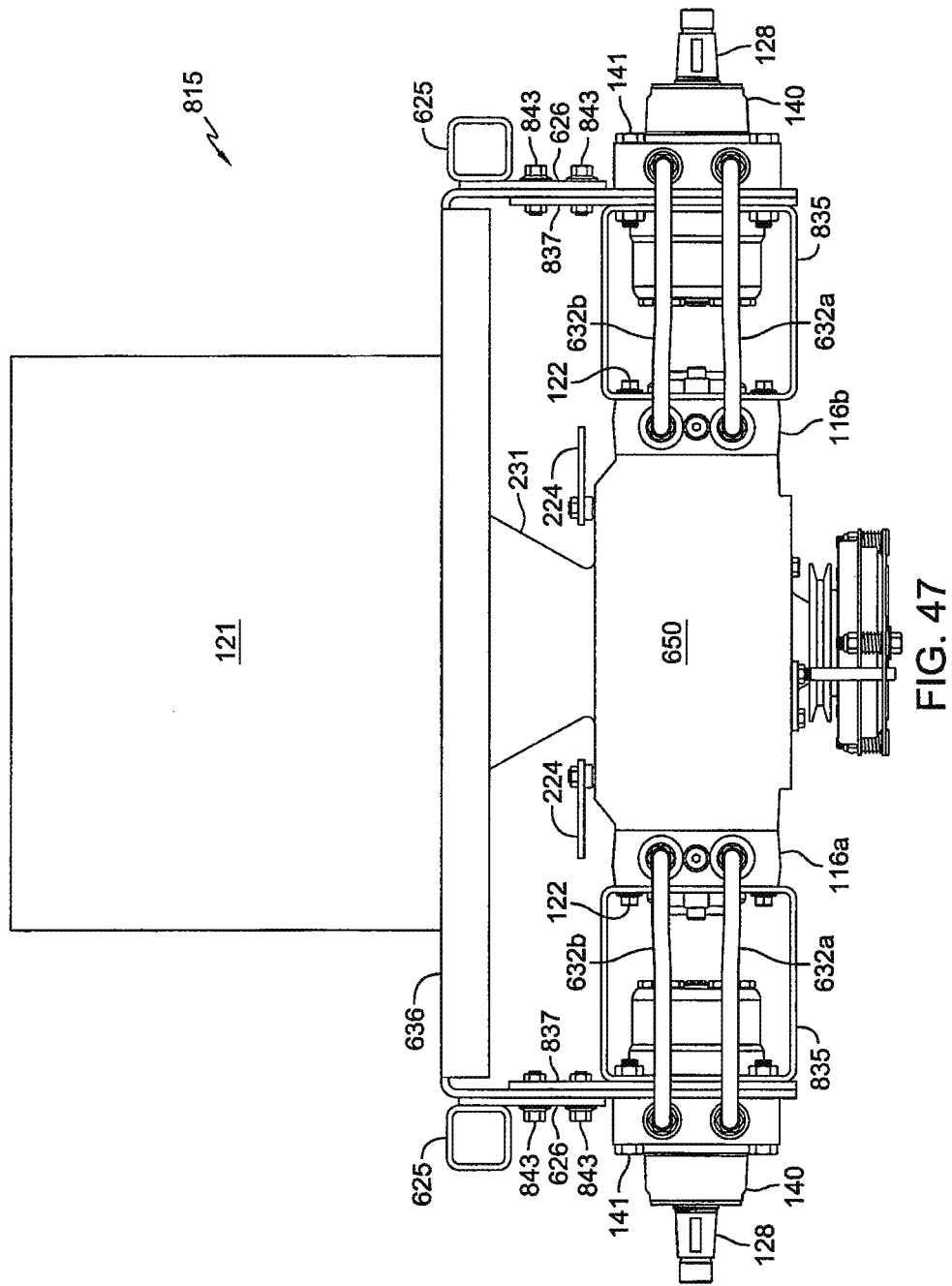
FIG. 47 is a rear elevational view of an embodiment similar to FIG. 46, but incorporating rectangular or square tubes instead of U-brackets and depicting a bell housing dual pump module.
Figure 48:
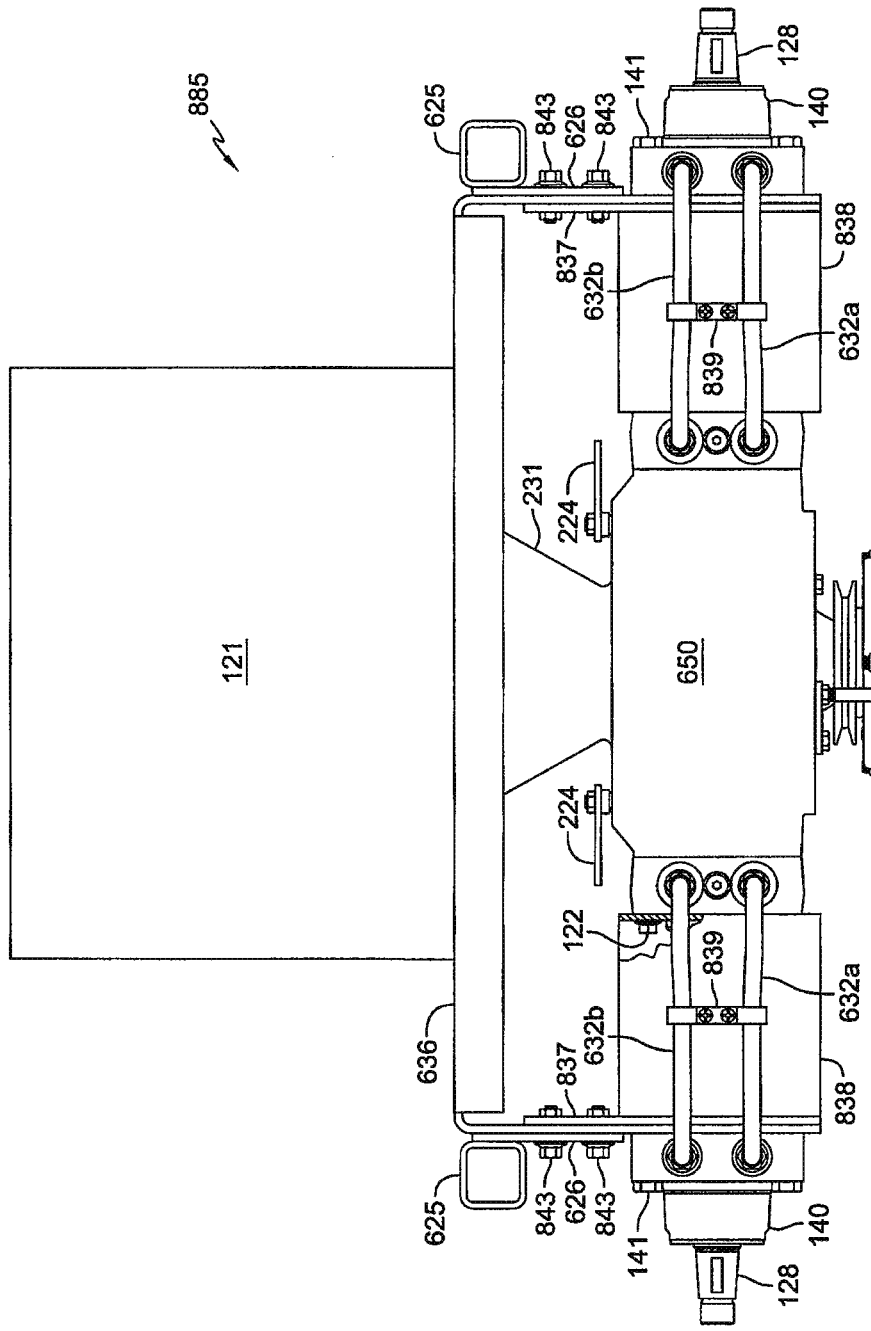
FIG. 48 is a rear elevational view of an embodiment similar to FIG. 47, but incorporating rectangular or square tubes with tube walls in a vertical orientation.
Figure 49:
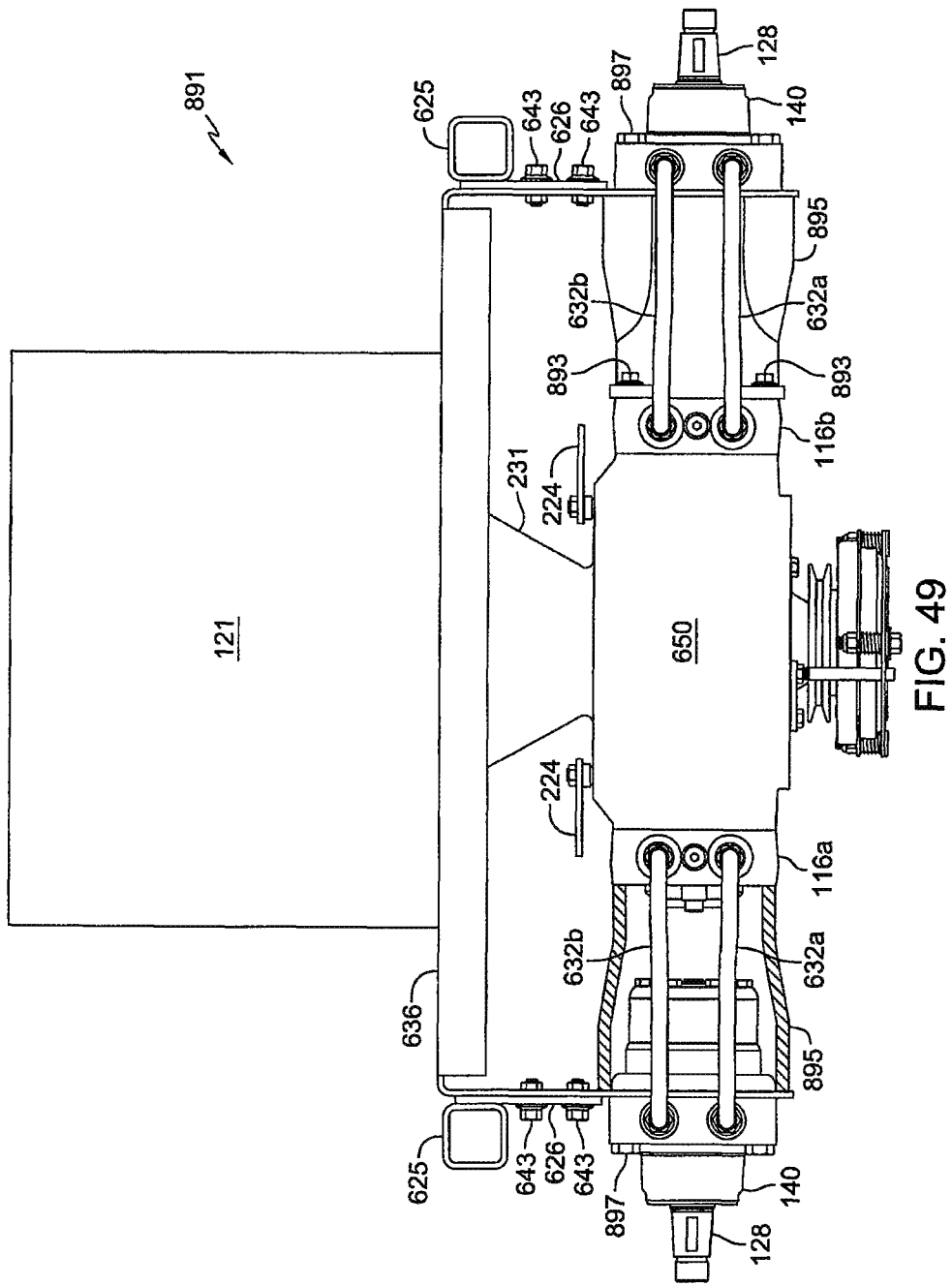
FIG. 49 is a rear elevational view of an installed dual pump module in accordance with another embodiment similar to FIG. 48, but incorporating castings in a structural crossbeam configuration.
Figure 53:
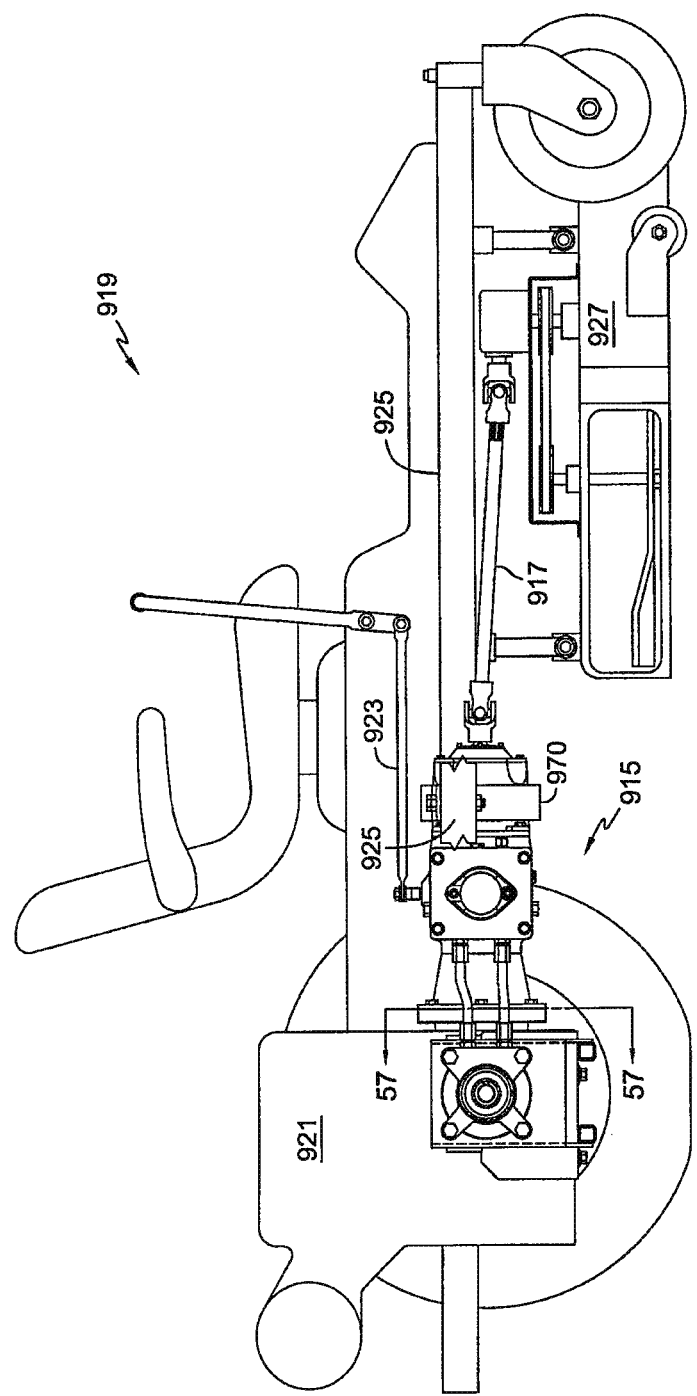
FIG. 53 is a side elevational view of a vehicle in accordance with another embodiment, including a dual pump module installed in a vehicle with a straight frame.
Figure 54:
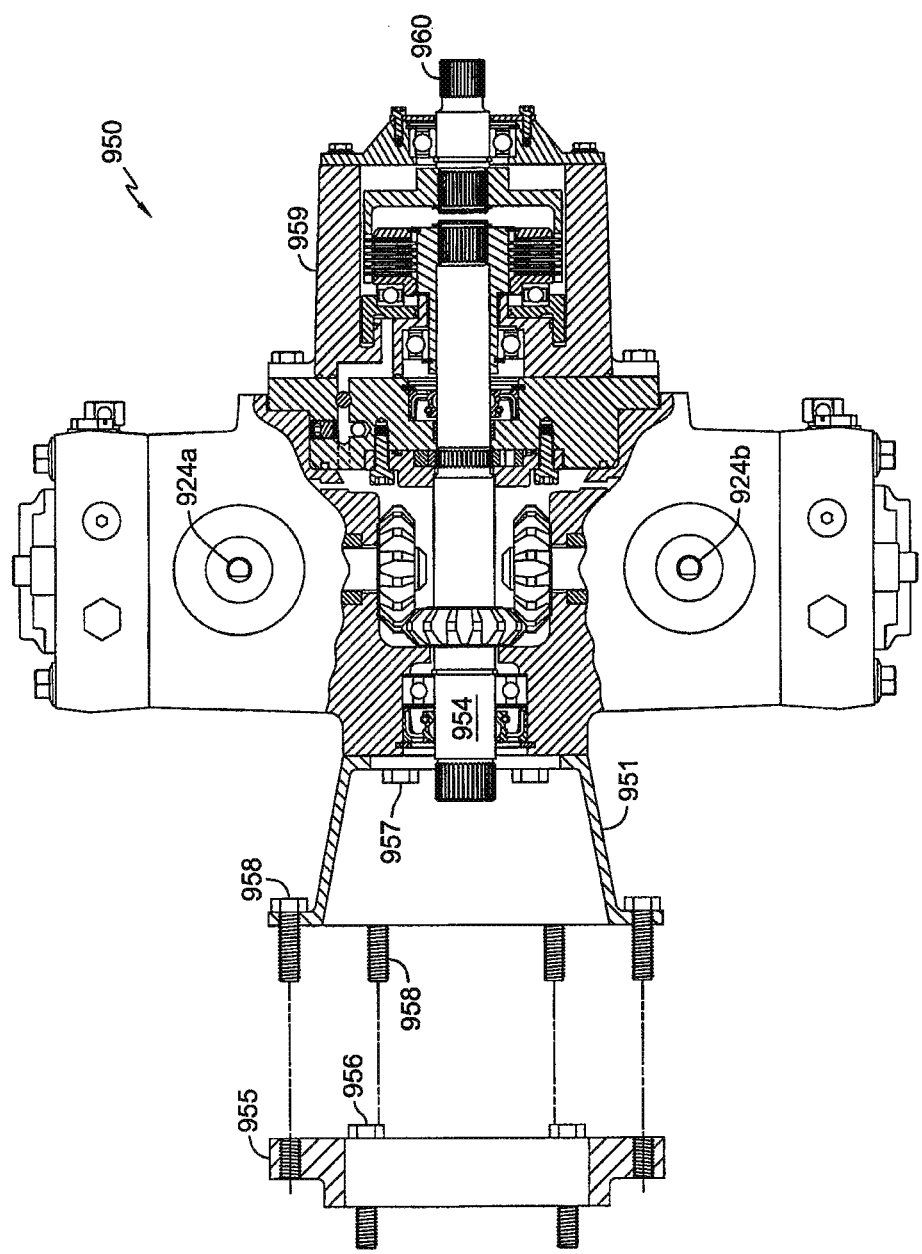
FIG. 54 is a partially sectioned view of the basic dual pump module with the hydraulic power take off assembly shown in FIG. 56.
Figure 55:
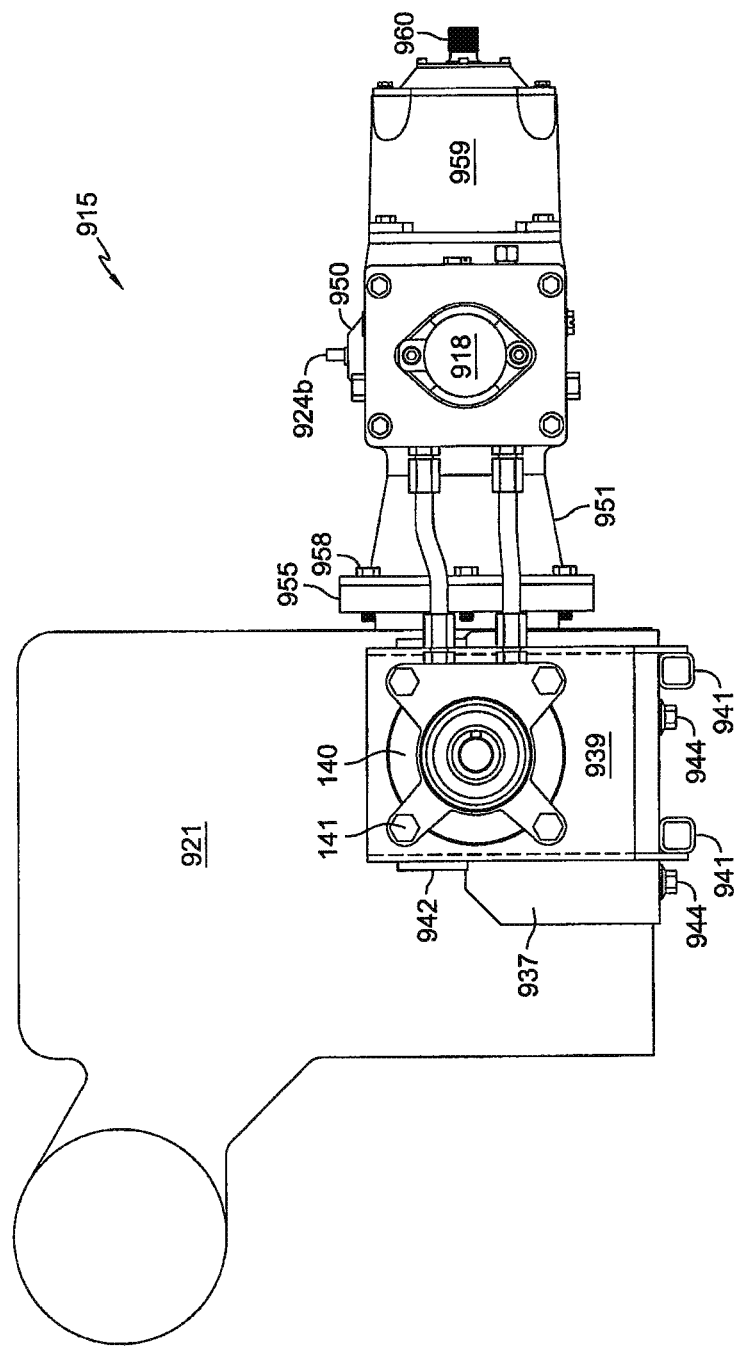
FIG. 55 is a side elevational view of the dual pump module shown in FIG. 53.
Figure 56:
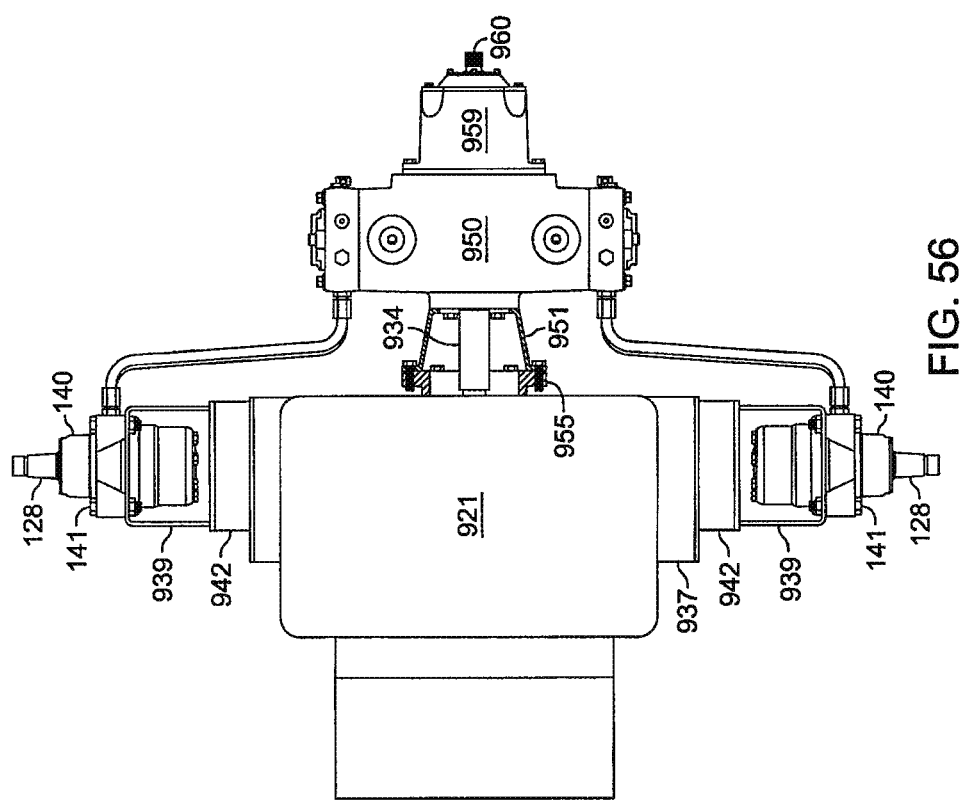
FIG. 56 is a plan view of the dual pump module shown in FIG. 53.
Figure 57:
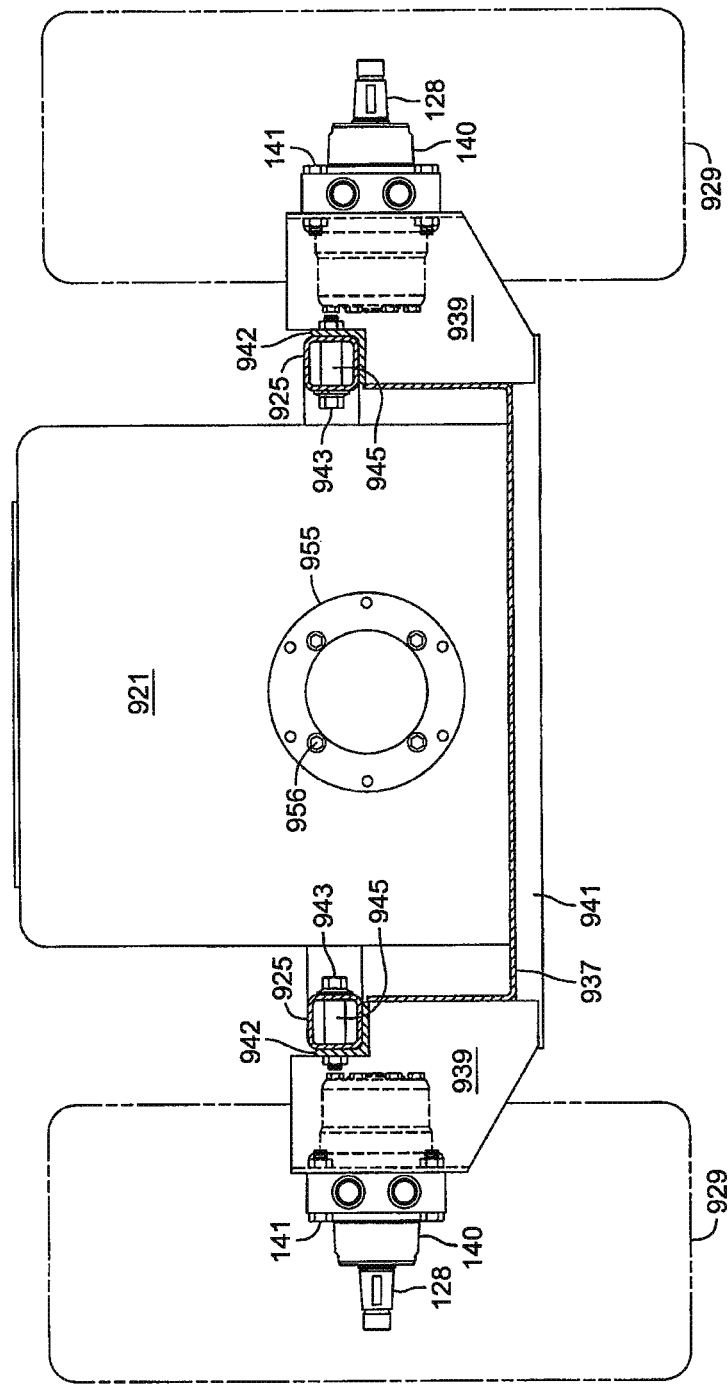
FIG. 57 is a front, partially sectioned elevational view of the vehicle shown in FIG. 53, along the lines 57-57.
Figure 58:
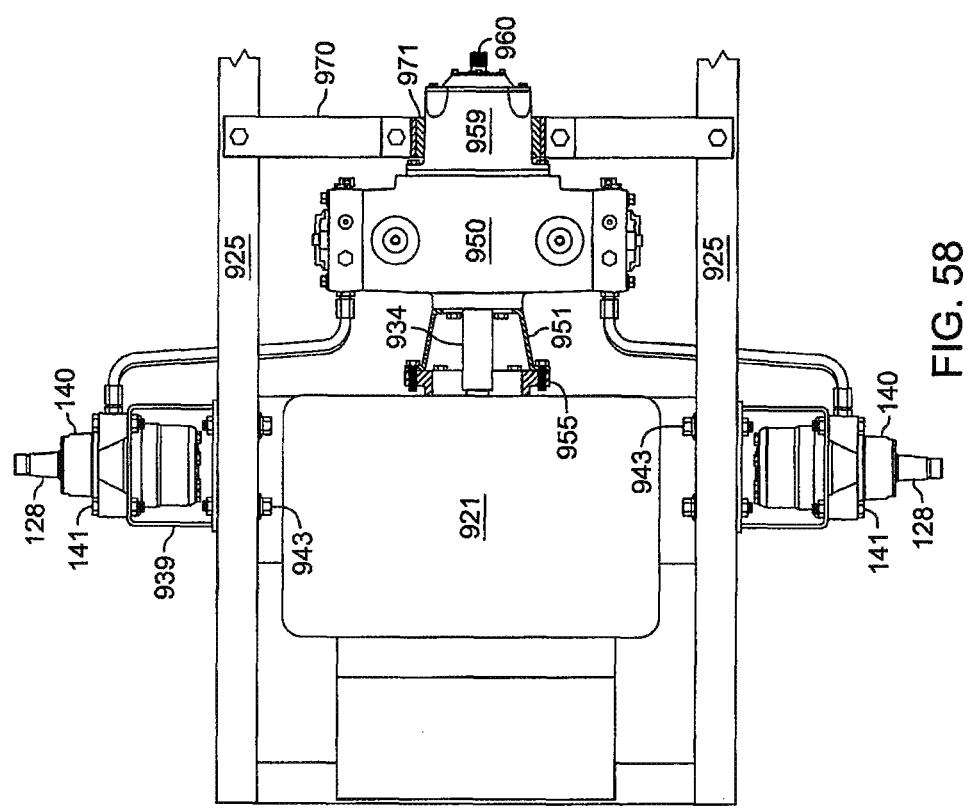
FIG. 58 is a top plan view of the straight frame dual pump module shown in FIG. 53.

FIG. 47 is a rear elevational view of drive module 815, incorporating rectangular or square tubes 835 instead of the U-brackets used previously. The use of the crossbeam approach plus bell housing 231 yields a more substantial structure and the input shaft is hidden and seals are protected. Tubes 835 and stiffening plates 837 are shown between pump apparatus 650 and motors 140. Mounting platform 636 and plates 837 may be attached to mounting plate 626 by fasteners 843. Square or rectangular tubes 835 can be rotated 90 degrees so that the four walls of tubes 835 are in a vertical orientation as opposed to the horizontal orientation depicted. Such an orientation is shown in FIG. 48 as drive module 885. Hose mounting clamps 839 are attached to the vertical walls of structural tubes 835.

Yet another embodiment is depicted in FIGS. 49 to 52, incorporating castings 895 secured between dual pump apparatus 650 and motors 140. Drive module 891 is mounted to the inside of vehicle frame members 625. One casting 895 is shown sectioned vertically on the axle 128 centerline for clarity. As in other embodiments, the use of the crossbeam approach plus bell housing 231 yields a more substantial structure and the input shaft is hidden and seals are protected. A preferred structure of casting 895 is shown in FIGS. 50 to 52, where flange 895a includes a plurality of fastener openings 895c to secure casting 895 to end caps 116a, 116b through fasteners 893, and mounting surface 895b includes a plurality of fastener openings 895d to secure motors 140 to castings 895 with fasteners 897, which may also secure motors 140 to a structural element such as mounting platform 636.

An additional embodiment is shown in FIGS. 53 to 58. Drive module 915 is installed in vehicle 919 with a straight frame 925. Mower deck 927 is shown in the lowered position, and most of the near side frame rail 925 is shown cut away to show module 915 more clearly.

Pump apparatus 950 is attached by way of adapter 955 to prime mover 921. Fasteners 956, 957 and 958 are used to mate bell housing 951 to pump apparatus 950 and to adapter 955, and to mate adapter 955 to prime mover 921. Pump apparatus 950 also comprises a hydraulic clutch and brake 959. Clutch 959 drives power take off shaft 960, which then drives shaft 917 and then mower deck 927.

Motors 140 are mounted by way of brackets 939 to mounting platform 937 that also supports prime mover 921. Bracket 939 also comprises an angle 942 to interface with frame 925. Fasteners 943 may optionally secure bracket 939 to frame 925. A spacer 945 may be used to prevent collapse of frame 925 as each fastener 943 is tightened.

To aid in securing pump apparatus 950, support assembly 970 is located on hydraulic clutch 959. An optional vibration isolator 971 may also be associated with support assembly 970. Trunnions 924a and 924b may face upward for ease of attachment to vehicle linkage 923.

Coupler 934 may be used to mate pump apparatus 950 input shaft 954 to a prime mover 921 output shaft. The advantage of this configuration is that it permits a wider vehicle wheel base compared to other designs and also permits a lower center of gravity for vehicle 919 as compared to other designs.

Figure 59:
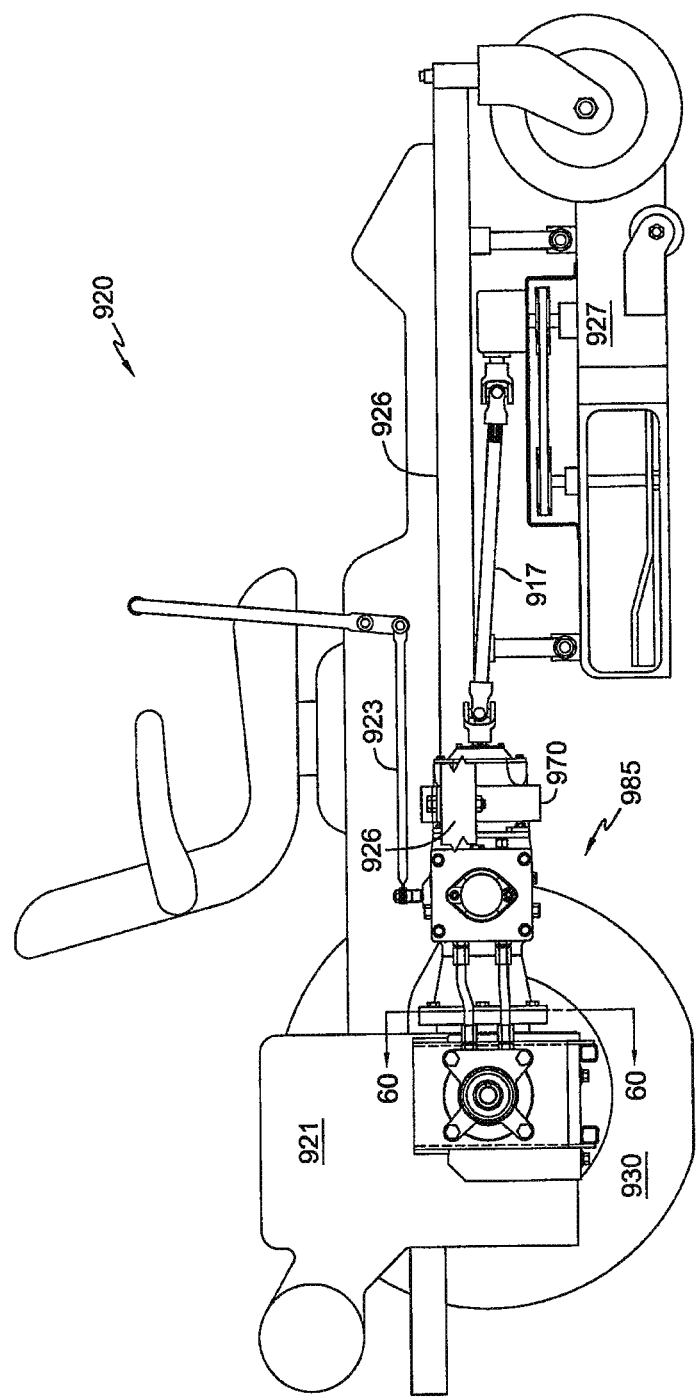
FIG. 59 is a side elevational view of a vehicle having a dual pump module installed in a vehicle with an offset bend in the frame.
Figure 60:
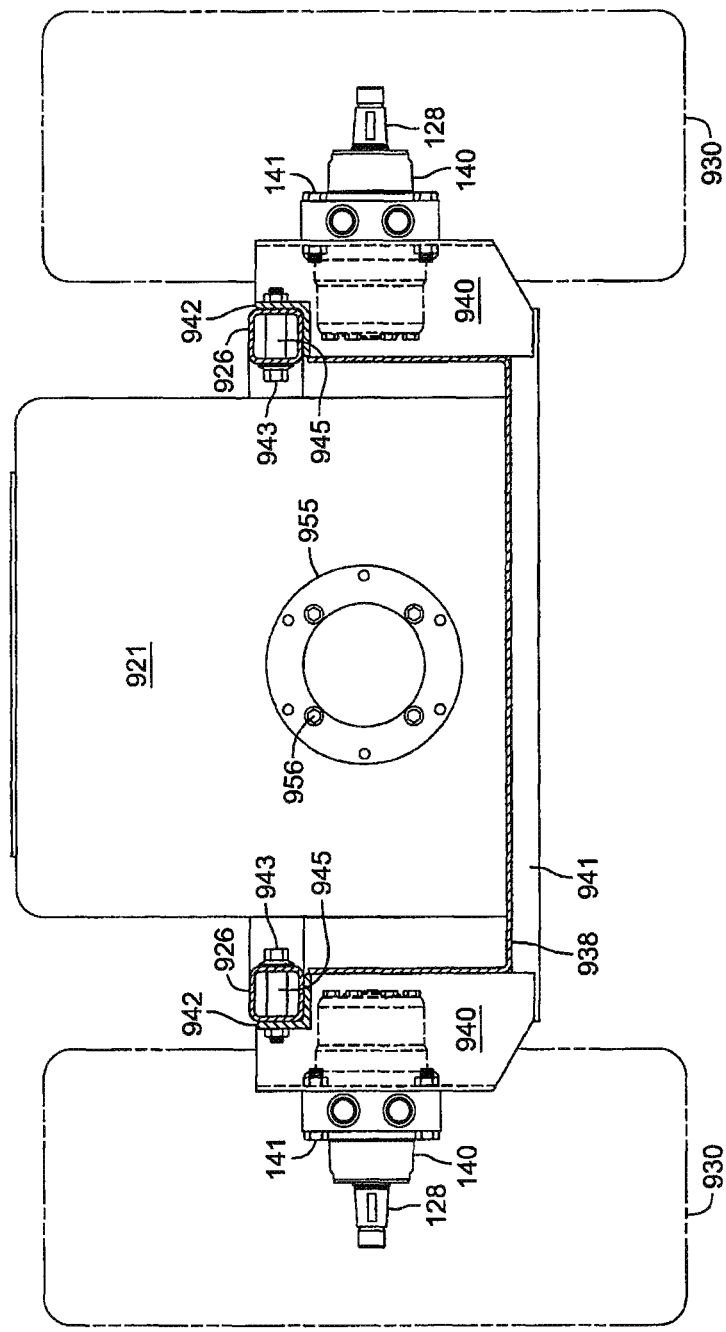
FIG. 60 is a front, partially sectioned elevational view of the vehicle shown in FIG. 59, along the lines 60-60.

Yet another embodiment is depicted in FIGS. 59 and 60, which is very similar to the previous embodiment shown in FIGS. 53 to 58, but there is an offset bend in frame 926. The offset bend in frame 926 allows drive module 985 to keep many of the features of the embodiment shown in FIGS. 53 to 58 while permitting a narrower stance of wheels 930 as compared to wheels 929.

As best seen in FIG. 60, wheel motor brackets 940 are configured to position wheel motors 140 below and partially directly under frame 926. Bracket 940 may be welded or attached to mounting platform 938, which is supported by structural tubes 941. As in the previous embodiment, fasteners 943 may aid in attaching mounting platform 938 to frame rail 926 at angle 942 formed as part of mounting platform 938. Spacer 945 helps prevent the collapse of frame member 926 during tightening of fastener 943.

In each of these embodiments, the dual pump is depicted to be similar to that disclosed in FIGS. 1-16 above. However, it will be understood that other dual pump arrangements can be used in connection with the modules disclosed herein in keeping with the spirit of this invention.

It is to be understood that the above description of the invention should not be used to limit the invention, as other embodiments will be obvious to one skilled in the art. This invention should be read as limited by the scope of its claims only.

The invention claimed is:

1. A hydraulic apparatus for use in connection with a vehicle having a prime mover, comprising:
   a hydraulic pump assembly, comprising:
      a first pump driven by a first pump shaft; and
      a second pump driven by a second pump shaft;
      wherein the first pump shaft and the second pump shaft are driven by the prime mover;
   a pair of hydraulic motors, each hydraulic motor being hydraulically connected to one of the pumps; and
   a subframe for mounting the hydraulic pump assembly and the pair of hydraulic motors, the subframe comprising:
      a first vertical subframe member attached to one of the pair of hydraulic motors;
      a second vertical subframe member attached to the other of the pair of hydraulic motors; and
      a horizontal subframe member extending from the first vertical subframe member to the second vertical subframe member, wherein the horizontal subframe member forms a generally flat mounting surface for the prime mover;
      a stabilizer bar extending from one of the pair of hydraulic motors to the other of the pair of hydraulic motors; and
      a plurality of attachment points for securing the pair of hydraulic motors and the prime mover to the subframe.

2. The hydraulic apparatus of claim 1, wherein each of the hydraulic motors comprises a motor shaft, and the subframe positions the pair of hydraulic motors so that the motor shafts are generally collinear with each other.

3. The hydraulic apparatus of claim 1, wherein the horizontal subframe member comprises an opening for a vertical output shaft of the prime mover.

4. The hydraulic apparatus of claim 1, wherein the first pump shaft and the second pump shaft are driven by the prime mover via one or more pulleys.

5. The hydraulic apparatus of claim 4, wherein the one or more pulleys are connected to a vertical output shaft of the prime mover.

6. The hydraulic apparatus of claim 1, wherein:
   the prime mover is attached to the horizontal subframe member using one or more first fasteners each through a respective one of the plurality of attachment points;
   one of the pair of hydraulic motors is attached to the first vertical subframe member using one or more second fasteners each through a respective one of the plurality of attachment points; and
   the other of the pair of hydraulic motors is attached to the second vertical subframe member using one or more third fasteners each through a respective one of the plurality of attachment points.

7. A vehicle, comprising:
a prime mover;
first and second hydraulic pumps, the first and second pumps each driven by the prime mover;
a pair of hydraulic motors, each hydraulic motor being hydraulically connected to one of the pumps; and
a subframe for mounting the first and second pumps and the pair of hydraulic motors, the subframe comprising:
  a first vertical subframe member attached to one of the pair of hydraulic motors;
  a second vertical subframe member attached to the other of the pair of hydraulic motors; and
  a horizontal subframe member extending from the first vertical subframe member to the second vertical subframe member, wherein the horizontal subframe member forms a generally flat mounting surface for the prime mover;
  a stabilizer bar extending from the first vertical subframe member to the second vertical subframe member, and further extending from one of the pair of hydraulic motors to the other of the pair of hydraulic motors; and
  a plurality of attachment points for securing the pair of hydraulic motors and the prime mover to the subframe.

8. The vehicle of claim 7, wherein:
the first pump is driven by a first pump shaft;
the second pump is driven by a second pump shaft; and
the first pump shaft and the second pump shaft are driven by the prime mover.

9. The vehicle of claim 8, wherein the first pump shaft and the second pump shaft are driven by the prime mover via one or more pulleys.

10. The vehicle of claim 9, wherein the one or more pulleys are connected to a vertical output shaft of the prime mover.

11. The vehicle of claim 7, wherein each end of the stabilizer bar is located proximate to one of the pair of hydraulic motors.

12. The vehicle of claim 7, wherein each of the hydraulic motors comprises a motor shaft, and the subframe positions the pair of hydraulic motors so that the motor shafts are generally collinear with each other.

13. The vehicle of claim 7, wherein the horizontal subframe member comprises an opening for a vertical output shaft of the prime mover.

14. The vehicle of claim 7, wherein:
the prime mover is attached to the horizontal subframe member using one or more first fasteners each through a respective one of the plurality of attachment points;
one of the pair of hydraulic motors is attached to the first vertical subframe member using one or more second fasteners each through a respective one of the plurality of attachment points; and
the other of the pair of hydraulic motors is attached to the second vertical subframe member using one or more third fasteners each through a respective one of the plurality of attachment points.

* * * * *